United States Patent
O'Phelan et al.

(10) Patent No.: US 9,620,806 B2
(45) Date of Patent: Apr. 11, 2017

(54) BATTERIES INCLUDING A FLAT PLATE DESIGN

(75) Inventors: Michael J. O'Phelan, Lutsen, MN (US); Tom G. Victor, Minneapolis, MN (US); Benjamin J. Haasl, Forest Lake, MN (US); Lawrence D. Swanson, White Bear Lake, MN (US); Richard J. Kavanagh, Brooklyn Park, MN (US); A. Gordon Barr, Burnsville, MN (US); Reilly M. Dillon, Chanhassen, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 466 days.

(21) Appl. No.: 12/764,457

(22) Filed: Apr. 21, 2010

(65) Prior Publication Data

US 2010/0203380 A1 Aug. 12, 2010

Related U.S. Application Data

(62) Division of application No. 12/355,242, filed on Jan. 16, 2009, now abandoned, which is a division of application No. 10/360,551, filed on Feb. 7, 2003, now Pat. No. 7,479,349.

(60) Provisional application No. 60/437,537, filed on Dec. 31, 2002.

(51) Int. Cl.
| | | |
|---|---|---|
| *H01M 2/30* | (2006.01) | |
| *H01M 2/02* | (2006.01) | |
| *H01M 10/04* | (2006.01) | |
| *H01M 6/00* | (2006.01) | |
| *A61N 1/375* | (2006.01) | |

(52) U.S. Cl.
CPC ....... *H01M 10/0404* (2013.01); *H01M 6/005* (2013.01); *A61N 1/375* (2013.01); *H01M 2002/0205* (2013.01); *H01M 2220/00* (2013.01)

(58) Field of Classification Search
USPC .................................. 429/66, 162–164, 139
See application file for complete search history.

(56) References Cited

U.S. PATENT DOCUMENTS

| | | | |
|---|---|---|---|
| 1,474,486 A | 11/1923 | Macpherson | |
| 1,931,043 A | 10/1933 | Taylor | |
| 2,993,395 A | 7/1961 | Bohn | |
| 3,034,258 A * | 5/1962 | Schwartz | ...................... 446/327 |
| 3,182,238 A | 5/1965 | Toder et al. | |
| 3,282,739 A * | 11/1966 | Hennigan | ...................... 429/156 |

(Continued)

FOREIGN PATENT DOCUMENTS

| | | | |
|---|---|---|---|
| EP | 0224733 A1 | 6/1987 | |
| EP | 0471661 A1 | 2/1992 | |

(Continued)

OTHER PUBLICATIONS

Linden et al., Handbook of Batteries, 1995, McGraw Hill, Third Edition, chapter 1.*

(Continued)

*Primary Examiner* — Ula C Ruddock
*Assistant Examiner* — Osei Amponsah
(74) *Attorney, Agent, or Firm* — Schwegman Lundberg & Woessner, P.A.

(57) ABSTRACT

A battery having flat, stacked, anode and cathode layers. The battery can be adapted to fit within an implantable medical device.

18 Claims, 33 Drawing Sheets

(56) References Cited

U.S. PATENT DOCUMENTS

| | | |
|---|---|---|
| 3,389,311 A | 6/1968 | Rayno |
| 3,452,310 A | 6/1969 | Israelson |
| 3,625,772 A * | 12/1971 | Himy .......................... 429/139 |
| 3,643,168 A | 2/1972 | Manicki |
| 3,663,741 A * | 5/1972 | Cushman .................. 174/94 R |
| 3,686,535 A | 8/1972 | Piper |
| 3,723,926 A | 3/1973 | Thomas et al. |
| 3,742,938 A | 7/1973 | Stern |
| 3,775,717 A | 11/1973 | Braillon |
| 3,777,570 A | 12/1973 | Thomas et al. |
| 3,803,457 A | 4/1974 | Yamamoto |
| 3,826,143 A | 7/1974 | Thomas et al. |
| 3,828,227 A | 8/1974 | Millard et al. |
| 3,859,574 A | 1/1975 | Brazier |
| 3,907,599 A | 9/1975 | Fanciullo et al. |
| 3,914,666 A | 10/1975 | Schmickl et al. |
| 3,938,228 A | 2/1976 | Kemkers et al. |
| 3,993,508 A | 11/1976 | Erlichman |
| 4,028,479 A | 6/1977 | Fanciullo et al. |
| 4,047,790 A | 9/1977 | Carino |
| 4,086,148 A | 4/1978 | Badia |
| 4,088,108 A | 5/1978 | Hager |
| 4,113,921 A | 9/1978 | Goldstein et al. |
| 4,127,702 A * | 11/1978 | Catanzarite ..................... 429/56 |
| 4,131,935 A | 12/1978 | Clement |
| 4,168,351 A * | 9/1979 | Taylor ............................ 429/48 |
| 4,169,003 A | 9/1979 | Dangel et al. |
| 4,232,099 A | 11/1980 | Sullivan |
| 4,267,565 A | 5/1981 | Puppolo et al. |
| 4,315,974 A | 2/1982 | Athearn |
| 4,352,867 A * | 10/1982 | Catanzarite .................. 429/101 |
| 4,379,277 A | 4/1983 | Braillon |
| 4,394,713 A | 7/1983 | Yoshida |
| 4,425,412 A | 1/1984 | Dittmann et al. |
| 4,465,415 A | 8/1984 | Eberling et al. |
| 4,471,331 A | 9/1984 | Wyatt |
| 4,481,083 A | 11/1984 | Ball et al. |
| 4,539,999 A | 9/1985 | Mans |
| 4,553,304 A | 11/1985 | Fleuret |
| 4,571,662 A | 2/1986 | Conquest et al. |
| 4,604,260 A | 8/1986 | Shimizu et al. |
| 4,614,194 A | 9/1986 | Jones et al. |
| 4,616,655 A | 10/1986 | Weinberg et al. |
| 4,652,845 A | 3/1987 | Finkle |
| 4,659,636 A | 4/1987 | Suzuki et al. |
| 4,664,116 A | 5/1987 | Shaya et al. |
| 4,683,516 A | 7/1987 | Miller |
| 4,745,039 A | 5/1988 | Yoshinaka |
| 4,763,229 A | 8/1988 | Ohtuka et al. |
| 4,782,340 A | 11/1988 | Czubatyj et al. |
| 4,796,638 A | 1/1989 | Sasaki |
| 4,833,719 A | 5/1989 | Carme et al. |
| 4,843,518 A | 6/1989 | Okumura |
| 4,897,323 A | 1/1990 | Hennrich et al. |
| 4,931,899 A | 6/1990 | Pruett |
| 4,964,877 A | 10/1990 | Keister et al. |
| 4,970,626 A | 11/1990 | Kakinoki et al. |
| 5,006,426 A | 4/1991 | Suzuki et al. |
| 5,131,388 A | 7/1992 | Pless et al. |
| 5,142,439 A | 8/1992 | Huggett et al. |
| 5,173,375 A | 12/1992 | Cretzmeyer et al. |
| 5,175,067 A | 12/1992 | Taylor et al. |
| 5,195,019 A | 3/1993 | Hertz |
| 5,229,223 A | 7/1993 | Hyland |
| 5,279,029 A | 1/1994 | Burns |
| 5,306,581 A | 4/1994 | Taylor et al. |
| 5,367,437 A | 11/1994 | Anderson |
| 5,369,547 A | 11/1994 | Evans |
| 5,377,073 A | 12/1994 | Fukaumi et al. |
| 5,414,588 A | 5/1995 | Barbee, Jr. et al. |
| 5,422,200 A | 6/1995 | Hope et al. |
| 5,428,499 A | 6/1995 | Szerlip et al. |
| 5,439,760 A | 8/1995 | Howard et al. |
| 5,448,997 A | 9/1995 | Kruse et al. |
| 5,451,286 A | 9/1995 | Nyborg |
| 5,469,325 A | 11/1995 | Evans |
| 5,470,676 A | 11/1995 | Nakano |
| 5,471,087 A | 11/1995 | Buerger, Jr. |
| 5,486,215 A | 1/1996 | Kelm et al. |
| 5,493,259 A | 2/1996 | Blalock et al. |
| 5,493,471 A | 2/1996 | Walther et al. |
| 5,507,966 A | 4/1996 | Liu |
| 5,522,851 A | 6/1996 | Fayram |
| 5,525,950 A | 6/1996 | Wang |
| 5,527,346 A | 6/1996 | Kroll |
| 5,549,717 A | 8/1996 | Takeuchi et al. |
| 5,554,178 A | 9/1996 | Dahl et al. |
| 5,559,667 A | 9/1996 | Evans |
| 5,580,676 A | 12/1996 | Honda et al. |
| 5,584,890 A | 12/1996 | MacFarlane et al. |
| 5,628,801 A | 5/1997 | MacFarlane et al. |
| 5,640,756 A | 6/1997 | Brown et al. |
| 5,645,586 A | 7/1997 | Meltzer |
| 5,658,319 A | 8/1997 | Kroll |
| 5,660,737 A | 8/1997 | Elias et al. |
| 5,691,079 A | 11/1997 | Daugaard |
| 5,716,729 A | 2/1998 | Sunderland et al. |
| 5,737,181 A | 4/1998 | Evans |
| 5,738,104 A | 4/1998 | Lo et al. |
| 5,754,394 A | 5/1998 | Evans et al. |
| 5,759,394 A | 6/1998 | Rohrbach et al. |
| 5,774,261 A | 6/1998 | Omori et al. |
| 5,776,632 A | 7/1998 | Honegger |
| 5,779,699 A | 7/1998 | Lipson |
| 5,779,891 A | 7/1998 | Andelman |
| 5,790,368 A | 8/1998 | Naito et al. |
| 5,800,724 A | 9/1998 | Habeger et al. |
| 5,801,917 A | 9/1998 | Elias |
| 5,811,206 A | 9/1998 | Sunderland et al. |
| 5,814,082 A | 9/1998 | Fayram et al. |
| 5,855,995 A | 1/1999 | Haq et al. |
| 5,867,363 A | 2/1999 | Tsai et al. |
| 5,882,362 A | 3/1999 | Muffoletto et al. |
| 5,896,647 A | 4/1999 | Shkuratoff |
| 5,908,151 A | 6/1999 | Elias |
| 5,922,215 A | 7/1999 | Pless et al. |
| 5,926,357 A | 7/1999 | Elias et al. |
| 5,930,109 A | 7/1999 | Fishler |
| 5,950,131 A | 9/1999 | Vilmur |
| 5,963,418 A | 10/1999 | Greenwood, Jr. et al. |
| 5,968,210 A | 10/1999 | Strange et al. |
| 5,973,906 A | 10/1999 | Stevenson et al. |
| 5,982,609 A | 11/1999 | Evans |
| 5,983,472 A | 11/1999 | Fayram et al. |
| 6,002,969 A | 12/1999 | Machek et al. |
| 6,004,692 A | 12/1999 | Muffoletto et al. |
| 6,006,133 A | 12/1999 | Lessar et al. |
| 6,009,348 A | 12/1999 | Rorvick et al. |
| 6,030,480 A | 2/2000 | Face, Jr. et al. |
| 6,032,075 A | 2/2000 | Pignato et al. |
| 6,040,082 A | 3/2000 | Haas et al. |
| 6,042,624 A | 3/2000 | Breyen et al. |
| 6,052,625 A | 4/2000 | Marshall |
| 6,094,339 A | 7/2000 | Evans |
| 6,094,788 A | 8/2000 | Farahmandi et al. |
| 6,099,600 A | 8/2000 | Yan et al. |
| 6,104,961 A | 8/2000 | Conger et al. |
| 6,110,233 A | 8/2000 | O'Phelan et al. |
| 6,110,321 A | 8/2000 | Day et al. |
| 6,117,194 A | 9/2000 | Strange et al. |
| 6,118,651 A | 9/2000 | Mehrotra et al. |
| 6,118,652 A | 9/2000 | Casby et al. |
| 6,132,896 A * | 10/2000 | Sunderland et al. ........... 429/66 |
| 6,139,986 A | 10/2000 | Kurokawa et al. |
| 6,141,205 A | 10/2000 | Nutzman et al. |
| 6,153,329 A * | 11/2000 | Raschilla et al. ............... 429/65 |
| 6,157,531 A | 12/2000 | Breyen et al. |
| 6,162,264 A | 12/2000 | Miyazaki et al. |
| 6,184,160 B1 | 2/2001 | Yan et al. |
| 6,191,931 B1 | 2/2001 | Paspa et al. |
| 6,197,074 B1 | 3/2001 | Satou et al. |
| 6,212,063 B1 | 4/2001 | Johnson et al. |
| 6,225,778 B1 | 5/2001 | Hayama et al. |
| 6,233,135 B1 | 5/2001 | Farahmandi et al. |

(56) References Cited

U.S. PATENT DOCUMENTS

| | | |
|---|---|---|
| 6,249,423 B1 | 6/2001 | O'Phelan et al. |
| 6,249,709 B1 | 6/2001 | Conger et al. |
| 6,256,542 B1 | 7/2001 | Marshall et al. |
| 6,259,954 B1 | 7/2001 | Conger et al. |
| 6,275,371 B1 | 8/2001 | Yoshio et al. |
| 6,275,729 B1 | 8/2001 | O'Phelan et al. |
| 6,297,943 B1 | 10/2001 | Carson |
| 6,299,752 B1 | 10/2001 | Strange et al. |
| 6,321,114 B1 | 11/2001 | Nutzman et al. |
| 6,324,049 B1 | 11/2001 | Inagawa et al. |
| 6,326,587 B1 | 12/2001 | Cardineau et al. |
| 6,330,925 B1 | 12/2001 | Ovshinsky et al. |
| 6,371,997 B1 | 4/2002 | Chang et al. |
| 6,388,284 B2 | 5/2002 | Rhodes et al. |
| 6,388,866 B1 | 5/2002 | Rorvick et al. |
| 6,402,793 B1 | 6/2002 | Miltich et al. |
| 6,404,619 B1 | 6/2002 | Marshall et al. |
| 6,413,283 B1 | 7/2002 | Day et al. |
| 6,442,015 B1 | 8/2002 | Niiori et al. |
| 6,451,073 B1 | 9/2002 | Farahmandi et al. |
| 6,459,566 B1 | 10/2002 | Casby et al. |
| 6,477,037 B1 | 11/2002 | Nielsen et al. |
| 6,477,404 B1 | 11/2002 | Yonce et al. |
| 6,493,212 B1 | 12/2002 | Clarke et al. |
| 6,509,588 B1 | 1/2003 | Barr et al. |
| 6,522,525 B1 | 2/2003 | O'Phelan et al. |
| 6,556,863 B1 | 4/2003 | O'Phelan et al. |
| 6,571,126 B1 | 5/2003 | O'Phelan et al. |
| 6,628,505 B1 | 9/2003 | Andelman |
| 6,632,720 B2 | 10/2003 | Barr et al. |
| 6,674,634 B2 | 1/2004 | O'Phelan et al. |
| 6,684,102 B1 | 1/2004 | O'Phelan et al. |
| 6,687,118 B1 | 2/2004 | O'Phelan et al. |
| 6,699,265 B1 | 3/2004 | O'Phelan et al. |
| 6,709,946 B2 | 3/2004 | O'Phelan et al. |
| 6,721,602 B2 | 4/2004 | Engmark et al. |
| 6,763,265 B2 | 7/2004 | O'Phelan et al. |
| 6,833,987 B1 | 12/2004 | O'Phelan |
| 6,885,887 B2 | 4/2005 | O'Phelan et al. |
| 6,957,103 B2 | 10/2005 | Schmidt et al. |
| 6,985,351 B2 | 1/2006 | O'Phelan et al. |
| 6,999,304 B2 | 2/2006 | Schmidt et al. |
| 7,479,349 B2 | 1/2009 | O'Phelan et al. |
| 2001/0020319 A1 | 9/2001 | Farahmandi et al. |
| 2002/0106554 A1 | 8/2002 | Nemoto et al. |
| 2002/0142216 A1 | 10/2002 | Skoumpris |
| 2003/0077509 A1 | 4/2003 | Probst et al. |
| 2003/0092293 A1* | 5/2003 | Ohtsuki ............ H01R 13/2414 439/66 |
| 2003/0165744 A1 | 9/2003 | Schubert et al. |
| 2003/0195568 A1 | 10/2003 | O'Phelan et al. |
| 2004/0019268 A1 | 1/2004 | Schmidt et al. |
| 2004/0114311 A1 | 6/2004 | O'Phelan et al. |
| 2004/0127952 A1 | 7/2004 | O'Phelan et al. |
| 2004/0147960 A1 | 7/2004 | O'Phelan et al. |
| 2004/0147961 A1 | 7/2004 | O'Phelan et al. |
| 2004/0173835 A1 | 9/2004 | Schmidt et al. |
| 2004/0174658 A1 | 9/2004 | O'Phelan et al. |
| 2004/0193221 A1 | 9/2004 | O'Phelan et al. |
| 2004/0215281 A1 | 10/2004 | O'Phelan et al. |
| 2005/0010253 A1 | 1/2005 | O'Phelan et al. |
| 2005/0017888 A1 | 1/2005 | Sherwood et al. |
| 2005/0052825 A1 | 3/2005 | O'Phelan |
| 2005/0221171 A1 | 10/2005 | Haasl et al. |
| 2006/0009808 A1 | 1/2006 | Schmidt et al. |
| 2009/0123825 A1 | 5/2009 | O'Phelan et al. |

FOREIGN PATENT DOCUMENTS

| | | |
|---|---|---|
| EP | 0753868 A2 | 1/1997 |
| EP | 1043782 A2 | 10/2000 |
| EP | 1202371 A1 | 5/2002 |
| EP | 2323211 B1 | 11/2013 |
| EP | 1590843 B1 | 3/2014 |
| GB | 2132019 | 6/1984 |
| JP | 52-004051 | 1/1977 |
| JP | 59-083772 | 5/1984 |
| JP | 63284762 | 11/1988 |
| JP | 05-074664 | 3/1993 |
| JP | 2001319683 | 11/2001 |
| JP | 2002239762 A | 8/2002 |
| WO | WO-9827562 A1 | 6/1998 |
| WO | WO-9851602 A1 | 11/1998 |
| WO | WO-9951302 A1 | 10/1999 |
| WO | WO-9966985 A1 | 12/1999 |
| WO | WO-0019470 A1 | 4/2000 |
| WO | WO-0237515 A2 | 5/2002 |
| WO | WO-0243090 A2 | 5/2002 |
| WO | WO-03060937 A1 | 7/2003 |
| WO | WO-2006002148 A1 | 1/2006 |

OTHER PUBLICATIONS

Sheldrake et al., Handbook of Electrical Engineering, 2003, John Wiley & Sons, appendix I.*

"International Application No. PCT/US2003/041704, Invitation to Pay Additional fees and Partial International Search mailed Jun. 10, 2005", 16 pgs.

Ashenmacher, G E, "Clamping Mechanism", IBM Technical Disclosure Bulletin, 23 (9), NN81024261, (Feb. 1, 1981), 4261-4263.

Haasl, Benjamin J, et al., "Insulative Member on Battery Cathode", U.S. Appl. No. 11/140,854, filed May 31, 2005, 30 pgs.

Kelley, Shawn, et al., "Method and Apparatus for Porous Insulative Film for Insulating Energy Source Layers", U.S. Appl. No. 11/127,025, filed May 11, 2005, 21 pgs.

Moynihan, J. D., "Theory, Design and Application of Electrolytic Capacitors", Theory, Design and Application of Electrolytic Capacitors, Copyright by John D. Moynihan, (1982), 139 pgs.

O'Phelan, Michael J, et al., "Capacitor Having a Feedthrough Assembly With a Coupling Member", U.S. Appl. No. 09/706,579, filed Nov. 3, 2000, 29 pgs.

Schmidt, Brian L, et al., "Configurations and Methods for Making Capacitor Connections", U.S. Appl. No. 09/706,576, filed Nov. 3, 2000, 26 pgs.

Shams, A. M, et al., "Titanium hydride formation from Arabian Gulf water", Desalination, vol. 107, (1996), 265-276.

Sherwood, Gregory J, "Method and Apparatus for High Voltage Aluminum Capacitor Design", U.S. Appl. No. 11/182,707, filed Jul. 15, 2005, 239 pgs.

Youker, Nick A, "Method and Apparatus for an Implantable Pulse Generator With a Stacked Battery and Capacitor", U.S. Appl. No. 11/117,952, filed Apr. 29, 2005, 21 pgs.

"U.S. Appl. No. 10/360,551, Advisory Action mailed Jul. 7, 2006", 3 pgs.

"U.S. Appl. No. 10/360,551, Appeal Brief filed Feb. 14, 2007", 20 pgs.

"U.S. Appl. No. 10/360,551, Decision on Appeal mailed Aug. 28, 2008", 7 pgs.

"U.S. Appl. No. 10/360,551, Examiner's Answer mailed May 10, 2007", 10 pgs.

"U.S. Appl. No. 10/360,551, Final Office Action mailed Apr. 14, 2006", 8 pgs.

"U.S. Appl. No. 10/360,551, Non-Final Office Action mailed Jan. 6, 2006", 6 pgs.

"U.S. Appl. No. 10/360,551, Notice of Allowance mailed Sep. 11, 2008", 6 pgs.

"U.S. Appl. No. 10/360,551, Pre-Appeal Brief Request for Review filed Sep. 14, 2006", 5 pgs.

"U.S. Appl. No. 10/360,551, Reply Brief filed Jul. 10, 2007", 4 pgs.

"U.S. Appl. No. 10/360,551, Response filed Apr. 6, 2006 to non-Final Office Action mailed Jan. 6, 2006", 7 pgs.

"U.S. Appl. No. 10/360,551, Response filed Jun. 14, 2006 to Final Office Action mailed Apr. 14, 2006", 8 pgs.

"U.S. Appl. No. 10/360,551, Response filed Nov. 14, 2005 to Restriction Requirement mailed Oct. 14, 2005", 5 pgs.

"U.S. Appl. No. 10/360,551, Restriction Requirement mailed Oct. 14, 2005", 12 pgs.

(56) References Cited

OTHER PUBLICATIONS

"U.S. Appl. No. 12/355,242, Final Office Action mailed Oct. 22, 2009", 10 pgs.

"U.S. Appl. No. 12/355,242, Non-Final Office Action mailed Apr. 30, 2009", 8 pgs.

"U.S. Appl. No. 12/355,242, Response filed Jul. 29, 2009 to Non Final Office Action mailed Apr. 30, 2009", 11 pgs.

"U.S. Appl. No. 12/355,242, Response filed Dec. 10, 2009 to Final Office Action mailed Oct. 22, 2009", 8 pgs.

"European Application Serial No. 03800396.8, Communication mailed Sep. 1, 2008", 4 pgs.

"European Application Serial No. 03800396.8, Office Action mailed Mar. 3, 2010", 4 Pgs.

"European Application Serial No. 03800396.8, Office Action Response Filed Aug. 10, 2010", 13 pgs.

"European Application Serial No. 03800396.8, Response filed Dec. 30, 2003 to Communication mailed Sep. 1, 2008", 16 pgs.

"European Application Serial No. 10181415.0, Extended European Search Report mailed Mar. 9, 2011", 6 pgs.

"European Application Serial No. 10181460.6, Search Report mailed Mar. 14, 2011", 6 pgs.

"European Application Serial No. 10181466.3, Search Report mailed Mar. 11, 2011", 6 pgs.

"European Application Serial No. 10181475.4, Search Report mailed Mar. 15, 2011", 5 pgs.

"European Application Serial No. 10181482.0, Search Report mailed Mar. 15, 2011", 6 pgs.

"European Application Serial No. 10181504.1, Extended European Search Report mailed Mar. 9, 2011", 6 pgs.

"European Application Serial No. 10181514.0, Extended European Search Report mailed Mar. 4, 2011", 5 pgs.

"International Application Serial No. PCT/US2003/041704, International Search Report mailed Aug. 29, 2005", 16 pgs.

"International Application U.S. Appl. No. PCT/US2003/041704, Invitation to Pay Fees and Partial International Search Report mailed 06-10-05", 15 pgs.

"Japanese Application U.S. Appl. No. 2005-508647, Office Action mailed 09-21-10", 3 pgs.

"Japanese Application U.S. Appl. No. 2005-508647, Office Action Response Filed 12-20-10", 39 pgs.

Fishbane, et al., "Physics for Scientists and Engineers,", Prentice-Hall, Inc., vol. Ii (1993,), 791-793.

O'Phelan, M., et al., "Batteries Including a Flat Plate Design", U.S. Application U.S. Appl. No. 12/355,242, filed Jan. 16, 2009.

"European Application Serial No. 03800396.8, Office Action mailed Aug. 29, 2012", 3 pgs.

"European Application Serial No. 10181460.6, Office Action mailed Oct. 17, 2012", 4 pgs.

"European Application Serial No. 10181475.4, Response filed Sep. 17, 2012 to Office Action mailed May 9, 2012", 5 pgs.

"European Application Serial No. 10181493.7, Office Action mailed Oct. 15, 2012", 4 pgs.

"European Application Serial No. 03800396.8, Office Action dated Aug. 4, 2011", 4 pgs.

"European Application Serial No. 03800396.8, Office Action Response filed Dec. 12, 2011", 2 pgs.

"European Application Serial No. 03800396.8, Response filed Jan. 4, 2013 to Examination Notification Art. 94(3) mailed Aug. 29, 2012", 3 pgs.

"European Application Serial No. 08768012.0, Response filed Aug. 10, 2012 to Extended European Search Report mailed Jan. 20, 2012", 15 pgs.

"European Application Serial No. 10181415.0, Office Action mailed Apr. 27, 2012", 4 pgs.

"European Application Serial No. 10181415.0, Office Action Response filed Oct. 13, 2011", 9 pgs.

"European Application Serial No. 10181415.0, Response filed Aug. 14, 2012 to Examination Notification Art. 94(3) mailed Apr. 27, 2012", 26 pgs.

"European Application Serial No. 10181460.6, Extended Search Report Response filed Nov. 18, 2011", 13 pgs.

"European Application Serial No. 10181460.6, Office Action mailed Apr. 30, 2012", 4 pgs.

"European Application Serial No. 10181460.6, Response filed Sep. 7, 2012 to Examination Notification Art. 94(3) mailed Apr. 30, 2012", 8 pgs.

"European Application Serial No. 10181466.3, Office Action mailed Apr. 24, 2012", 6 pgs.

"European Application Serial No. 10181466.3, Response filed Aug. 14, 2012 to Office Action mailed Apr. 24, 2012", 12 pgs.

"European Application Serial No. 10181466.3, Response filed Nov. 8, 2011 to European Search Report mailed Mar. 11, 2011", 13 pgs.

"European Application Serial No. 10181475.4, Extended Search Report Response filed Nov. 17, 2011", 14 pgs.

"European Application Serial No. 10181475.4, Office Action mailed May 9, 2012", 4 pgs.

"European Application Serial No. 10181482.0, Examination Notification Art. 94(3) mailed May 24, 2013", 4 pgs.

"European Application Serial No. 10181482.0, Office Action mailed Apr. 26, 2012", 4 pgs.

"European Application Serial No. 10181482.0, Response filed Aug. 14, 2012 to Examination Notification Art. 94(3) mailed Apr. 26, 2012", 8 pgs.

"European Application Serial No. 10181482.0, Response filed Nov. 18, 2011 to Office Action mailed May 23, 2011", 12 pgs.

"European Application Serial No. 10181493.7, Office Action mailed Jan. 20, 2012", 6 pgs.

"European Application Serial No. 10181493.7, Response filed Feb. 19, 2013 to Examination Notification Art. 94(3) mailed Oct. 15, 2012", 8 pgs.

"European Application Serial No. 10181504.1, Office Action mailed Apr. 16, 2012", 4 pgs.

"European Application Serial No. 10181504.1, Response filed Aug. 13, 2012 to Examination Notification Art. 94(3) mailed Apr. 16, 2012", 8 pgs.

"European Application Serial No. 10181504.1, Response filed Oct. 13, 2011 to Office Action mailed Mar. 9, 2011", 14 pgs.

"European Application Serial No. 10181514.0, Examination Notification Art. 94(3) Mailed Mar. 30, 2012", 4 Pgs.

"European Application Serial No. 10181514.0, Response filed Aug. 3, 2012 to Examination Notification Art. 94(3) mailed Mar. 30, 2012", 9 pgs.

"European Application Serial No. 10181514.0, Response filed Oct. 6, 2011 to EP Search Report dated Mar. 4, 2011", 15 pgs.

"Japanese Application Serial No. 2005-508647, Notice of Allowance mailed Oct. 4, 2011", (w/ English Translation, 2 pgs.

"European Application Serial No. 10181493.7, Examination Notification Art. 94(3) mailed Sep. 24, 2013", 3 pgs.

European Application Serial No. 10181504.1, Examination Notification Art. 94(3) mailed.

\* cited by examiner

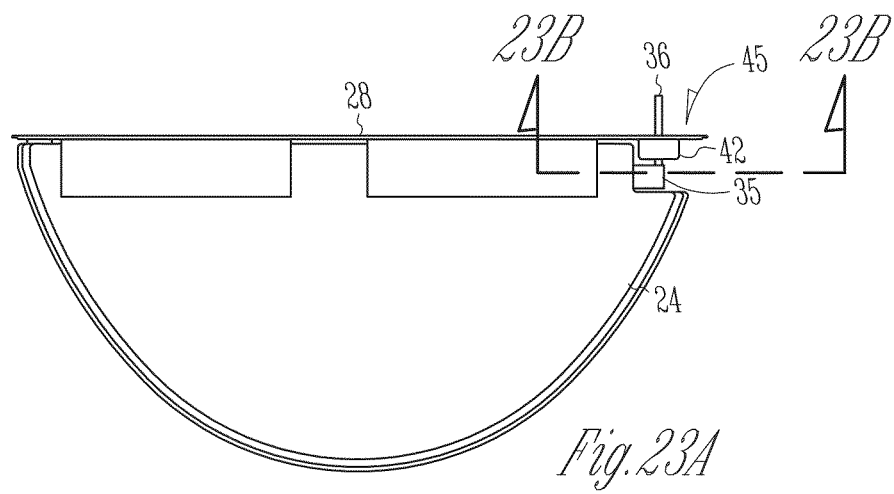
Fig. 23A
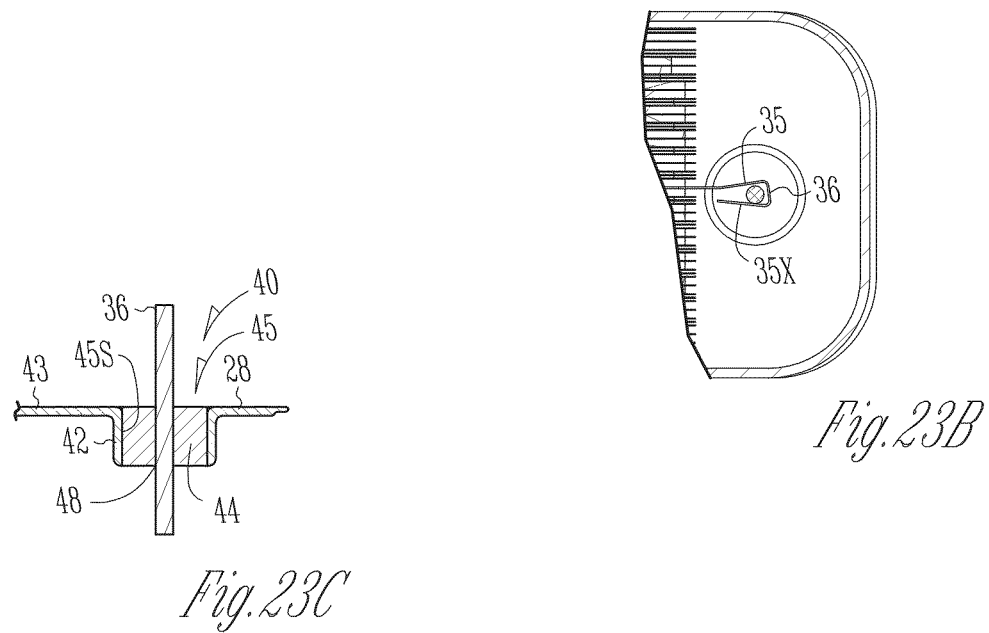
Fig. 23B
Fig. 23C

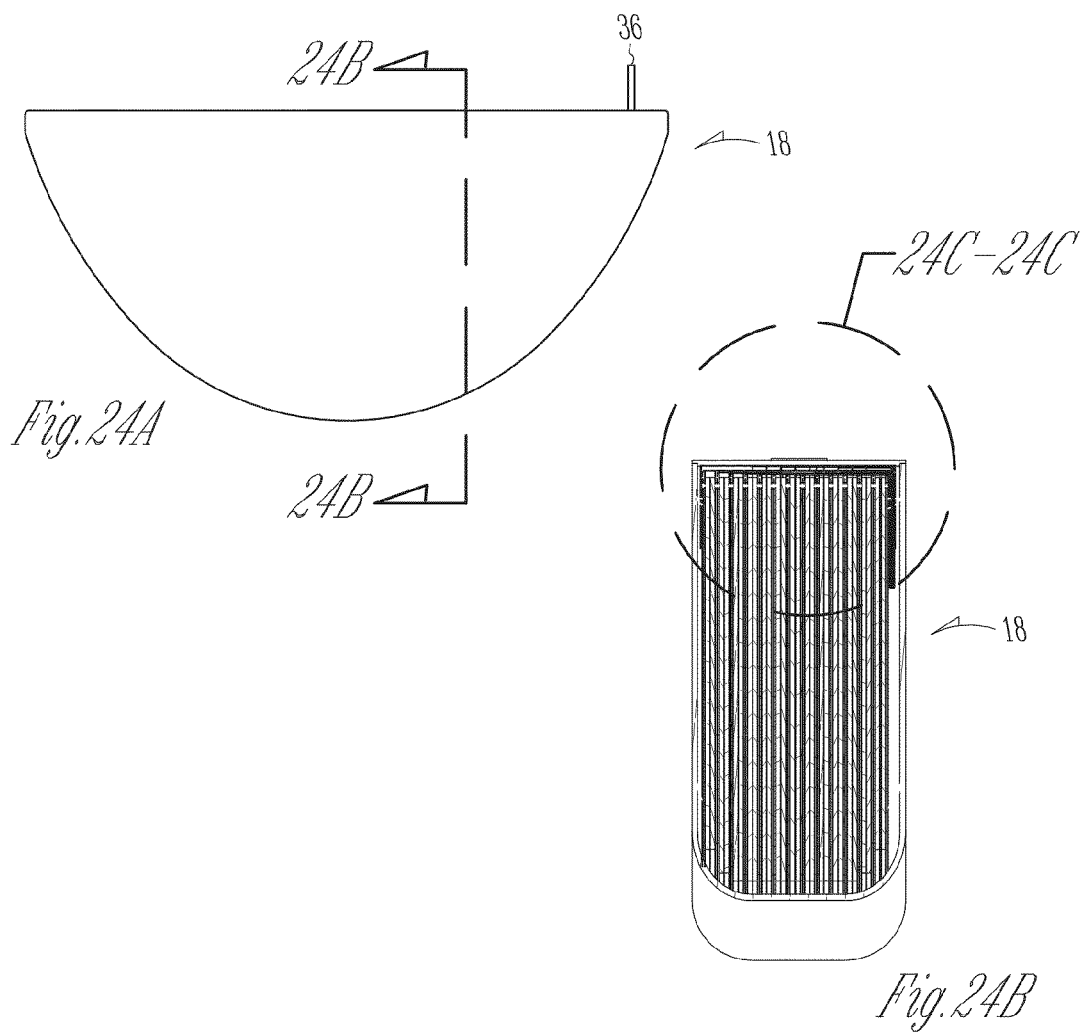
Fig.24A
Fig.24B
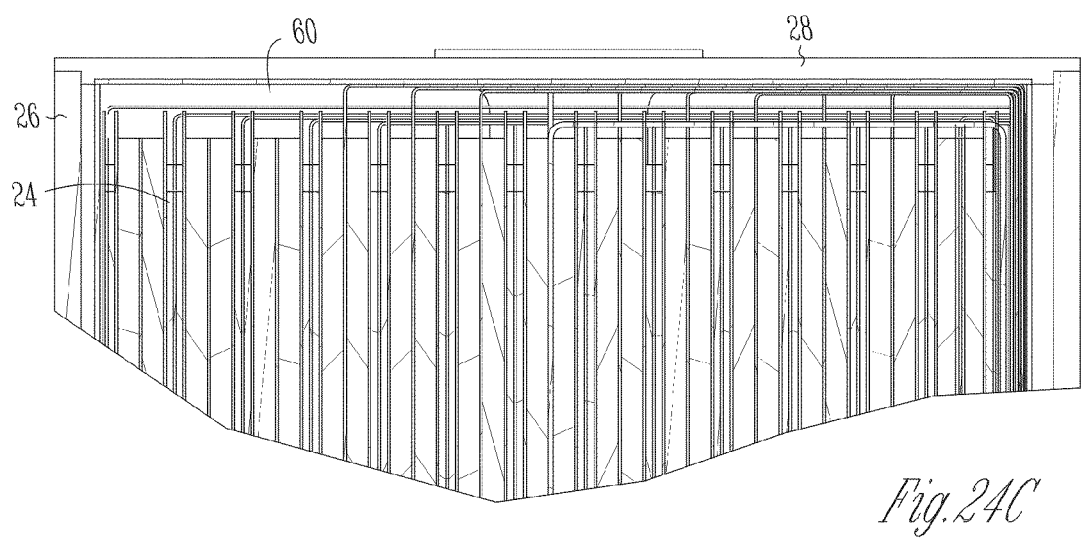
Fig.24C

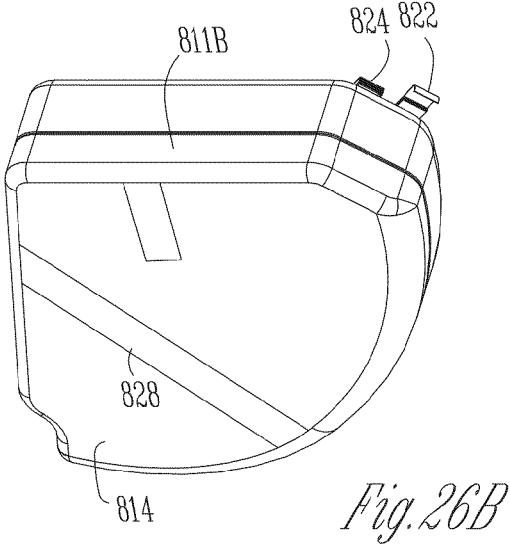
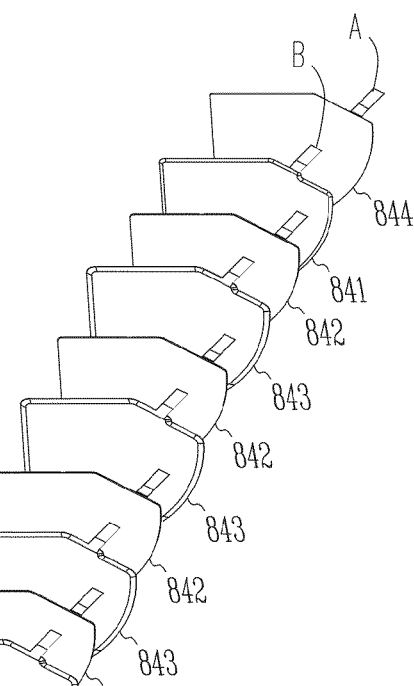
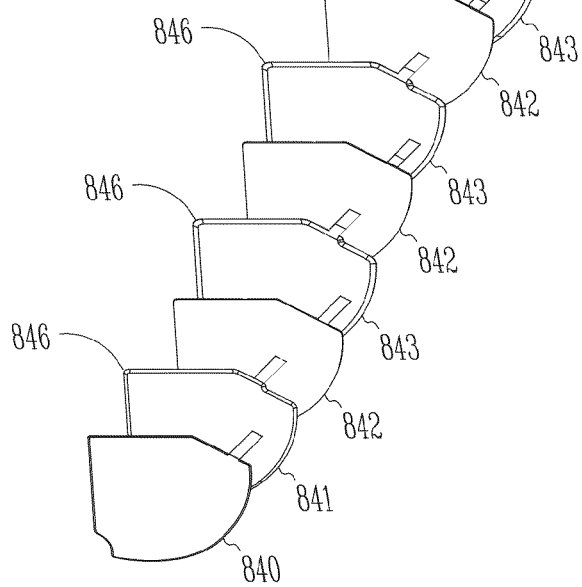
Fig.26B
Fig.27

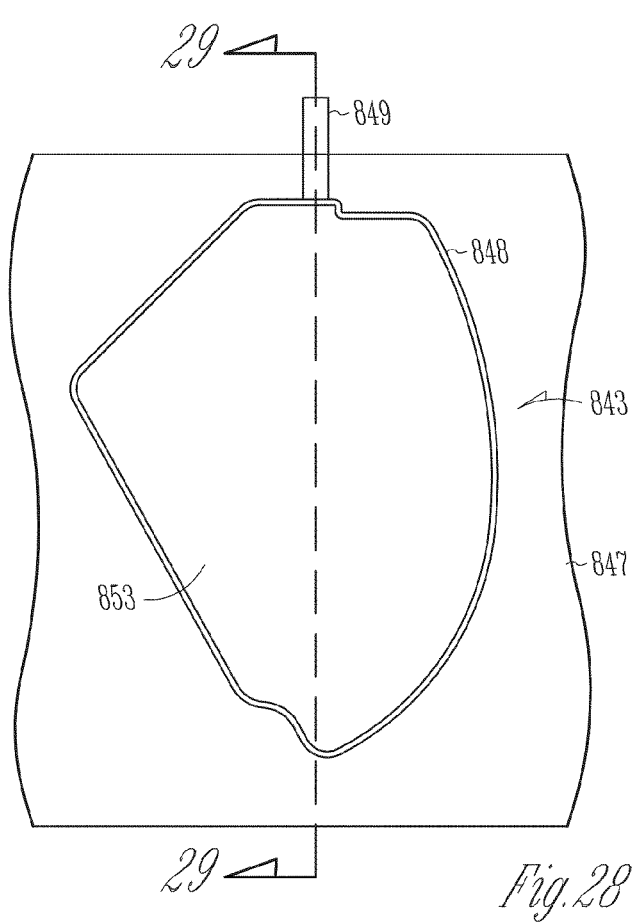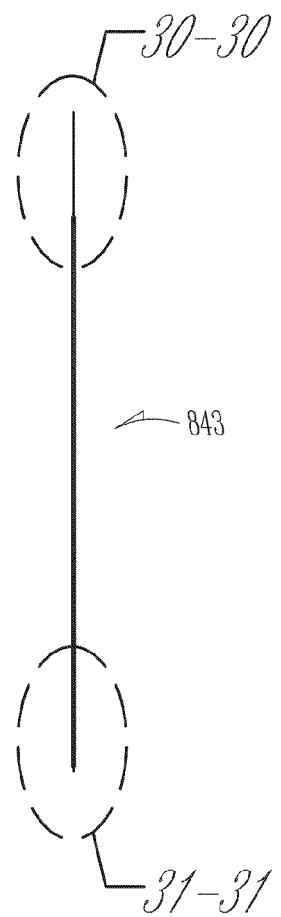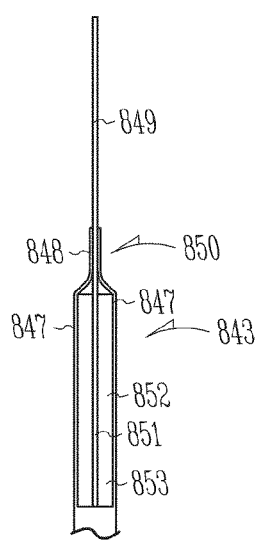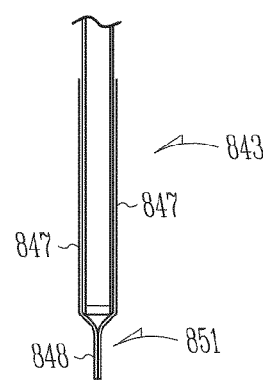
Fig.28
Fig.29
Fig.30
Fig.31

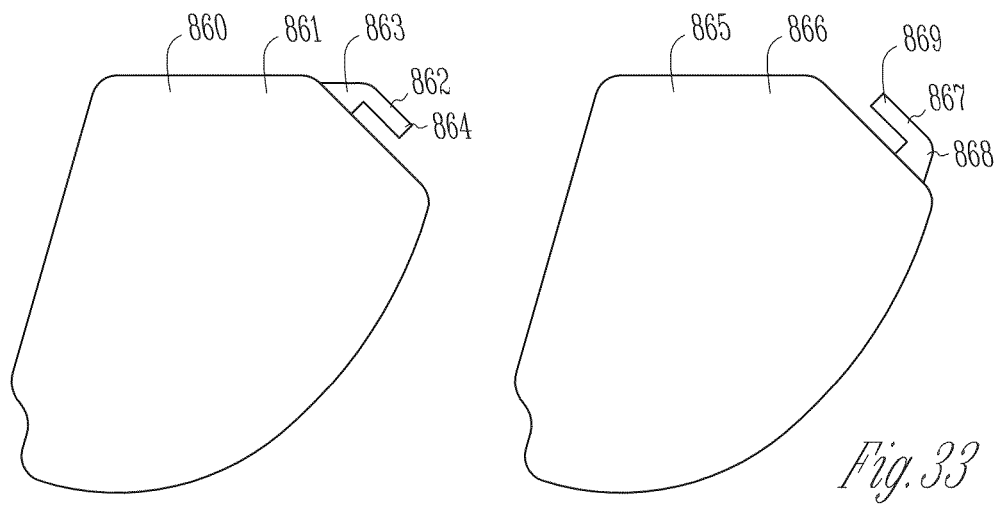
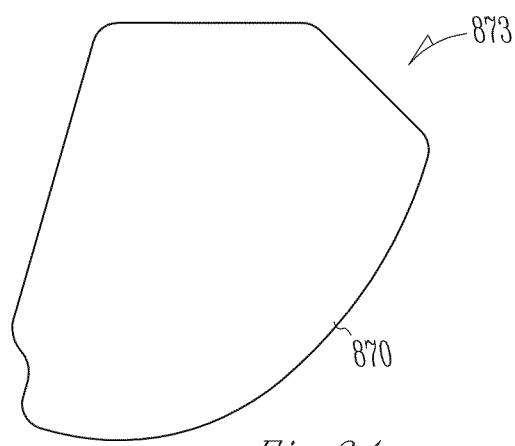
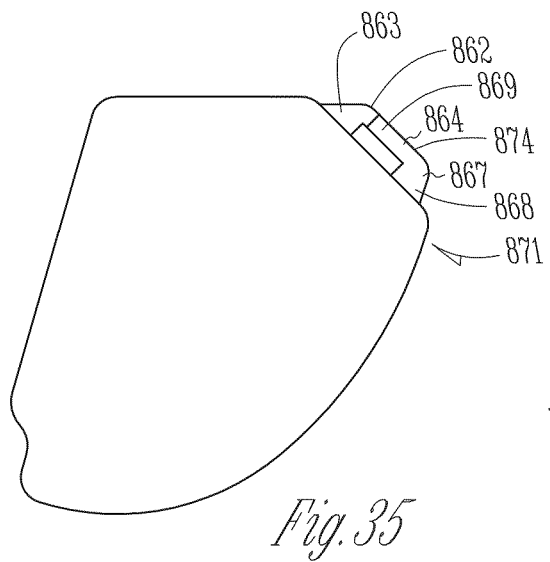

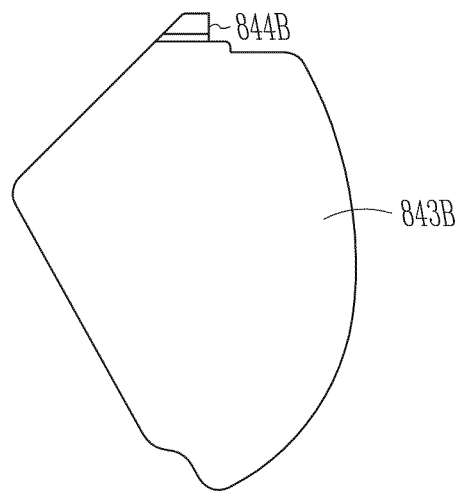
Fig.36B
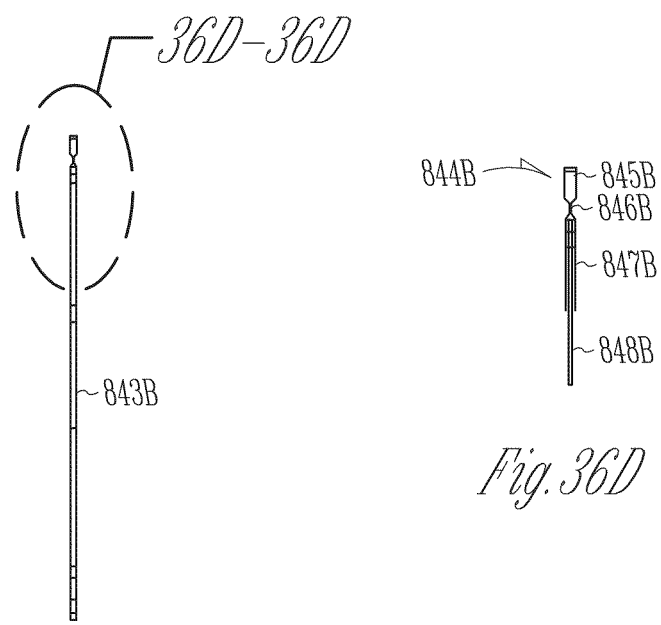
Fig.36C
Fig.36D

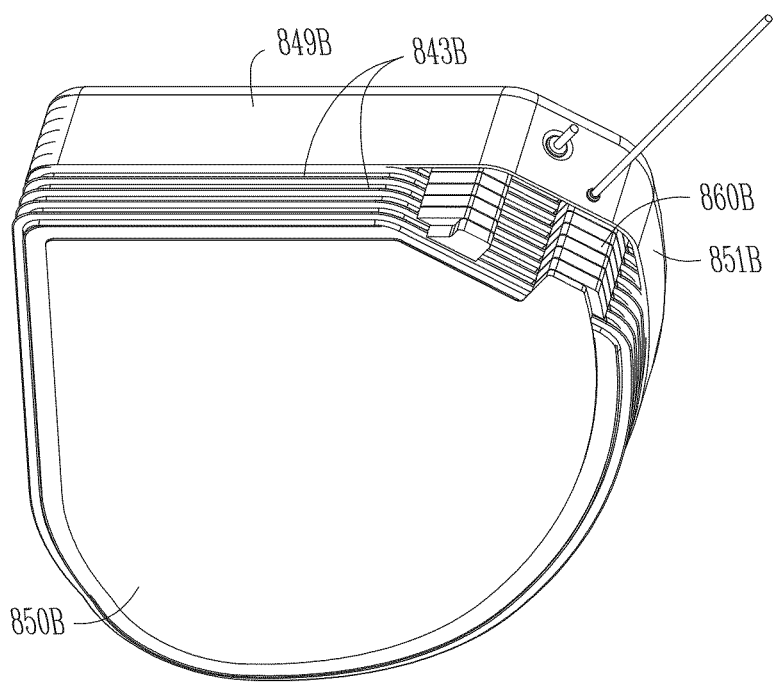
Fig. 36E
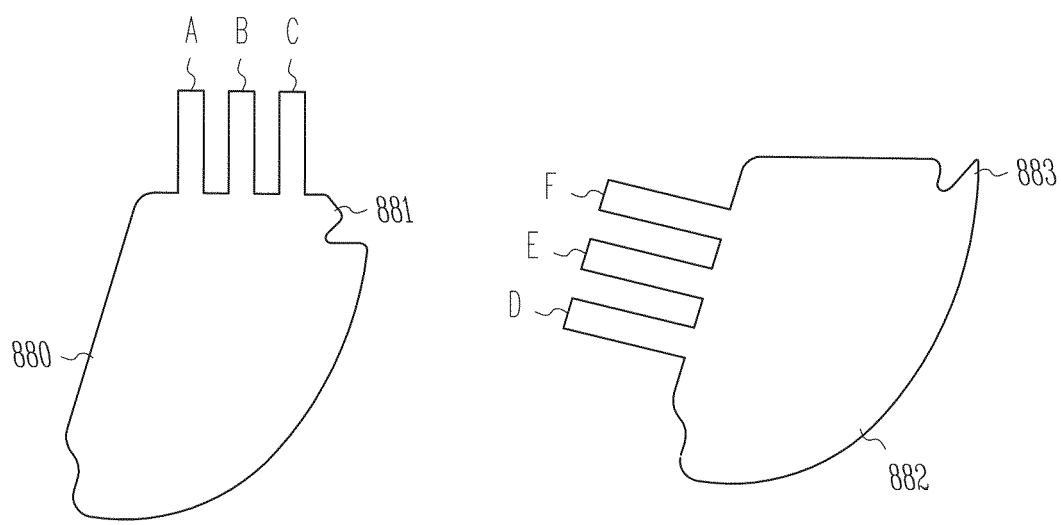
Fig. 37
Fig. 38

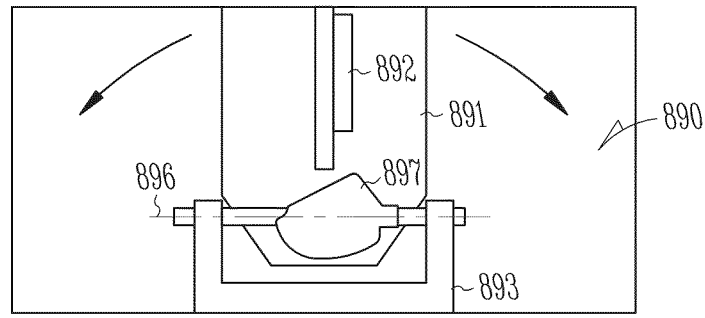
Fig. 42
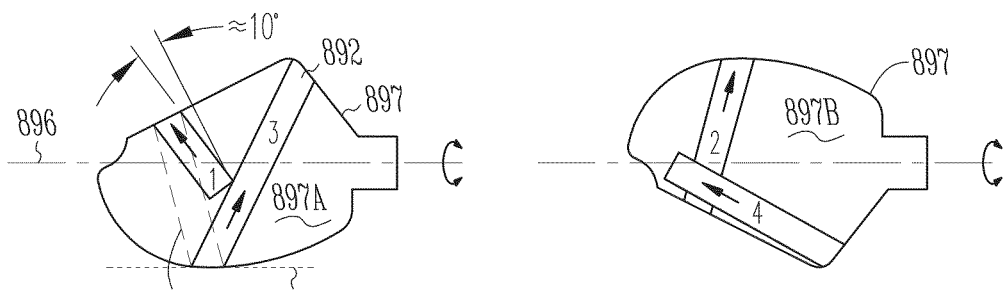
Fig. 43A
Fig. 43B
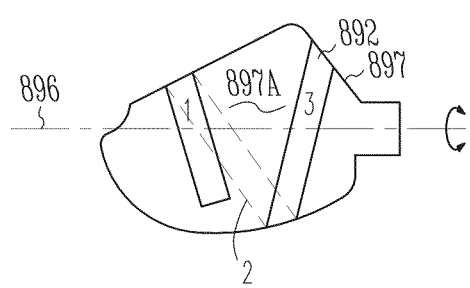
Fig. 44A
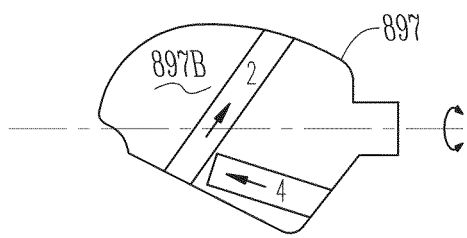
Fig. 44B

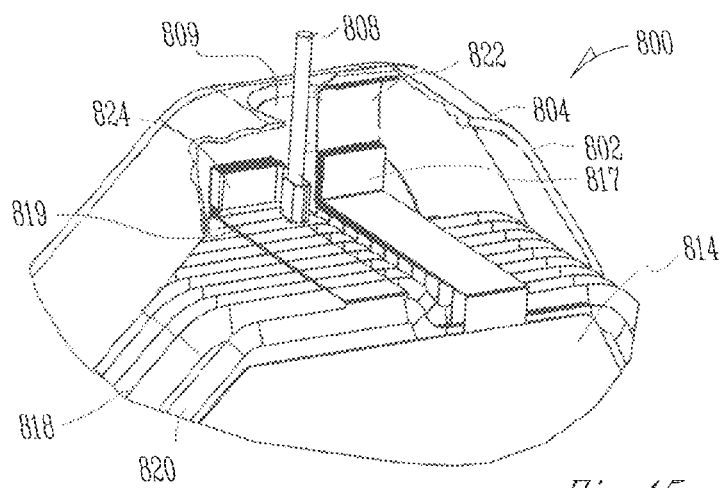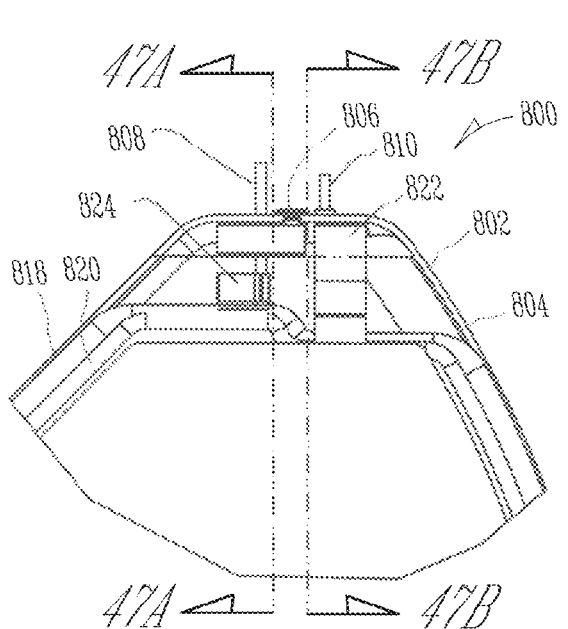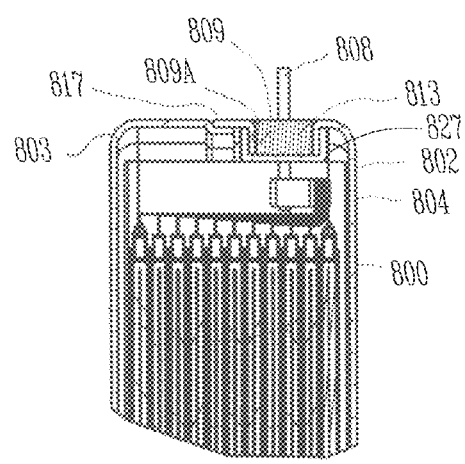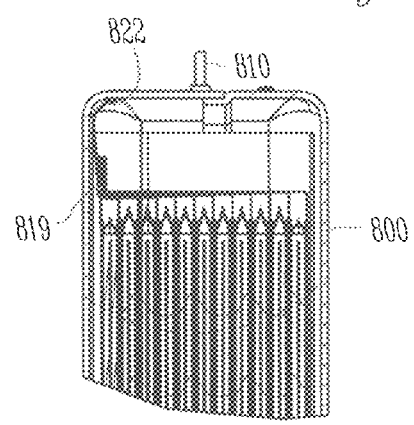

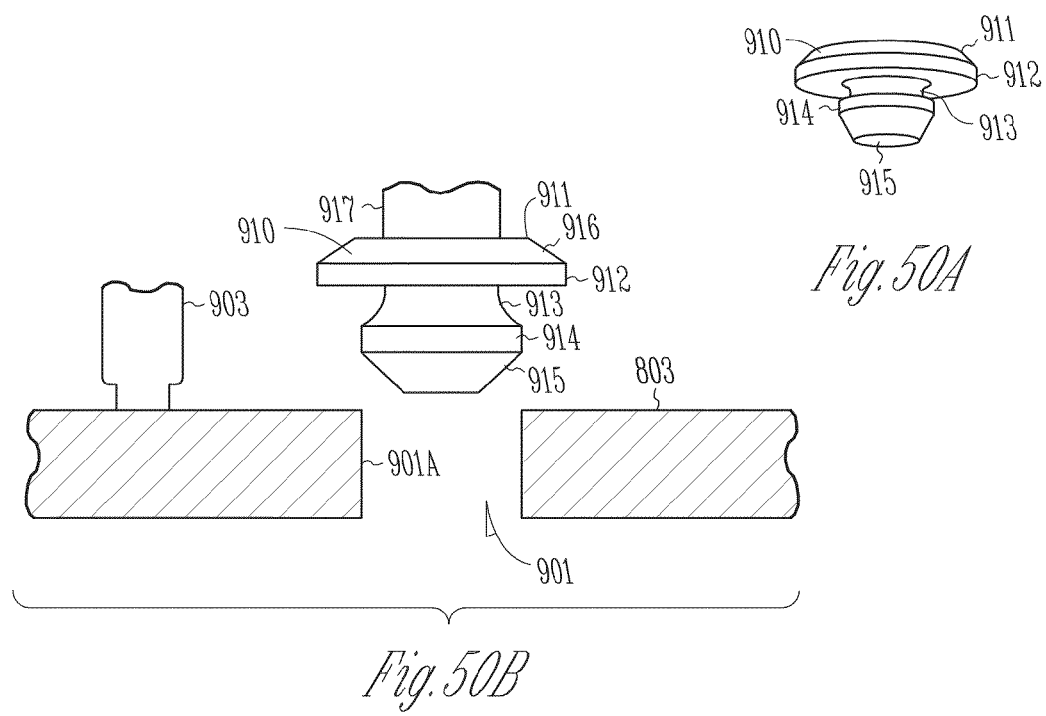
Fig. 50A
Fig. 50B
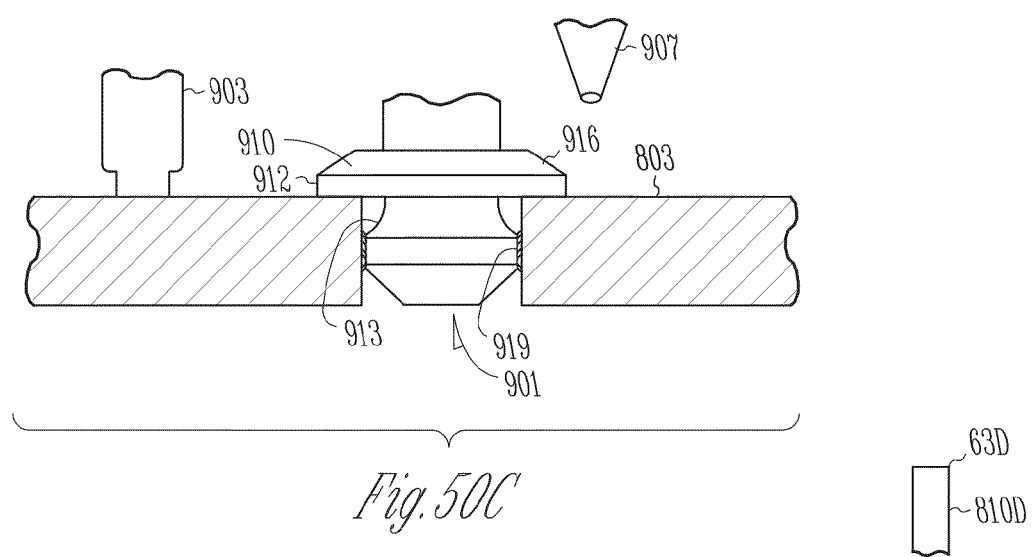
Fig. 50C
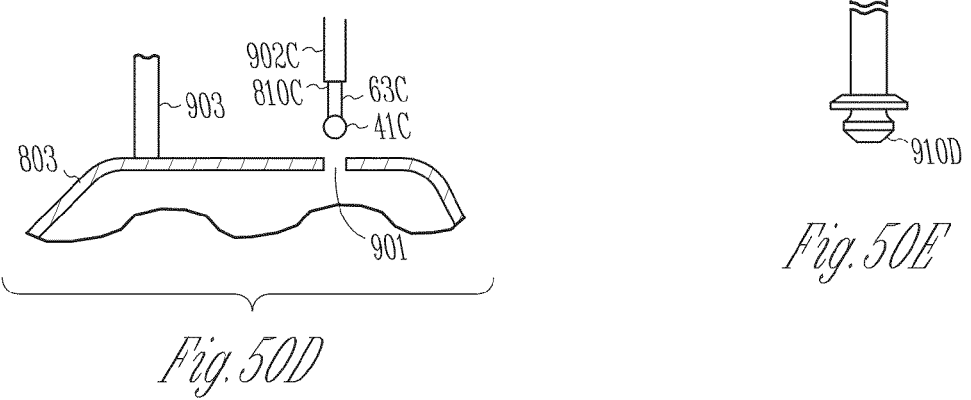
Fig. 50D
Fig. 50E

BATTERIES INCLUDING A FLAT PLATE DESIGN

CROSS REFERENCE TO RELATED APPLICATIONS

This application is a divisional of U.S. application Ser. No. 12/355,242, filed Jan. 16, 2009, which is a divisional of U.S. application Ser. No. 10/360,551, filed Feb. 7, 2003, now issued as U.S. Pat. No. 7,479,349, which claims the benefit under 35 U.S.C. 119(e) of U.S. Provisional Application Ser. No. 60/437,537 filed Dec. 31, 2002, the specifications of which are hereby incorporated by reference in their entirety.

TECHNICAL FIELD

The present invention concerns implantable medical devices, such as defibrillators and cardioverters, and more specifically to a battery for such devices.

BACKGROUND

Patients prone to irregular heart rhythms sometimes have miniature heart devices, such as defibrillators and cardioverters, implanted in their bodies. These devices detect onset of abnormal heart rhythms and apply corrective electrical therapy to the heart. The defibrillator or cardioverter includes a set of electrical leads, which extend from a device housing into the heart. Within the device housing are a battery for supplying power, circuitry for detecting abnormal heart rhythms, and a capacitor for delivering bursts of electric current through the leads to the heart. Since defibrillators and cardioverters are typically implanted in the left region of the chest or in the abdomen, a smaller size device, which is still capable of delivering the required level of electrical energy, is desirable.

The basic components that make up a battery are an anode, a cathode, a separator between the anode and the cathode, electrolyte, and packaging hardware such as the case. Batteries can be of a wound, jellyroll, style of design that may be cylindrical or flattened cylindrical in shape. Some designs fold the battery components on top of one another.

The anodes and cathodes of the battery are opposed to each other throughout the battery. This continuous opposition requirement creates packaging inefficiencies, such as wasted volume at bend lines or, in the wound configuration, the mandrel volume itself. Moreover, these folded or wound design approaches are limited to simple cross-sectional areas due to the manufacturing constraints of producing such a battery cell. It is desirable to improve the packaging efficiency of the battery particularly for medical implantable devices, since this will provide a smaller battery. Also, consistency from one battery to the next is a desirable feature for implantable medical devices. A heightened consistency allows the battery=s life-cycle to be predictable and allows the battery to be replaced at an opportune time without emergency.

BRIEF DESCRIPTION OF DRAWINGS

FIG. 23A shows a side view of the battery stack and battery case lid of FIG. 1.

FIG. 23B shows a cross-section of the battery stack of FIG. 23A.

FIG. 23C shows a cross-section of the feedthrough assembly of the battery of FIG. 23A.

FIG. 24A shows a side view of a battery according to one embodiment.

FIG. 24B shows a cross-section of the battery of FIG. 24A.

FIG. 24C shows a close-up detail of the cross-section of FIG. 24B.

FIG. 26B shows a battery stack according to one embodiment.

FIG. 27 shows an exploded view of a battery stack according to one embodiment.

FIG. 28 shows a top view of a cathode within a sealed separator, according to one embodiment.

FIG. 29 is a side view of a cathode sealed within a separator according to one embodiment.

FIG. 30 shows a side view of a detail of the upper portion of the cathode of FIG. 29.

FIG. 31 shows a side view of a detail of the lower portion of the cathode of FIG. 29.

FIG. 32 shows a top view of a cathode for a battery stack according to one embodiment.

FIG. 33 shows a top view of an anode for a battery stack according to one embodiment.

FIG. 34 shows a top view of a separator for a battery stack according to one embodiment.

FIG. 35 shows a top view of a battery stack having the cathode, anode, and separator of FIGS. 32-34.

FIG. 36A shows a top view of the extension members of the battery stack of FIG. 35.

FIG. 36B shows a top view of a cathode according to one embodiment.

FIG. 36C shows a side view of the cathode of FIG. 36B.

FIG. 36D shows a detail view of FIG. 36C.

FIG. 36E shows a partial perspective view of a battery according to one embodiment.

FIG. 37 shows a top view of a cathode layer according to one embodiment.

FIG. 38 shows a top view of an anode layer according to one embodiment.

FIG. 42 shows a top view of the taping fixture of FIG. 41.

FIGS. 43A and 43B show top views of an example battery stack being taped according to one embodiment.

FIGS. 44A and 44B show top views of an example battery stack being taped according to one embodiment.

FIG. 45 shows a partial cut-away view of the terminal connections of a battery according to one embodiment.

FIG. 46 shows a partial top view of a battery according to one embodiment.

FIG. 47A shows a section view of FIG. 46.

FIG. 47B shows another section view of FIG. 46.

FIG. 50A shows a backfill plug for a battery according to one embodiment.

FIGS. 50B and 50C show a backfill plug welding technique according to one embodiment.

FIG. 50D shows a backfill plug terminal for a battery according to one embodiment.

FIG. 50E shows a backfill plug terminal for a battery according to one embodiment.

DESCRIPTION OF EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
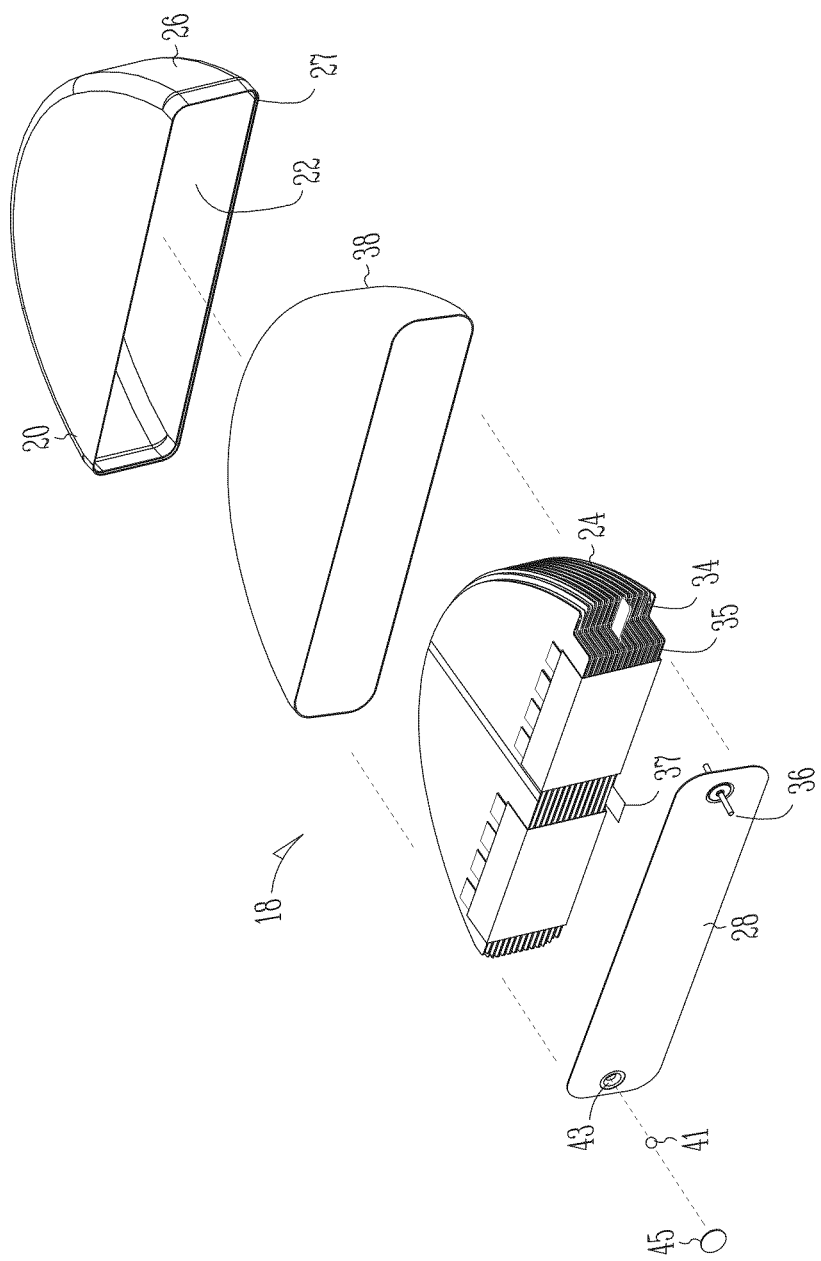
FIG. 1 is an exploded perspective view of a flat battery according to one embodiment.

FIG. 1 shows an exploded view of a battery 18 according to one embodiment. The present embodiment shows a D-shaped battery. In other embodiments, battery 18 can be designed in a variety of flat shapes to conform to various housing shapes. The discussion herein provides techniques to manufacture a battery having virtually any arbitrary shape, such as rectangular or non-rectangular. Moreover, the edges of the battery can be curved to allow the battery to fit in a shape-friendly curved case, as will be detailed below. The battery includes a metallic case 20 defining a chamber 22 which holds a battery stack 24. In one embodiment, case 20 is manufactured from a conductive material, such as stainless steel. In another option, the case 20 is manufactured using a nonconductive material, such as a ceramic or a plastic.

Case 20 includes a base 26 and a lid 28 positionable on an upper rim 27 of base 26. Battery stack 24 has a cutout region 34 at its periphery, with cutout region 34 being positioned when the stack 24 is installed in case 20 to provide space for electrical connections. A feedthrough post 36 passes through lid 28 to stack 24 and is electrically insulated from case 20 and lid 28. Feedthrough post 36 is connected to a cathode tab 35, while an anode tab 37 is directly attached between lid 28 and base 26 such that the case itself acts as the anode terminal. In some embodiments, these roles are reversed and the cathode tab is connected to the case and the anode tab connects to a feedthrough. In some embodiments, two feedthroughs are provided, one for the anode and one for the cathode. Battery stack 24 is covered with insulating member 38 when mounted within case 20. Other embodiments of insulating members, such as member 38, will be discussed below. In one embodiment, a backfill port 43 is located in the battery case. A backfill plug 41 and an optional cover 45 seal the backfill port after the battery case is filled with electrolyte.

Battery stack 24 is constructed to provide optimal power storage in a small space and allows for a battery having almost any arbitrary shape or form factor. This allows battery 18 to be designed and dimensioned to fit within an implantable medical device, for example, and take up as little volume within the device as possible. In one embodiment, stack 24 includes a plurality of alternating anode and cathode layers separated by separators. As will be detailed below, these alternating electrode layers are stacked, aligned, and interconnected to allow for maximal electrode area in a minimal volume with minimal wasted space. For example, in one embodiment, battery 18 includes a layered stack of electrodes where the interconnections between layers are spread out so as to minimize the interconnection volume.

Figure 2:
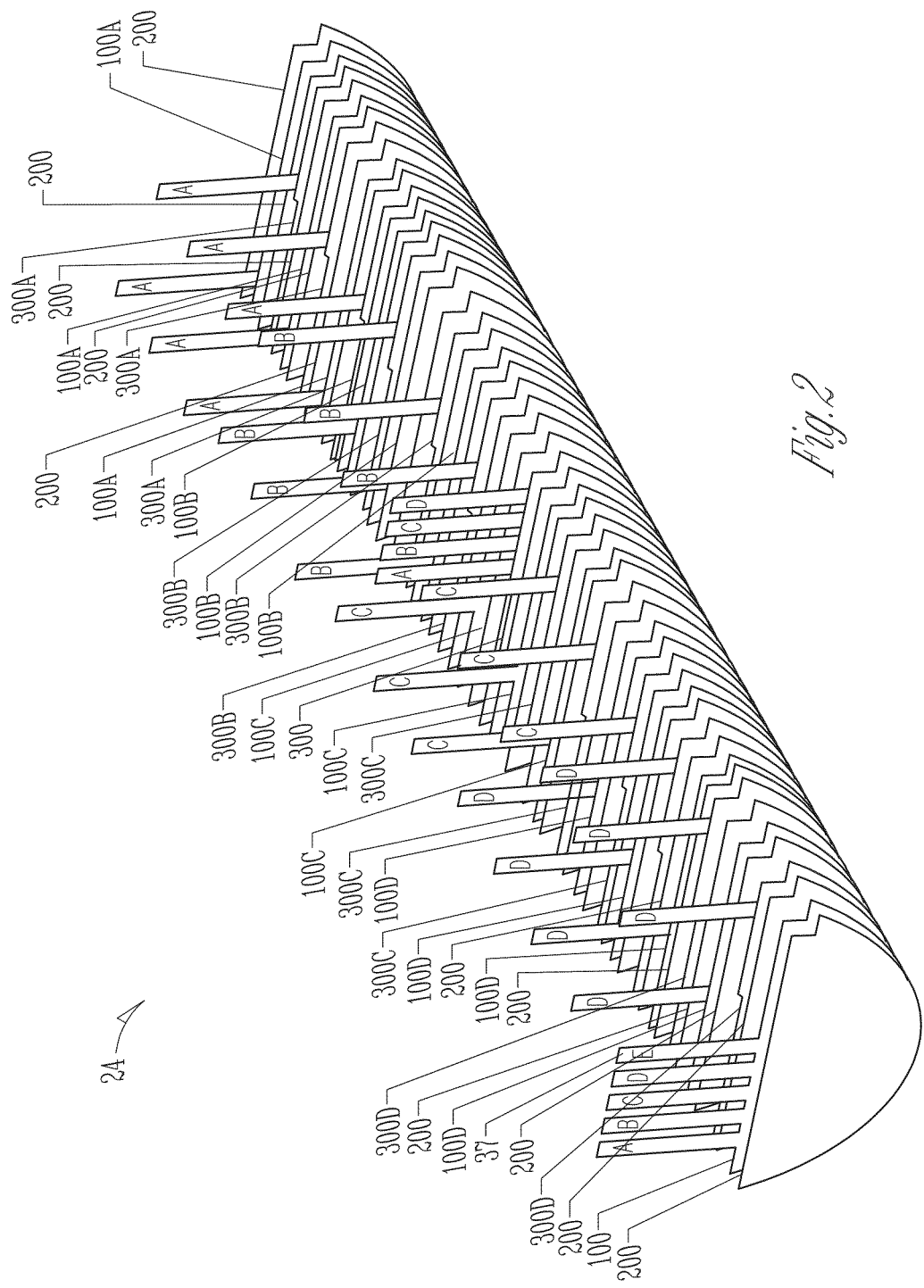
FIG. 2 is an exploded perspective view of the battery stack of FIG. 1.

FIG. 2 illustrates an exploded view of battery stack 24 according to one embodiment. Battery stack 24 includes an anode assembly including a plurality of anode sub-assemblies 100-100D and a cathode assembly including a plurality of cathode sub-assemblies 300-300D, with separator layers 200 interposed between each of the sub-assembly layers. This flat, stacked, layered structure omits the wasted mandrel volume of wound batteries and the wasted edge fold volume of folded batteries. Moreover, the flat, discrete layers allow the battery designer to make the stack almost any shape desirable. This allows a medical device designer to choose a battery which can accommodate a given space within the medical device.

One anode sub-assembly is a base, manifold anode collector layer 100 which includes one or more tabs (A-E) extending from an edge of the anode layer body. Other anode sub-assembly layers in stack 24 include secondary anode collectors 100A-100D, which each include an extension tab, designated A-D, respectively. In this example, secondary anode sub-assembly collectors 100A each have a tab A which overlays and is aligned with base anode layer 100=s tab A. In a likewise manner, secondary anode sub-assembly collectors 100B-100D each include an extension tab (B-D, respectively) which vertically matches or overlays and aligns upon base layer 100 tabs B-D respectively. In this embodiment, base layer 100 tab E includes tab 37 which connects the anode assembly to the battery case (FIG. 1). By spreading the anode interconnections to base layer 100 out over four separate areas, the overall thickness required by the interconnections is lessened and less space is needed between stack 24 and case 20 (FIG. 1).

The cathode assembly of battery 24 includes a base, manifold cathode collector layer 300 which includes one or more tabs (A-D) extending from an edge of the cathode layer body. Other cathode sub-assembly layers in stack 24 include secondary cathode collectors 300A-300D, which each include an extension tab, designated A-D, respectively. In this example, secondary cathode sub-assembly collectors 300A each have a tab A which overlays and is aligned with base cathode layer 300=s tab A. In a likewise manner, secondary cathode sub-assembly collectors 300B-300D each include an extension tab (B-D, respectively) which overlies and aligns upon base layer 300 tabs B-D respectively. In this embodiment, base layer 300 includes tab 35 which connects the cathode assembly to feedthrough 36 (FIG. 1). Again, by spreading the cathode interconnections to base layer 300 out over four separate areas, the overall thickness required by the interconnections is lessened and less space is needed between stack 24 and case 20 (FIG. 1).

Each separator 200 separates an anode sub-assembly 100-100D from a cathode sub-assembly 300-300D. Each separator 200 includes a first edge 251, a clearance area defined by a second edge 252, and a flat edge 253. The clearance area of separator 200 allows for interconnections to the feedthrough. Separator 200 is, in one option, made from a roll or sheet of separator material. Suitable materials for the separator material include, but are not limited to, a polyethylene, such as Tonen™, or a trilayer (polypropylene, polyethylene, polypropylene) separator material such as Celgard™ 2325, for example. Other chemically inert materials are suitable as well, such as porous polymeric materials. In one embodiment, each separator layer 200 is cut slightly larger than the anode layers (or cathode layers) to accommodate misalignment during the stacking of layers, to prevent subsequent shorting between electrodes of opposite polarity, and to act as an outermost edge for alignment.

Figure 3:
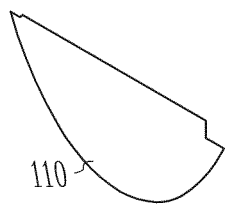
FIG. 3 is a perspective view of an anode according to one embodiment.

FIGS. 3-8 show further details of an anode assembly of stack 24 according to one embodiment. FIG. 3 shows an anode material 110. In this example anode 110 is a lithium (Li) anode. Each anode sub-assembly 100-100D includes either one or two anodes 110 on the major surfaces of the sub-assembly. In various embodiments, the anode material 110 can be pressed into a mesh or etched base layer, or onto the surface of a base layer, or be of pure Lithium and have no base layer. In one example, a sheet of Lithium is attached to a base layer and then die cut to the desired shape.

Figure 4A:
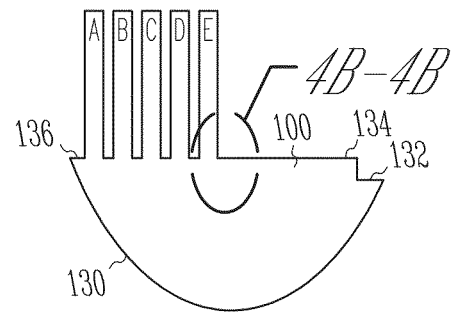
FIG. 4A is a front view of an anode collector manifold according to one embodiment.
Figure 5:
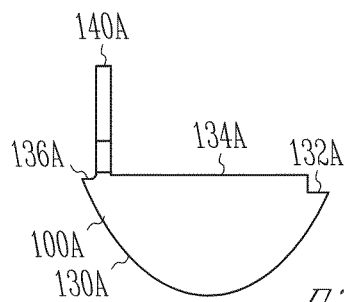
FIG. 5 shows a front view of an anode collector according to one embodiment.
Figure 4B:
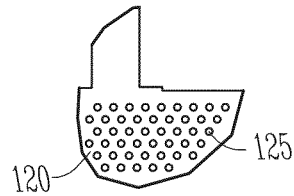
FIG. 4B shows a detailed portion of the anode collector manifold of FIG. 4A.
Figure 6:
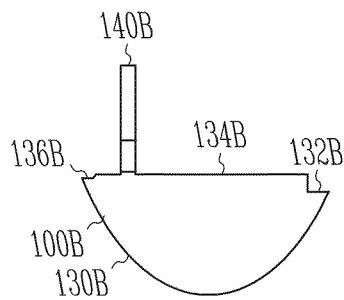
FIG. 6 shows a front view of an anode collector according to one embodiment.
Figure 7:
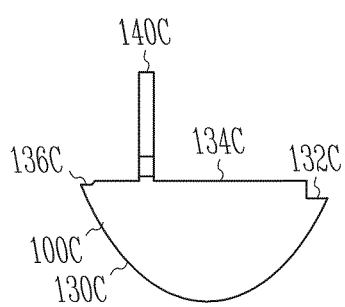
FIG. 7 shows a front view of an anode collector according to one embodiment.
Figure 8:
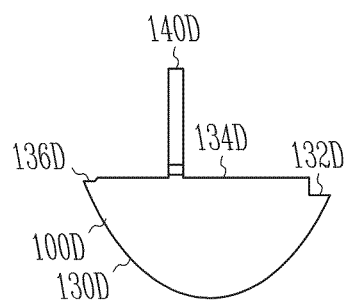
FIG. 8 shows a front view of an anode collector according to one embodiment.

FIG. 4A shows base manifold anode collector layer 100. Collector layer 100 includes an outer edge 130, a cut-out 132, an upper flat edge 134, and an edge 136. The base layer 100 also includes extension tabs A-E. In one embodiment, each extension tab A-E is integral to layer 100. Some embodiments attach separate tabs A-E to layer 100. FIG. 4B shows a detail of base layer 100. In one embodiment, layer 100 is formed of a main body 120 including a stainless steel material, such as 316L SST, or a nickel material. A plurality of holes 125 are optionally incorporated into the stainless steel material. One or two anodes 110 (FIG. 3) are attached to the major surfaces of body 120. Tabs A-E (FIG. 4A) are not covered with anode material. In one embodiment, the anodes can be formed by attaching strips of Lithium to one or both sides of strips of stainless steel, leaving an edge open along a portion of the stainless steel strip for the tabs. One or more anode parts of desired shape are then excised from the strip.

FIGS. 5-8 show anode sub-assemblies 100A-100D. Each of these secondary anode layers includes an outer edge 130, a cut-out 132, an upper flat edge 134, and an edge 136 designated by the corresponding letters A-D in the respective Figures. Each layer also includes a tab 140A-140D, respectively, with the tab of each separate layer being offset from the previous and subsequent layers.

Figure 9:
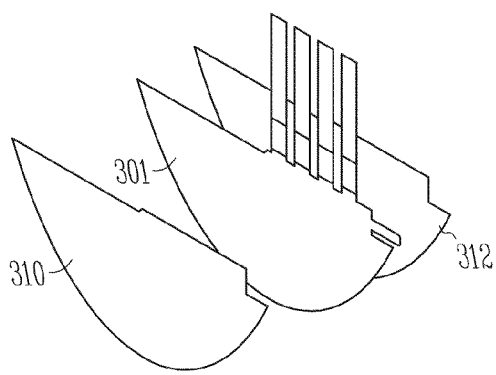
FIG. 9 shows an exploded view of a cathode assembly according to one embodiment.

FIGS. 9-14 show further details of a cathode assembly according to one embodiment. FIG. 9 shows an exploded view of a cathode sub-assembly having a metal collector sheet 301 and a cathode material 310 on one major surface and a cathode material 312 on a second major surface. In one embodiment, cathodes 310 and 312 are $MnO_2$ (manganese dioxide). One mix ratio is about 90% $MnO_2$, 5% PTFE, and 5% carbon. Another embodiment provides a mix ratio of 90% $MnO_2$, 5% binder, and 5% carbon or graphite. In one example, the cathode material can be a powder which is pressed into a mesh base layer. In one embodiment, a cathode paste can be provided which can be laminated, pressed, rolled, or otherwise mounted onto the surface of a base layer, as will be detailed below. In various examples, the cathode material can be a powder, paste, or adhered slurry.

Figure 10:
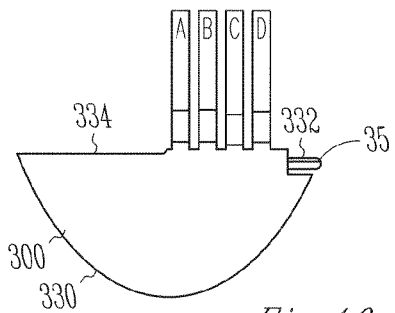
FIG. 10 is a front view of a cathode collector manifold according to one embodiment.

FIG. 10 shows base manifold cathode collector 300. Collector 300 includes an outer edge 330, cut-out 332 having tab 35 therein, and upper flat edge 334. Collector layer 300 also includes four extension tabs A-D.

Figure 11A:
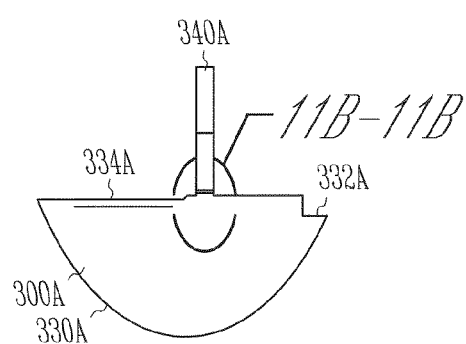
FIG. 11A shows a front view of a cathode collector according to one embodiment.
Figure 11B:
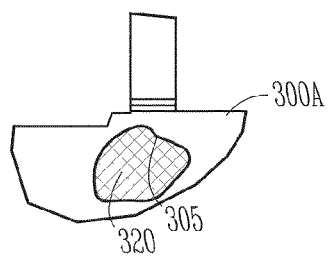
FIG. 11B shows a detailed portion of the cathode collector of FIG. 11A.

FIG. 11A shows cathode sub-assembly secondary layer 300A having outer edge 330A, cut-out 332A, and flat edge 334A. A tab 340A extends from edge 334A. FIG. 11B shows a detail of collector 300A. In this embodiment, collector 300A is formed of a main body 320 including a stainless steel sheet. A plurality of diamond structures 305 are incorporated into the main body by etching, an expanded metal process, by a mechanical process, or by laser, for example. One or two cathodes 310 and 312 (FIG. 9) are attached to the major surfaces of body 320. Tab 340A is not covered with cathode material. In one embodiment of forming the cathodes, a layer of a paste or slurry is applied to one or both sides of a stainless steel base layer, the strip is rolled or pressed to meter and attach the cathode material to the base layer, and then one or more cathodes are excised from the strip. In one example, the cathode layer is applied leaving the cathode tabs bare.

Figure 12:
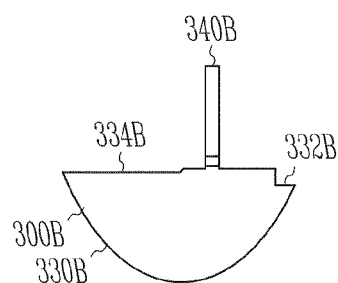
FIG. 12 shows a front view of a cathode collector according to one embodiment.
Figure 13:
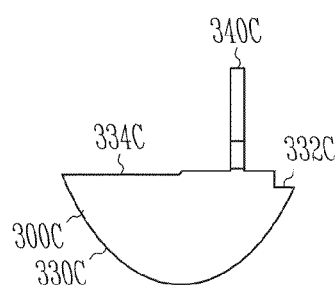
FIG. 13 shows a front view of a cathode collector according to one embodiment.
Figure 14:
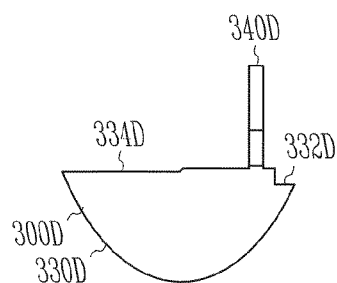
FIG. 14 shows a front view of a cathode collector according to one embodiment.

FIGS. 12-14 show secondary cathode sub-assembly layers 300B-300D, respectively. Each secondary cathode layer includes an outer edge 330, cut-out 332 and upper flat edge 334 shown by the corresponding letters B-D in the respective Figures. Each layer also includes a tab 340B-340D, respectively, with the tab of each separate layer being offset from the previous and subsequent layers.

Again, each anode tab 140A-140D and each cathode tab 340A-340D corresponds to a tab A-D on either the base anode layer 100 or the base cathode layer 300.

Also, these spread out interconnections of the anodes and cathodes decrease the overall thickness of the space between the stack and the case, allowing for a smaller battery size. To ensure that a battery stack takes up as little volume as possible and to optimize the consistency between each battery being manufactured, it is important to carefully align each layer of the battery stack when constructing the stack. In one embodiment, battery stack 24 described above is aligned using an alignment fixture to provide for optimal surface area of the battery.

Figure 15:
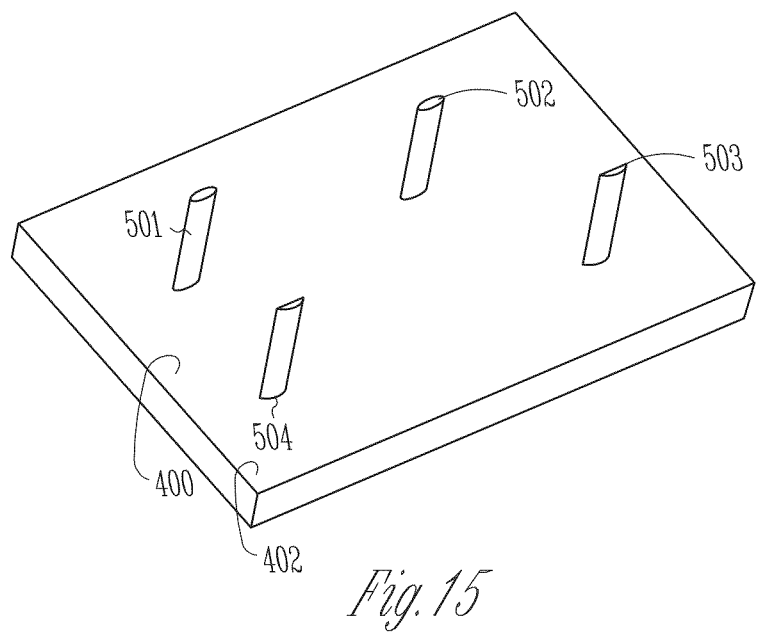
FIG. 15 shows a perspective view of an alignment fixture for constructing a battery stack according to one embodiment.

FIG. 15 illustrates an alignment mechanism or fixture 400 used to assemble battery stack 24, in accordance with one embodiment. Alignment mechanism 400 includes a plurality of precisely placed alignment elements 501-504. Alignment elements 501-504 are vertically oriented alignment elements which extend from a base 402. Base 402 supports battery components thereon, while the alignment elements 501-504 align the battery layers while the layers are being stacked therein.

Figure 16:
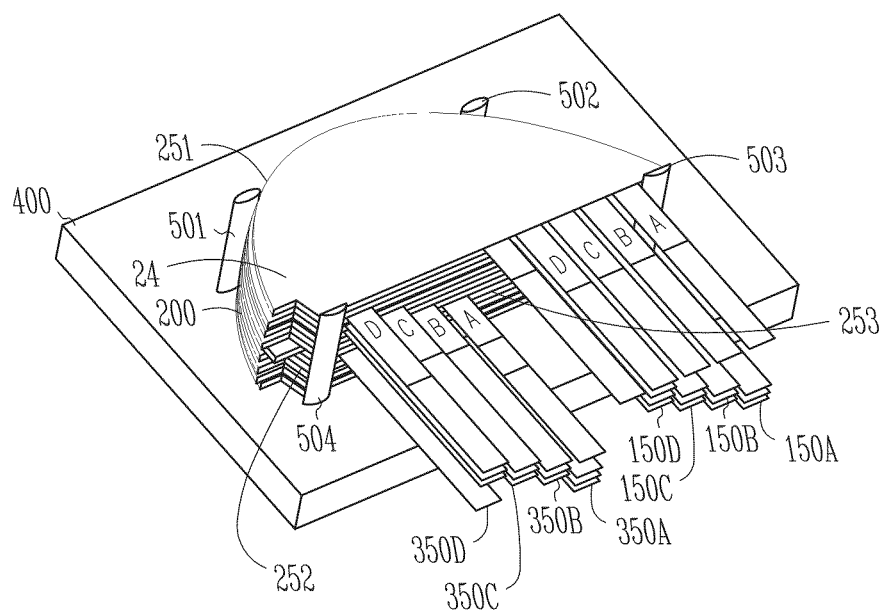
FIG. 16 is a perspective view of a battery stack within the fixture of FIG. 15.
Figure 17:
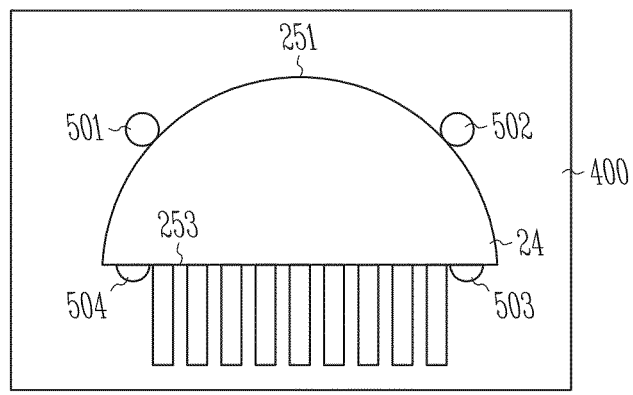
FIG. 17 is a top view of FIG. 16.

FIGS. 16-17 show one example use of alignment fixture 400. FIG. 16 shows a perspective view of stack 24 within the fixture and FIG. 17 illustrates a top view of battery stack 24 within fixture 400. Battery stack 24 includes a plurality of discrete electrode layers with each layer aligned relative to the position of the alignment elements 501-504. A channel can be provided in base 402 to hold a fastener for wrapping around a portion of the battery stack 24 once it has been stacked and aligned. In one example, a tool can be inserted into the channel to clamp the stack and remove it for taping. Precise alignment of battery stack 24 is maintained by the alignment elements 501-504 when wrapping the battery stack 24.

In one example, to align the layers of battery stack 24, a separator layer 200 is attached to each respective electrode layer of the stack. The separators 200 can dimensioned such that they slightly overhang the edges of each electrode layer. Each layer is then placed between alignment elements 501-504. One or more points on the outer perimeter edges (251-253, etc.) of each separator layer abut against each of the elements 501-504, precisely aligning that layer. This technique helps to reduce variances in alignment which may result from varying tolerance stack ups between layers of the assembly and the alignment fixture used. Moreover, by using the outer edges, no area within the body of each layer is wasted by using alignment holes, for example.

In one embodiment, each separator layer 200 is aligned relative to the plurality of alignment elements 501-504 by placing the separator so that outer edge 251 and edge 253 extend to contact the alignment elements 501, 502, 503, and 504. In one example, the separator layer 200 is then attached to an anode assembly 100-100D or a cathode assembly 300-300D while the separator is positioned within the fixture. These sub-assembly layers are then put one by one into fixture 400 between elements 501-504. The edges of the separators 200 contact the elements 501-504 and align the electrode layers.

In one embodiment, each sub-layer or series of sub-layers are pressed to help reduce warpage and thus to reduce the overall height of the battery stack 24. A fastener 351 (FIG. 21) can be wrapped around a portion of the stack 24 to retain the alignment of the layers relative to one another. In one embodiment, the fastener includes a tape that is wrapped around a central portion of the battery stack 24. The battery stack 24 can then be clamped and annealed.

In some embodiments, the anode sub-assembly layers 100-100D and the cathode sub-assembly layers 300-300D are aligned relative to one another within case 20, instead of using the external alignment mechanism 400, and then are coupled to one another in the aligned position. For instance, an outer edge of a separator of the anode sub-assembly and an outer edge of a separator of a cathode sub-assembly can contact an interior surface of the case 20, and would be aligned therein.

Among other advantages, use of the alignment fixture described above provides for a battery making efficient use of space within the case, permits increased anodic and cathodic surface area, and increased capacity for a battery of a given set of dimensions. Variation in the outer dimensions of one battery stack 24 to another battery stack 24 is reduced because each is formed within alignment elements positioned the same manner. Moreover, dimensional variations in the battery stack resulting from variation in the reference points from case to case or alignment apparatus to alignment apparatus are eliminated. This provides improved dimensional consistency in production and allows for reduced tolerances between the battery stack and the battery case. This allows for more efficient use of space internal to the battery case.

Furthermore, multiple points can be used to make the alignment, reducing the effect of the tolerance stack up between the conductive layer or separator being aligned and the alignment element at any one position. This also facilitates for alignment of components which during certain steps in the manufacturing process have portions which extend beyond the dimensions defined by the case and are later formed to fit within the case.

The battery stack structure described above provides for greater cathodic/anodic surface area since, by aligning to the separator, the cathode/anode surface area is optimized by not having to provide extraneous alignment notches or other alignment features within or on the electrodes themselves which decrease the electrode surface area. However, in some embodiments, one or more features, such as holes or notches can be provided in the surface of each of cathode assembly 300-300D, anode assemblies 100-100D, and separators 200 allowing for internal alignment of the stack. For example, fixture 400 can include a central post and each layer is mounted over the central post such that each layer is registered.

Figure 18A:
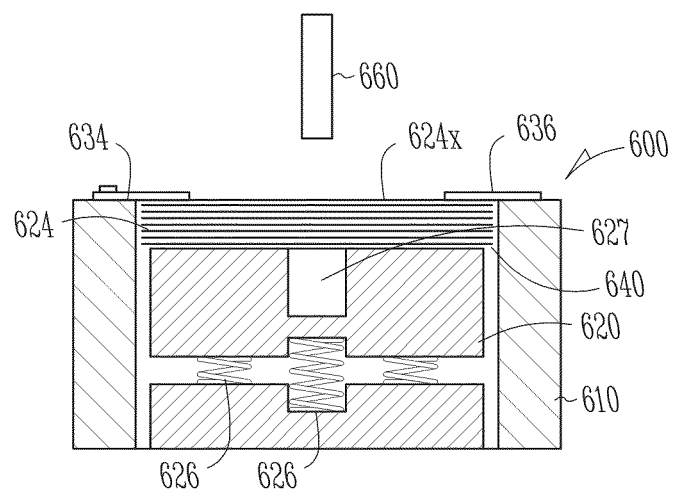
FIG. 18A shows a sectional front view of a stacking fixture for constructing a battery stack according to one embodiment.

FIG. 18A shows a sectional side view of an alignment mechanism 600 for forming a battery stack according to one embodiment. Alignment mechanism 600 generally includes a base 610, a base pad 620, and first and second upper members 634 and 636. In use, fixture 600 helps to continually keep all the layers of a battery stack 624 in compression as the battery stack is being formed. In one embodiment, as will be detailed below, as each separate layer of the battery stack is placed upon base pad 620, the base pad urges the stack upward while upper members 634 and 636 provide a holding, downward force on the stack such that the stack is squeezed between base pad 620 and upper members 634 and 636. This squeezing or compression holds each layer of the battery stack in the position in which it was placed on the stack, thus keeping the alignment of the battery stack.

Base 610 includes an interior cavity 640. In one embodiment, interior cavity 640 is shaped to accommodate base pad 620 therein to allow the base pad to translate up and down. Base pad 620 and cavity 640 are shaped to accommodate example battery stack 624. As noted above, flat batteries can be formed into almost any shape. Accordingly, base pad 620 can have almost any shape.

Base pad 620 includes a flat top surface for supporting a bottom surface of battery stack 624. In one embodiment, the surface area of the base pad surface is slightly larger than the surface area of the battery stack. In one embodiment, a straight, longitudinal groove 627 is provided in the top surface of base pad 620. Along with a corresponding groove in base pad 610, groove 627 provides a space for a binder such as a tape to be laid into while a battery stack is being formed in fixture 600. After the stack is formed, the tape can be wrapped around the battery stack to bind the stack and to hold the stack=s alignment. Groove 627 can also be used as a stack picking feature. For example, a tool can be inserted into the channel of groove 627 to clamp the stack and remove it for taping. Some embodiments omit groove 627.

Fixture 600 includes one or more forcing or biasing members such as springs 626 which are located beneath base pad 620 to urge base pad 620 upward. In use, the spring force grows as the stack is formed until the force is approximately 2 lbs. when the base pad is fully depressed. In other examples, the high end force can range from ¼ lb. to approximately 3 lbs., approximately 4 lbs., or more, depending on the material being stacked. Also, the low-end force (i.e., when the stack is empty) can be varied. For example, a pre-load can be applied on the springs to urge the base pad against the bottom of members 634 and 636 before any battery layers have been placed therein. This pre-load force can range from zero, less than approximately ¼ lb to approximately ¼ lb., approximately 2 lb., or more, depending on the application. In one embodiment, the spring is omitted and a pressurized air dashpot mechanism is located under base pad 620 to urge the base pad upward. The pressurized air mechanism can have adjustable air pressure settings, and allow for a constant upward force on the base pad.

In one embodiment, each upper member 634 and 636 is a thin, flat member, such as a metal strip or a plastic strip. In this example, the upper members 634 and 636 are located so as to contact the top side edges of the battery stack when the stack is being formed. This helps keep the edges of a given layer from curling up. This helps prevent misalignment of the stack since any deviation from flatness can be a cause of misalignment.

In one example use, a robotically controlled vacuum placement arm 660 places each new layer 624X on top of the previous layer. Some embodiments provide manual placement of each layer. A vision alignment system can be used to align the layers. Upper members 634 and 636 are movably attached to the fixture so that they can rotate off and on the stack. For example, uppers members 634 and 636 are moved out of the way when a new layer is being place on the stack and arm 660 holds the stack in compression. After the new layer is placed correctly the members 634 and 636 move back over the edges of the top of the stack and the arm 660 is removed and the arms then hold the stack in compression. This process is then repeated until the stack is formed.

Figure 21:
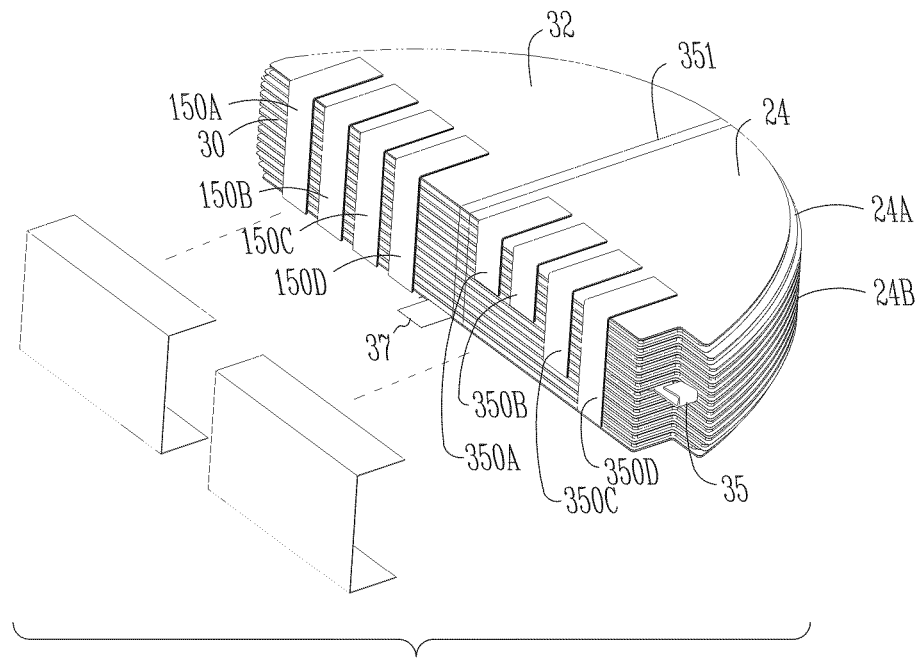
FIG. 21 is a perspective view of the battery stack of FIG. 1.

Fixture 600 allows for precise alignment of a battery stack which has a curved or non-uniform profile (See FIGS. 21 and 22 for example, where the upper and lower portions of stack 24 are smaller in area than the middle portion, resulting in a curved profile battery stack). In such a curved profile battery stack, the edges are not uniform so as to provide precise alignment when stacking in a fixture such as fixture 400. However, by squeezing the stack, fixture 600 allows for precise alignment regardless of the edge profile of the stack.

Further details of some embodiments of alignment mechanism 600 are discussed in co-pending and co-assigned U.S. application Ser. No. 10/050,598 (filed Jan. 15, 2002) entitled METHOD OF CONSTRUCTING A CAPACITOR STACK FOR A FLAT CAPACITOR, which is incorporated herein by reference in its entirety.

FIGS. 18B-18F show a stacking fixture 670 according to one embodiment. Stacking fixture 670 includes some similar features as discussed above for fixture 600 and certain details will be omitted for sake of brevity. Fixture 670 includes a base 672 to hold a stack as the stack is being built layer by layer. One embodiment includes springs or other forcing members (such as an air pressure dashpot mechanism, as discussed above) under base 672 to urge the base and the battery stack upwards (as discussed above for fixture 600). Fixture 670 includes a placement member 671B to deliver each anode, cathode, or separator layer to the stack. In some embodiments, placement member 671B can include manual placement members, vacuum placement members, robotically controlled placement members, vision alignment systems and so on as discussed above. In one embodiment, an upper clamping member 671A is rotatably coupled to fixture 670 to apply top pressure on the stack when upper members 673 and 674 are moved away and placement member 671B is moved away. Other embodiments omit member 671A and utilize the technique described below. A groove or channel can be provided in the upper portion of the base 672 to allow for a tape strip or a tool to be inserted to remove the stack from the fixture.

Fixture 670 includes upper members 673 and 674 which are situated on opposite sides of the stack. Each upper member 673 and 674 includes a contacting member 675 and 676, respectively. Each of the contacting members 675 and 676 is held in tension and supported by being mounted to arms 680 and 681 at each of the contacting members ends. Contacting members 675 and 676 contact the top surface of the top layer of the battery stack as it is being built. The compression or holding force between the contact members 675 and 676 and the base pad 672 keeps the battery stack in alignment as the stack is being built layer by layer.

Figure 18B:
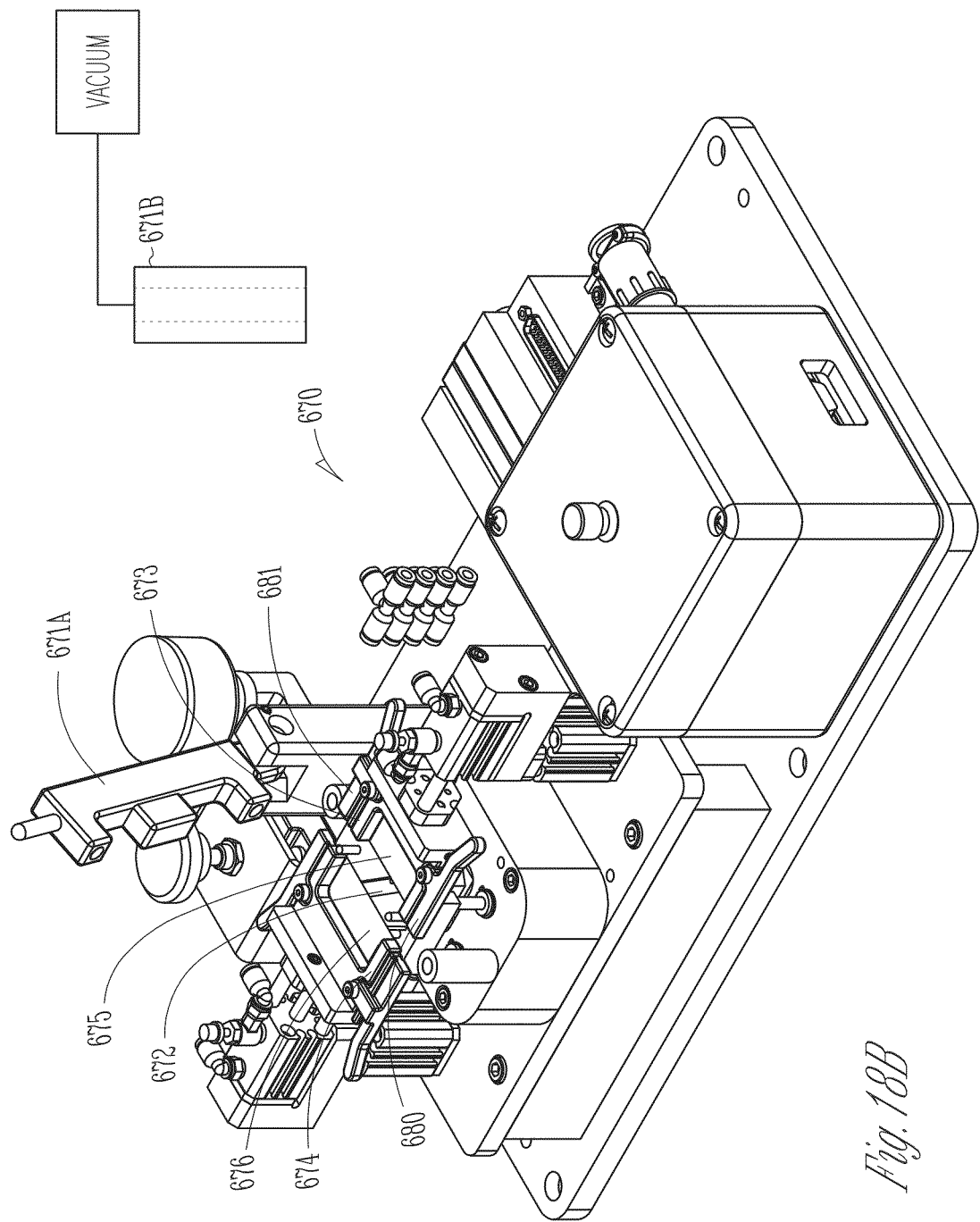
FIG. 18B shows a perspective view of a stacking fixture for constructing a battery stack according to one embodiment.
Figure 18C:
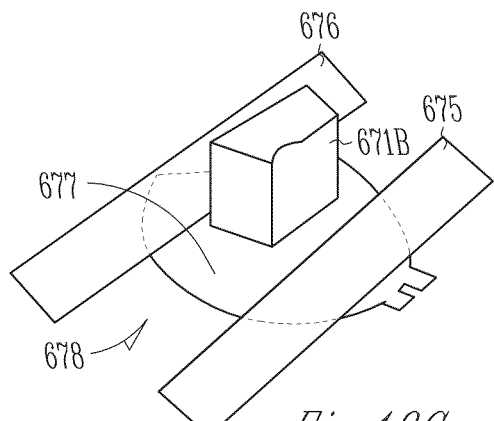
FIG. 18C shows a detail of the upper members of the stacking fixture of FIG. 18B.
Figure 18D:
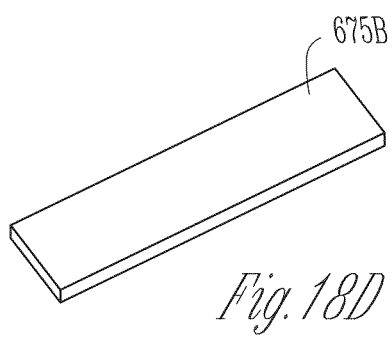
FIG. 18D shows an upper member of the stacking fixture of FIG. 18B, according to one embodiment.

FIG. 18C shows a view of contacting members extending across a top surface of a top layer 677 of a battery stack 678. It is noted that the battery stack can be oriented in any manner desirable (e.g. the stack can be turned 90 degrees relative to FIG. 18C). FIG. 18D shows one embodiment of a contacting member 675B. Contacting member 675B includes a thin strip of plastic, such as a mylar, polyethylene, or polypropylene film web, for example. Various embodiments have contacting members having a thickness of approximately 0.001 inches or less, to approximately 0.005 inches. This end-supported thin web of material is stronger and better supported than a cantilevered member and the thinness of the material allows for a minimal deflection of each new layer as it is put on top of the stack.

Figure 18E:
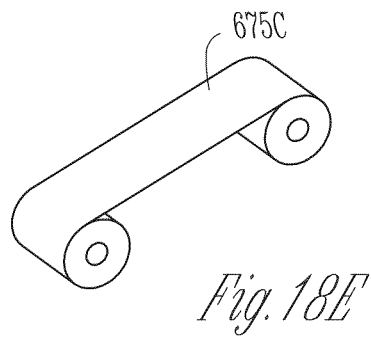
FIG. 18E shows an upper member of the stacking fixture of FIG. 18B, according to one embodiment.

FIG. 18E show a contacting member 675C which includes a roll of thin plastic material. In this example, the web of member 675C can be indexed and drawn through arms 680 and 681 every one or more times it is used. This can provide clean material for contacting the battery stack and allow the web to maintain its strength.

Figure 18F:
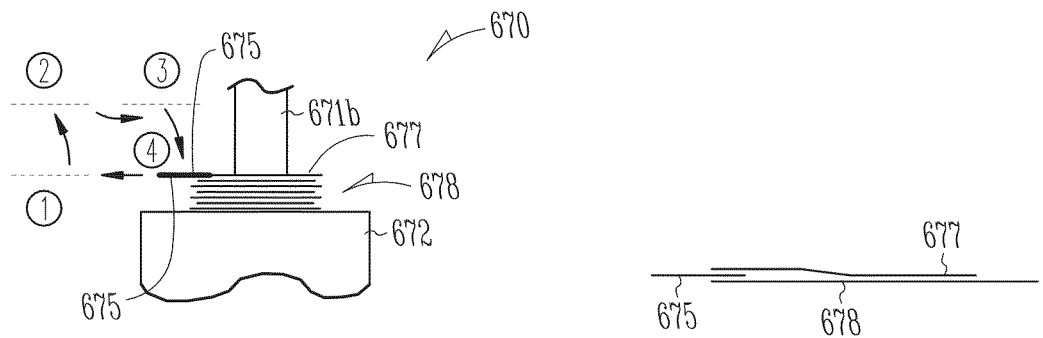
FIG. 18F shows a schematic front view of the stacking fixture of FIG. 18B.

FIG. 18F shows an example use of fixture 670 in placing top layer 677 onto a battery stack 678. In this example each layer of the battery stack is aligned and placed upon the stack which rests on base pad 672. Only contacting member 675 is shown in FIG. 18F for sake of clarity. In one embodiment, second contacting member 676 is used on the opposite side of the stack as shown in FIG. 18B.

In use, placement member 671B places layer 677 on top of the stack and holds the layer as originally aligned in place on top of the stack. In such a position the edge of layer 677 is then on top of contacting member 675. Contacting member 675 is then moved outward to position 1, upward to position 2 then back to positions 3 and 4 where the bottom of contacting member 675 then contacts and holds layer 677 down upon stack 678. Placement member 671B then moves away to get the next layer with contacting member 675 (and 676) holding the stack in alignment. This process is then continued until the battery stack is formed, with member 671B and members 675 and 676 alternatingly keeping the stack in compression.

Figure 18G:
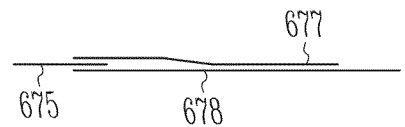
FIG. 18G shows a front view of portion of a battery stack and an upper member of a stacking fixture according to one embodiment.

As with fixture 600, fixture 670 allows for precise alignment of a battery stack which has a curved or non-uniform profile (See FIGS. 21 and 22). In such a stack, the edges are not uniform so as to provide precise alignment when stacking in a fixture such as fixture 400. However, by squeezing or at least holding the stack still, fixture 670 allows for precise alignment regardless of the edge profile of the stack since the stack never has the opportunity to shift once a layer is aligned and placed onto the stack. Moreover, thin contacting members 675 and 676 provide for the minimal deflection of the layer when they move away from the stack. For example, FIG. 18G shows how each top layer 677 is deflected by contacting member 675 as it is being placed on stack 678 by the placement member. By providing a thin contacting member, this deflection can be minimized.

In some embodiments, the edges of the cathode layers and anode layers of the battery stack 24 described above are generally co-extensive or aligned with each other within stack 24. In other embodiments, a battery stack can include anode and cathode layers having at least partially offset edges.

Figure 20:
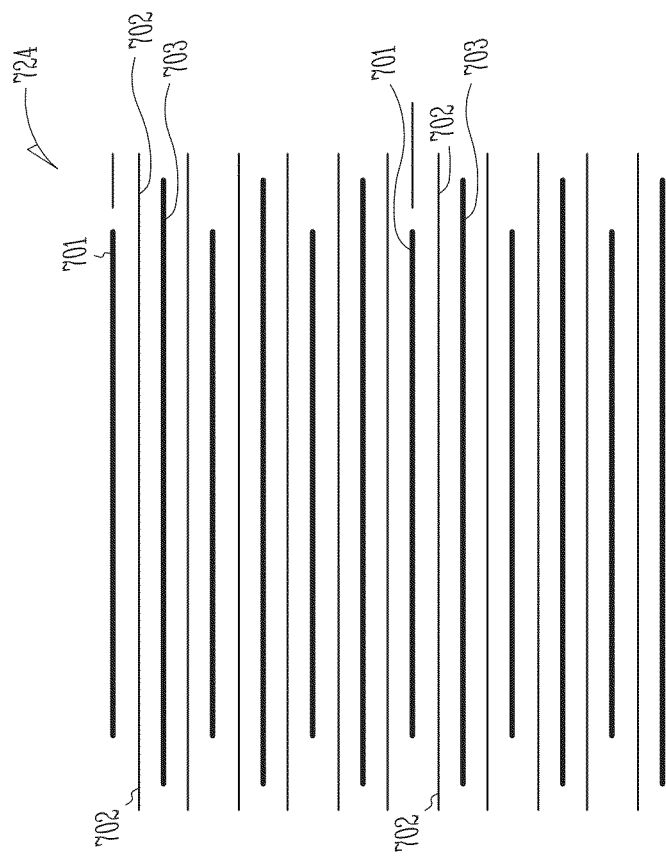
FIG. 20 is a side schematic view of the battery stack of FIG. 19.
Figure 19:
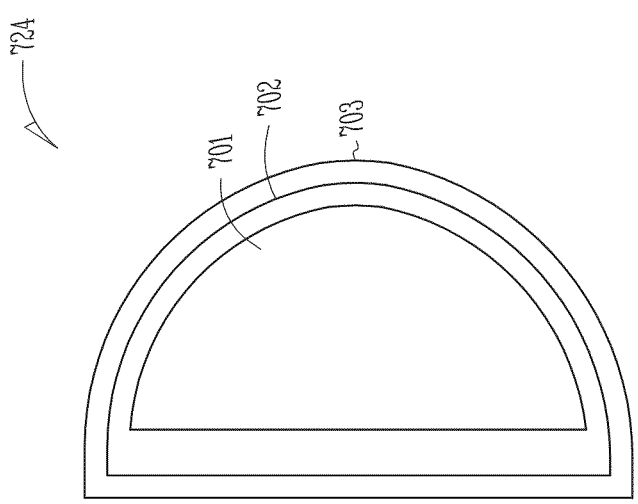
FIG. 19 is a top view of a battery stack according to one embodiment.

For example, FIGS. 19 and 20 show top and side views of a battery stack 724 according to one embodiment. Battery stack 724 includes an anode layer 701, a separator 702, and a cathode layer 703 that are configured in a layered structure analogous to battery stack 24 described above. The bottom surface in FIG. 19 is the cathode layer, and the top surface is the anode layer with the separator interposed there between. In one embodiment, separator 702 can extend beyond both anode layer 701 and cathode layer 703.

Some cutting and punch-die processes used to make anode and cathode battery layers can produce burrs on the layers that can result in a short circuit if a burr on an anode layer edge portion makes contact with an adjacent cathode layer or vice versa. When the dimensions of the cathode and anode layers are the same so that the edges of each layer are aligned, a burr on a cathode layer edge portion can then contact a burr on an anode layer edge portion. Burrs on overlapping edge portions of the anode and cathode layers may then make contact and cause a short circuit by traversing only half of the thickness of the separator between the two layers.

Accordingly, in one embodiment, the battery stack is constructed with layers having edge portions that are offset from one another. In one embodiment, this is done by having a cathode layer with a different dimension than the anode layer so that portions of their edges are offset in the layered structure (i.e., either the anode layer or the cathode layer is smaller than the other). The anode and cathode layers may be of the same general shape, for example, but of different surface areas so that the perimeter of one layer is circumscribed by the perimeter of the other layer.

The capacity of a lithium-based battery is determined by the amount of cathode material (such as $MnO_2$) that can safely be packaged in the device. Also, it can be desirable to have the anode fully opposed by the cathode. Accordingly, altering the surface area of the anode layer does not appreciably affect the capacity of the device. Such an arrangement is shown in FIGS. 19 and 20 where the anode layer 701 is of the same general shape as the cathode layer 703 but with a smaller surface area such that the edge portions of the anode layer are inwardly offset from the cathode layer edges. In this structure, only an edge burr on the anode layer that traverses the entire thickness of the separator can produce a short circuit. This is in contrast to the case where the edge portions of the two layers are aligned rather than being offset. Offsetting the edge portions results in a greater tolerance for edge burrs and allows a less constrained manufacturing process and a thinner separator to be used.

Battery stack 724 can include a plurality of electrode elements that are stacked on one another with each electrode element being a layered structure such as shown in FIG. 19. The anode layers 701 are stacked on cathode layers 703 in alternate fashion with separator 702 interposed between each anode layer and each cathode layer.

In one embodiment, the offset structure described above can be incorporated into a cylindrical battery. For instance, the anode and cathode layers are cut from a sheet in a desired width and length. The anode layer is made narrower than the cathode layer so that the edges of the anode layer are inwardly offset from the cathode layer edges. The cylinder configuration is then produced by rolling the layers into concentric anode and cathode layers that are separated by separators.

Offsetting of anode layer and cathode layer edge portions may be accomplished by using a variety of differently shaped and/or dimensioned cathode or anode layers.

In one embodiment, for example, a battery used in implantable defibrillators and designed to operate at a rated voltage of approximately 2.75 volts to 3.4 volts, includes a ratio of the anode layer surface area to the cathode layer surface area of approximately 1.2 or greater. In some embodiments, the ratio is approximately 1.3 to approximately 1.4. In various embodiments of the present system, a ratio of $Li/MnO_2$ capacity can vary between approximately 0.85 to 1.7.

Referring again to FIG. 16, once stack 24 is stacked as shown, the anode sub-assembly layers are interconnected via anode tabs A-D and the cathode sub-assembly layers are interconnected via cathode tabs A-D. The interconnections can be made by welding, staking, or other techniques. Each tab of the various electrode layers is electrically coupled to the other tabs through base manifold layer 100 or 300. Each secondary electrode layer has at least one extension tab positioned to overlay, be co-extensive with, or match with one of the plurality of tab positions A-D.

In this embodiment, the cathode layers are positioned to include four tab groups 350A-350D. Similarly, anode layers are positioned to include four anode tab groups 150A-150D. The tab groups are in electrical contact with each other through the base layer 100 or 300. Thus, each cathode layer is electrically connected to tab 35 and finally through the feedthrough 36, and each anode layer is connected to tab 37 and then to the case.

In other words, from a top view perspective, anode tabs A-D and cathode tabs A-D are commonly positioned or co-extensive with anode and cathode base tabs A-D respectively.

The base tabs and matching secondary tabs may be separate members attached or welded to the metal sheets or the tabs may be integral with the foil layer. The base anodes and cathodes are shown with four tabs and the secondary electrodes are shown with one tab, however, any number of tabs can be provided as needed. In some embodiments, the secondary layers include two or more tabs to create redundancy.

Again, since the extension tabs are spread out, the size needed to fit the stack within the battery case is reduced. Moreover, the integral interconnects provide for a reduced resistance of the interconnections. This results in an optimized maximal battery surface area per unit volume of the battery. Moreover, the battery then has reduced impedance due to the integral interconnects. For example, because the battery has an interconnect at each layer, it is in effect a multi-parallel interconnection scheme that has lower impedance than that of a rolled or folded battery with only one or two tabs.

In one embodiment, battery stack 24 includes the matching tabs of each secondary layer group welded to the corresponding tab of the base layer. These groups are folded against the battery stack, forming the anode tab groups 150A-150D and cathode tab groups 350A-350D. Again, tab groups 350A-350D electrically connect to an external cathode connection via tab 35 which provides an external electrical connection. Tab groups 150A-150D electrically connect to tab 37.

In this embodiment, tab groups 150A-150D and 350A-350D are folded into position on a top surface 32 of battery stack 24. The tab groups are folded onto the top of the stack and taped. Alternatively, the tab groups are cut just beyond the weld and taped against a face 30 of the stack (See FIG. 21). Each tab group 150A-150D and 350A-350D has a thickness that is less than the sum of the base layer and all the secondary layers.

In one example, the thickness of the tab groups are approximately equal to or less than the space between the main body of stack 24 and lid 28 of case 20 (FIG. 1). In some embodiments, the space is merely a line-to-line interference fit. The present cathode and anode structure provides that the cathode interconnections and anode interconnections fit within the limited room available.

For example, in one or more of the embodiments described above the electrode interconnects are spread out or distributed over multiple locations. For example, the cathode or anode layers can be spread out over four locations with four tab groups, with the thickness of each tab group at each location being about 0.006 inch after welding (assuming that four layers at 0.001 inch per layer are at each location). This thinness of the tab group allows the stacked unit to be placed into the housing with the tab groups occupying the space between the housing and the edge of the stack or the clearance space between the lid and the top of the stack. These clearance spaces are allowed for inserting the stack into the housing. As a comparison, if the cathode tabs were all brought out at one location, the thickness would be greater than 0.015 inch and make it difficult, if not practically impossible, to fold the tabs collectively over the stack as in FIG. 21. Thus, this thickness would require that part of the stack be removed or the case enlarged to allow space for routing and connecting the cathode layer connections, thereby reducing the packing efficiency of the battery.

The embodiment described above show the base layer and secondary layer as cathode and anode layers. However, in some examples only the anode or the cathode layer is arranged in the present fashion and the other is arranged in a different manner.

Figure 22A:
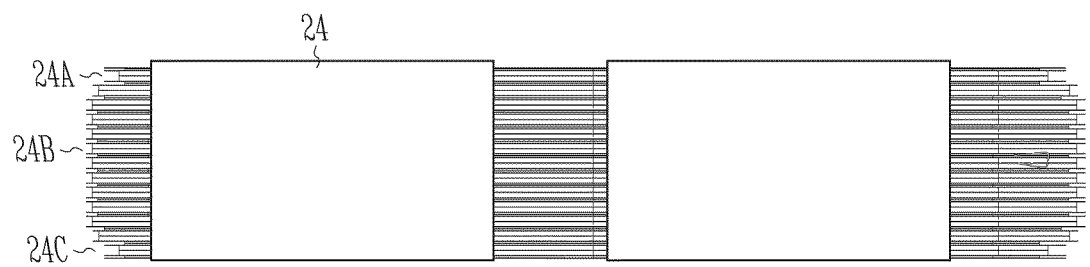
FIG. 22A is a side view of the battery stack of FIG. 1.

FIG. 22A shows front view of stack 24 of FIG. 21. Here it can be seen that in one embodiment, the present system allows for the use of non-uniform layers of a battery. In this example, generally designated are a top stack portion 24A, a middle stack portion 24B and a bottom stack portion 24C. Each of the stack portions 24A-24C includes one or more cathode layers, separator layers, and anode layers. The layers of top portion 24A have at least one dimension which is smaller than the similar layers in middle stack portion 24B. Likewise, bottom stack portion 24C includes at least one dimension smaller than similar layers in middle stack portion 24B. This dimensional difference results in the curved profile of stack 24.

Portions 24A-24C are staggered so that their perimeter edges generally (or at least a portion of a side of the stack) define a profile that generally conforms or is substantially congruent to an adjacent curved interior portion of battery case 20 (FIG. 1) without wasting any space within the case. FIG. 21 shows that portions 24A-24C can be staggered in two dimensions. As discussed above, fixture 600 (FIG. 18) can be used to form the curved or staggered profile stack 24.

In various embodiments, stack 24 can have a variety of profiles and can be curved along zero, 1, 2, 3, or more sides of the battery. The stack can be curved along a top portion, a bottom portion, or both.

Thus, the curved profile stack allows for a curved profile battery case (FIG. 1). This advantageously takes advantage of an implantable medical device housing, which can include a curved outer surface and a curved inner surface.

Thus, the present shape provides an optimal amount of battery power packaged in a way that takes advantage of the preferred shape of an implantable medical device. This allows the battery stack 24 to fit tightly within a curved case with as little wasted space as possible. A curved case is usually a better fit within an implantable medical device. Thus, this structure allows for a smaller medical device without lowering the available energy of the battery by increasing the volumetric and gravimetric energy density of the battery.

Figure 22B:
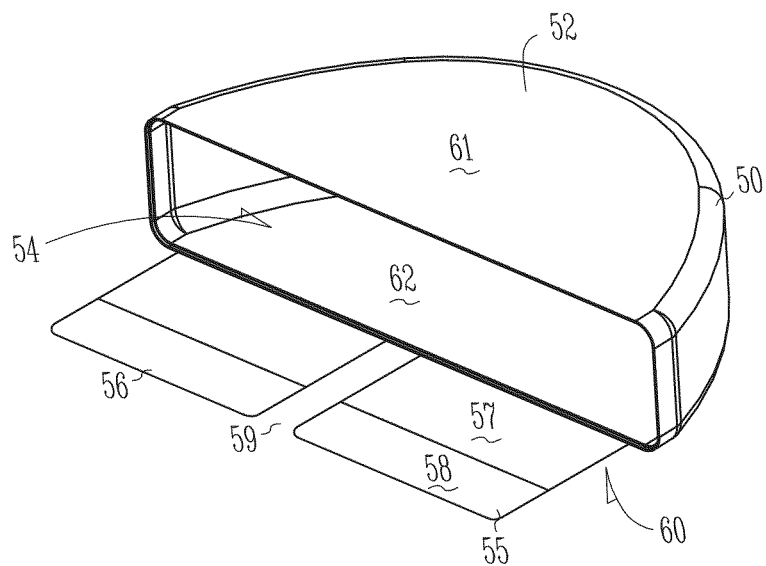
FIG. 22B is a perspective view of an insulating member according to one embodiment.
Figure 22C:
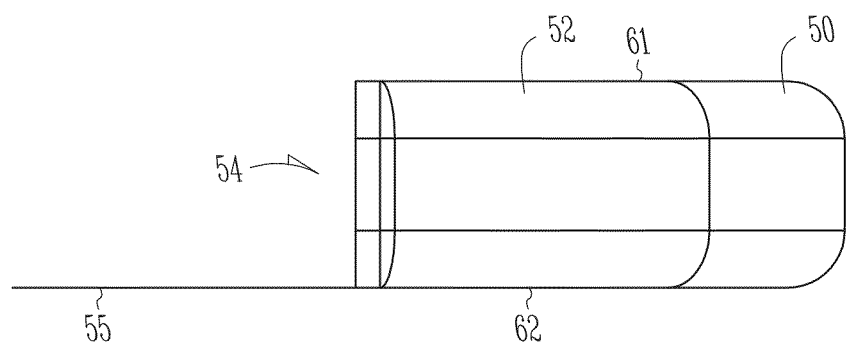
FIG. 22C is a side view of the insulating member of FIG. 22B.

FIG. 22B is a perspective view of an insulating sheath or insulating member 50 according to one embodiment and FIG. 22C is a side view of insulating member 50. In this example, insulating member 50 is shaped and dimensioned to hold a battery stack shaped as battery stack 24 (FIGS. 1 and 21), for example. Other embodiments can shape insulating member 50 as needed to conform to and cover the outer surfaces of a battery stack. In one embodiment, insulating member 50 is used in place of insulating member 38 (FIG. 1) to insulate the battery stack from case 20.

In one embodiment, insulating member 50 includes a main insulating body 52 which defines a cup shape and includes a top surface 61 and an opposing bottom surface 62 and having an opening 54 along a side of the body. One or more flaps 55 and 56 extend from an edge of opening 54. Flaps 55 and 56 are dimensioned to fold over and cover opening 54 after a battery stack has been inserted into main body 52. In one embodiment, a first flap portion 57 covers the exposed surface of the battery stack and a second flap portion 58 can be attached to the top surface of main body 52. Thus, a battery stack, such as stack 24, can be inserted through opening 54 into the hollow area within main body 52. Flaps 55 and 56 are folded over the exposed portion of the stack and the battery stack is separated from and insulated from the battery case. One or more gaps or spaces 59 and 60 can be provided between or adjacent to flaps 55 and 56 to provide room for extension tabs 37 and 35 (FIG. 1) to extend from the stack.

In one embodiment, flaps 55 and 56 are integrally formed with body 52. This integral structure allows for more efficient use of insulating member 50 during manufacturing than a two or more part construction. Integral flaps provide for cost savings in both piece part and manufacturing assembly. Moreover, the integral structure of insulating member 50 reduces the volumetric inefficiencies of two part insulators since the present structure reduces or eliminates any overlap region of the insulating structure when it is mounted around the battery stack. For example, only a single, top seam results when the edge of flaps 55 and 56 meet top surface 61.

FIG. 23A shows a side view of battery stack 24 and battery case lid 28. Feedthrough 36 extends through a feedthrough hole 45 in lid 28 and is connected to tab 35. FIG. 23B shows a cross-section of the connection. Tab 35 wraps around feedthrough 36 and is attached at section 35X. This allows for a stress-relief area of the tab attachment.

FIG. 23C shows a cross-section of the feedthrough assembly 40 of battery 18. Feedthrough assembly 40 includes a ferrule portion 42 integrally fashioned from a wall 43 of lid 28. In other embodiments, the ferrule member can be fashioned from the base 26 of case 20. Ferrule portion 42 includes an integrally formed annular structure defining feedthrough hole 45 which has an inward facing cylindrical surface 45S. An annular insulating member 44 is located within ferrule portion 42. In one embodiment, annular insulating member 44 can be a glass member, an epoxy member, a ceramic member, or a composite member, for example. In one embodiment, annular member 44 includes a TA23 glass or equivalent glass. Feedthrough post 36 extends through annular member 44. Feedthrough post 36 can include a molybdenum material. Annular member 44 electrically insulates feedthrough 36 from lid 28 and provides a hermetic seal of battery 18.

Annular member 44 has an outer surface abutting inward facing cylindrical surface 45S. Annular member 44 includes an inner hole 48. Feedthrough post 36 extends through inner hole 48 and is glassed into the battery case. This allows the feedthrough post to have one end connected to a portion of the electrode assembly, such as cathode tab 35, and a second end expose externally to the housing to provide a cathode terminal for the battery. The integral ferrule structure provides ease of manufacturing a battery since the ferrule does not need to be welded onto the case. Moreover, it can be a cost-effective and size advantageous approach for a hermetically sealed battery. By installing the feedthrough directly into the feedthrough hole in the case, a difficult welding step is eliminated since the case and the feedthrough ferrule are a combined assembly rather that two separate subassemblies that need to be joined together.

FIG. 24A shows a side view of battery 18 after the battery has been assembled. FIG. 24B shows a cross-section of battery 18, and FIG. 24C shows a close-up detail of the cross-section of FIG. 24B. Here it can be seen that by staggering the tab connections of the present embodiment. A space 60 between stack 24 and lid 28 can be small to allow for an optimal use of space within the battery case.

Figures 25, 26A:
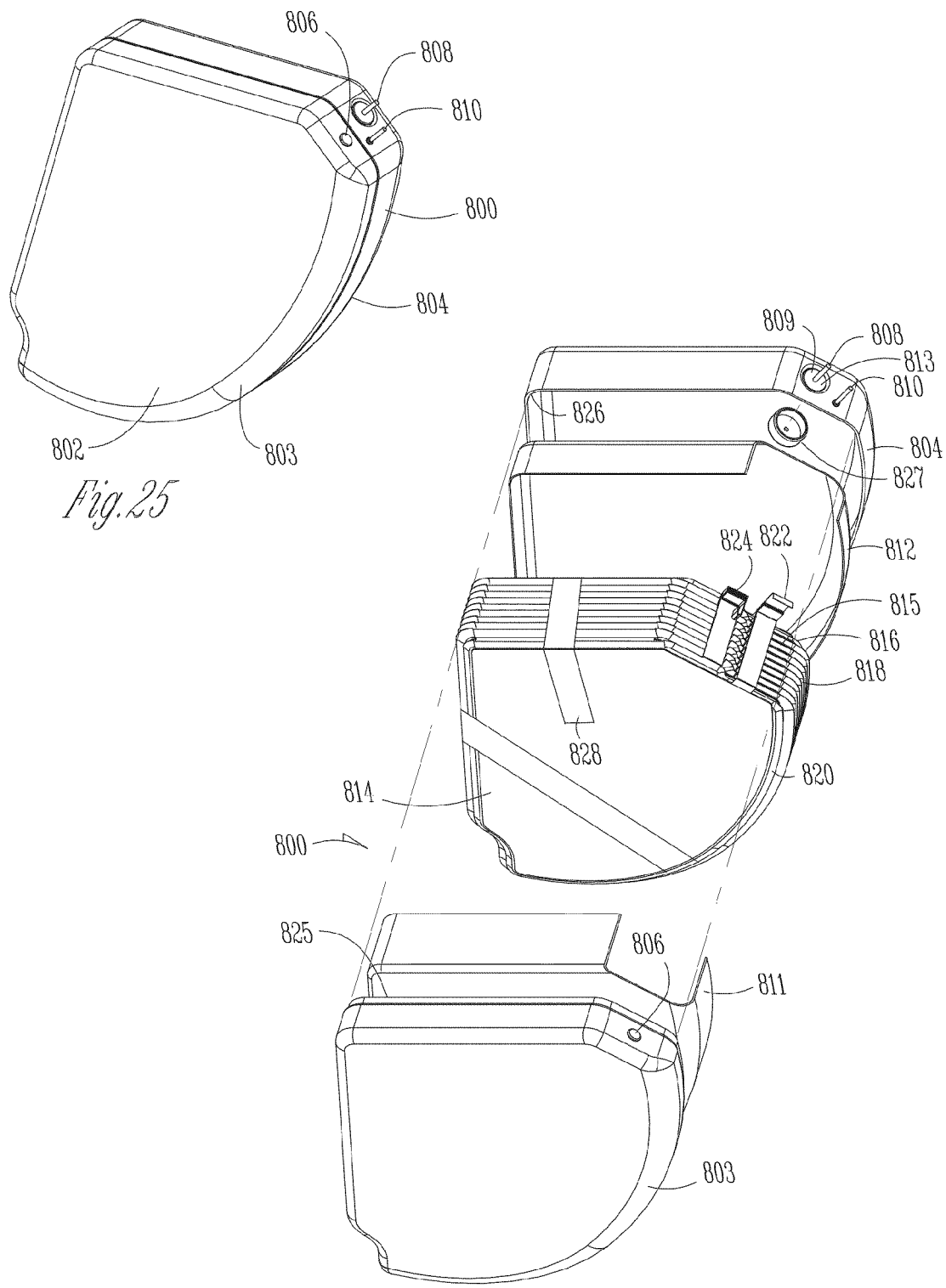
FIG. 25 shows a perspective view of a battery according to one embodiment.
FIG. 26A shows an exploded view of the battery of FIG. 25.

FIG. 25 shows a battery assembly 800 according to one embodiment and FIG. 26A shows an exploded view of battery 800. Battery 800 can be constructed using some features and techniques discussed above and the above discussion is incorporated herein by reference. Battery 800 is a flat, stacked battery having a non-rectangular shape. Again, the techniques described above and below allow the manufacture of almost any arbitrarily shaped battery to allow a designer to fit the battery in a given space within an implantable medical device, for example. A battery stack 814 is mounted within a battery case 802. In one embodiment, case 802 is a two-part clamshell case having a first part 803 and a second part 804. Case 802 can be a metallic case manufactured from a conductive material, such as stainless steel. In another option, case 802 is manufactured using a nonconductive material, such as a ceramic or a plastic.

Battery stack 814 has a region 815 at its periphery which is indented relative to the shape of case 802. This indented region 815 is positioned when the stack 814 is installed in case 802 to provide space for electrical connections. A feedthrough post 808 passes through case 802 to stack 814 and is electrically insulated from case 802. Feedthrough post 808 is connected to a cathode tab 824, while an anode tab 822 is directly attached to case 802. An anode terminal 810 is connected to the outer surface of case 802. In some embodiments, these roles are reversed and the cathode tab is connected to the case and the anode tab connects to a feedthrough. In some embodiments, two feedthroughs are provided, one for the anode and one for the cathode. Battery stack 814 is wrapped by a strip of tape 828 to help hold the stack together and in alignment. Stack 814 is covered with one or more insulating members 811 and 812 when mounted within case 802. In other embodiments, other insulating members, such as the one-piece integral insulating member discussed above can also be used. A backfill port 806 is provided in the case. In one embodiment, an annular insulating member 827 is positioned beneath and around a feedthrough ferrule (see also FIG. 47A) to prevent any short circuits between interconnect 824 and the case. Insulating member 827 also helps minimize galvanic corrosion potential. One example material for member 827 is a polyethylene material.

First part 803 of clamshell case 802 includes a lip 825 which is indented to allow edge 826 of second part 804 to matingly mount around lip 825.

Battery stack 814 is constructed to provide optimal power storage in a small space. This allows battery 800 to be dimensioned to fit within an implantable medical device, for example, and take up as little volume within the device as possible. In one embodiment, stack 814 includes a plurality of alternating anode and cathode layers separated by separators. As will be detailed below, these alternating electrode layers are stacked, aligned, and interconnected to allow for maximal electrode area in a minimal volume with no wasted space.

In one embodiment, stack 814 can include one or more staggered portions or profiles. For example, stack 814 can include non-uniform anode or cathode layers. Stack 814 includes a top portion 820, a middle portion 818 and a bottom portion 816. Each of the stack portions 816-820 includes one or more cathode layers, separator layers, and anode layers. In one embodiment, the layers of top portion 820 have at least one dimension which is smaller than the similar layers in middle stack portion 818. Likewise, bottom stack portion 816 includes at least one dimension smaller than similar layers in middle stack portion 818. This dimensional difference results in the curved profile of stack 814.

Portions 816-820 are staggered so that their perimeter edges generally (or at least a portion of side of the stack) define a profile that generally conforms or is substantially congruent to an adjacent curved interior portion of battery case 802. In various embodiments, stack 814 can have a variety of profiles and can be curved along zero, 1, 2, 3, or more sides of the battery. The stack can be curved along a top portion, a bottom portion, or both.

Thus, the curved profile stack 814 allows for a curved profile battery case 802. This takes advantage of an implantable medical device housing, which can include a curved outer surface and a curved inner surface. Thus, the present shape provides an optimal amount of battery power packaged in a way which takes advantage of the preferred shape of an implantable medical device. This allows the battery stack 814 to fit tightly within a curved case with as little wasted space as possible. A curved case is usually a better fit within an implantable medical device. Thus, this structure allows for a smaller medical device without lowering the power of the battery. (See FIG. 22A and accompanying discussion for other details).

FIG. 26B shows battery stack 814 according to one embodiment. In this example, insulating members 811 and 812 (FIG. 26A) are omitted and stack 814 is insulated by wrapping the peripheral edge of the stack with an insulating member such as an insulating strip 811B. In one embodiment, strip 811B includes a strip of polyimide tape wrapped twice around the edge of the stack. Two wraps provides for increased heat resistance along the weld line of the battery case 803, 804 (FIG. 26A) and the ability to manage variations in the height of the battery stack. In this example, the top and bottom surfaces of stack 814 do not need to be insulated from the battery case because they are the same electrical potential as the case. This design also improves the packaging density of battery 802.

FIG. 27 shows an exploded view of battery stack 814 according to one embodiment. Battery stack 814 includes an anode assembly including a plurality of anode sub-assemblies 840, 842, and 844 and a cathode assembly including a plurality of cathode sub-assemblies 841 and 843. Anode sub-assemblies 840 and 844, located near the top and bottom of stack 814, are smaller than the other anode assemblies, and cathode sub-assemblies 841 are smaller than the other cathode sub-assemblies to accommodate a curved battery case edge. In this example, anodes 840 and 844 have lithium attached to a single side of the anode. Each anode sub-assembly includes a tab extending from the body of the anode at a location A. Each cathode sub-assembly includes a tab extending from the body of the cathode at a location B. To form stack 814, a stacking fixture such as those discussed above can be used, such as fixtures 600 or 670, for example. After stacking, the anode tabs are brought together and welded to connect each of the anode layers into an anode assembly. Likewise all of the cathode tabs are brought together and welded to form a cathode assembly.

In some embodiments, the anode and cathode layers of stack 814 are separated by separator as discussed above. In other embodiments, each of the cathode sub-assemblies 841 and 843 includes a heat-sealed separator 846 which is formed to substantially surround, encapsulate, or envelop the cathode member of the sub-assembly while allowing the extension tab of the cathode to be open.

FIGS. 28, 29, 30, and 31 show one embodiment of an encapsulated cathode assembly 843. (The present encapsulation technique is also applicable to the anodes discussed herein.) FIG. 28 shows a top view of cathode sub-assembly 843 which includes a cathode 853 sandwiched between two layers of separator material 847 with one layer of separator material on either side of the cathode. In one embodiment the separator material is polyethylene, such as Tonen™, or a trilayer (polypropylene, polyethylene, polypropylene) separator material such as Celgard™ 2325.

To form the encapsulated cathode assembly 843, the region periphery 848, just outside the outer edge of the cathode is sealed to attach the two layers of the separator 847 together and thus encapsulate the cathode 853 between the separators 847. One technique of sealing the layers includes heat sealing. This can include a thin line heat sealed around the entire periphery as shown as region 848 in FIG. 28. In this example, the entire periphery of the cathode is encapsulated within the separator envelope except for the lead 849. In one example, the heat sealing process also cuts the sealed cathode sub-assembly 843 from the web. In some embodiments, the encapsulation process includes ultrasonic welding, ultrasonic sealing, hot die sealing, or inductive sealing the separators together along the periphery of the cathode to form the encapsulated cathode sub-assembly.

When encapsulated, cathode 853 is constrained within the separator envelope-like structure such that cathode 853 does not shift when sub-assembly 843 is grabbed by the separator material 847. This saves time in manufacturing. For example, instead of stacking and carefully aligning an anode, a separator, and a cathode, the stacking operation includes stacking and aligning an anode and an encapsulated cathode assembly 843. This saves manufacturing time and makes alignment simpler since each separator does not have to be aligned with each anode and each cathode since the separator is automatically aligned during the encapsulation process. In other words, it cuts the number of individual pieces to be stacked in half.

FIG. 30 shows a detail of the tab portion of the encapsulated cathode sub-assembly 843. The cathode 853 include a base layer 851 having cathode material 852 pressed or otherwise mounted onto one or both sides of the base layer.

The two separator layers 847 are sealed at region 850 with tab 849 extending from the sealed region.

FIG. 31 shows a detail of a bottom portion of the encapsulated cathode sub-assembly 843. The sealed region 848 of separator layers 847 forms a flange 851 around the periphery of the encapsulated assembly 843. Flange 847, which extends around the periphery of the cathode sub-assembly (See FIG. 28), offers shorting protection around the entire periphery of the cathode rather than just the main surfaces of the cathode as when a single separator layer is placed between each cathode and each anode layer. Moreover, the encapsulated structure prevents any flaking cathode material from floating around the cell once constructed.

In one embodiment, stack 814 is formed using the anodes and cathodes shown in FIGS. 32-33. FIGS. 32-36 show a cathode and anode interconnection technique according to one embodiment. FIG. 32 shows a cathode 860 having a cathode material 861 mounted upon a base layer and an uncoated connection portion or tab portion 862 having a proximal portion 863 connected to the main body of cathode 860 and a distal portion 864 extending therefrom. FIG. 33 shows an anode 865 having an anode material 866 mounted upon a base layer and an uncoated connection portion or tab portion 867 having a proximal portion 868 connected to the main body of anode 865 and a distal portion 869 extending therefrom. In one embodiment, connection members 862 and 867 include one or more separate members attached to the anode or cathode by welding, staking, or other connection method. In other embodiments, connection members 862 and 867 can be integral portions of the anode or the cathode, and can be punched, laser cut, or otherwise shaped from the base layers.

In one embodiment, an additional layer of material is provided on either or both of connection members 862 and 867 to give them a thickness approximately equal to or slightly larger than the thickness of either cathode 860 or anode 865. This extra material minimizes the movement of the connection members when they are squeezed together. A similar structure is discussed below for FIG. 36B, the discussion of which is incorporated herein by reference.

FIG. 34 shows a separator according to one embodiment. Separator 870 includes a cut-out region 873 which allows the connection members 862 and 867 to extend beyond the separator. In some embodiments, a discrete separator is omitted and cathode 860 can be encapsulated within a separator envelop or bag, such as discussed above.

FIG. 35 shows a top view of a battery stack 871 including alternating layers of anodes 865, separators 870 and cathodes 860. In stack 871, connection members 862 and 867 are overlaying and underlying each other. As used herein, overlay and underlay refer to the position or location of portions of the cathodes and anodes which are commonly positioned from a top view. In the embodiment of FIG. 35, it is seen that connection members 862 and 867 have some commonly positioned portions relative to each other and some portions which are exclusively positioned relative to each other.

For instance, proximal sections 868 and 863 are exclusively positioned or located. This means that at least a portion of proximal sections 868 and 863 do not overlay or underlay a portion of the proximal sections of the other proximal section. Conversely, distal sections 864 and 869 are commonly positioned and each include at least a portion overlaying or underlaying each another.

When stacked as shown in FIG. 35, the edges of distal sections 864 and 869 form a surface 874. This surface 874 provides for ease of edge-welding or otherwise connecting connection members 862 and 867 together, as will be described below. Other embodiments leave one or more gaps in surface 874 when the anodes and cathodes are stacked.

After being stacked as discussed above, at least portions of connection members 862 and 867 are connected to each other. In one embodiment, distal sections 864 and 867 are edge-welded all along surface 874. In one embodiment, distal sections 864 and 867 are soldered along surface 874. In some embodiments, portions of distal sections 864 and 867 are staked, swaged, laser-welded, or connected by an electrically conductive adhesive. In one embodiment, they are spot-welded.

After being connected, portions of connection members 867 and 864 are removed or separated so that proximal sections 863 and 868 are electrically isolated from each other.

FIG. 36A shows a portion of stack 871 after portions of distal sections 864 and 869 have been removed from the stack, forming a separation 872 between anode connection members 867 and cathode connection members 862. Separation 872 in the present embodiment electrically isolates section 862 from section 867. Proximal sections 863 of each cathode in the stack are still coupled to each other as are proximal sections 868 of each anode in the stack. In various embodiments, separation 872 is formed by laser cutting, punching, and/or tool or machine cutting. In some embodiments, an electrically insulative material is inserted in separation 872.

The battery interconnection example of FIGS. 32-36A can help prevent errors during the manufacturing steps which may cause defects in the battery or decrease the reliability of the battery after it is constructed. It can also help decrease the space of the interconnections within the battery, which can be important if the battery is used in an application such as an implantable medical device. This simple interconnection technique allows interconnections to be made with as few steps as possible.

FIGS. 36B, 36C, and 36D show a cathode 843B according to one embodiment. In this example, cathode 843B includes a connection tab 844B extending from the main body of the cathode. FIG. 36C shows a side view of cathode 843B. FIG. 36D shows a detail of connection tab 844B. Connection tab 844B includes one or more additional layers of a conductive material 845B on each side of a base layer 848B. Material 845B is thick enough to make connection tab 844B approximately as thick as the cathode itself including base layer 848B and a cathode material 847B. Thus, a stack of cathodes such as cathode 843B results in the cathode tabs of adjacent cathodes being generally flush with each other. A neck area 846B is provided to allow room for the heat sealed separator, as discussed above. Moreover, neck area 846B also allows for flexibility in the joint to take up manufacturing tolerance variations.

FIG. 36E shows a portion of a battery 849B having a battery stack 850B constructed using cathodes 843B and similarly configured anodes 851B having thicker connection tabs 860B, which can be constructed by using additional material on one or both sides of the anode base layer. In one embodiment, cathodes 843B are constructed of a paste cathode material as described above. In some respects, stack 850B is similar to stack 814 discussed above and the above discussion is incorporated herein by reference. Stack 850B allows for the cathode connection members 843B to be connected by edge welding, a spot weld, staking, laser welding, etc. Likewise, the anode connection members 851B are connected together. Again, the thicker tab structure of the connections members 843B and 851B allows for the interconnections to be made without having to squeeze the tabs together, which may damage the structure.

FIGS. 37-40 show a battery stack 884 constructed according to one embodiment. Battery stack 884 includes some features as discussed above for battery stack 24 shown and discussed in FIGS. 2-14, and the above discussion is incorporated herein by reference.

FIG. 37 shows a base cathode layer 880 having a terminal tab 881 and one or more legs or extensions A, B, and C. FIG. 38 shows a base cathode layer 882 having a terminal tab 883. And one or more legs or extensions D, E, and F.

Figure 39:
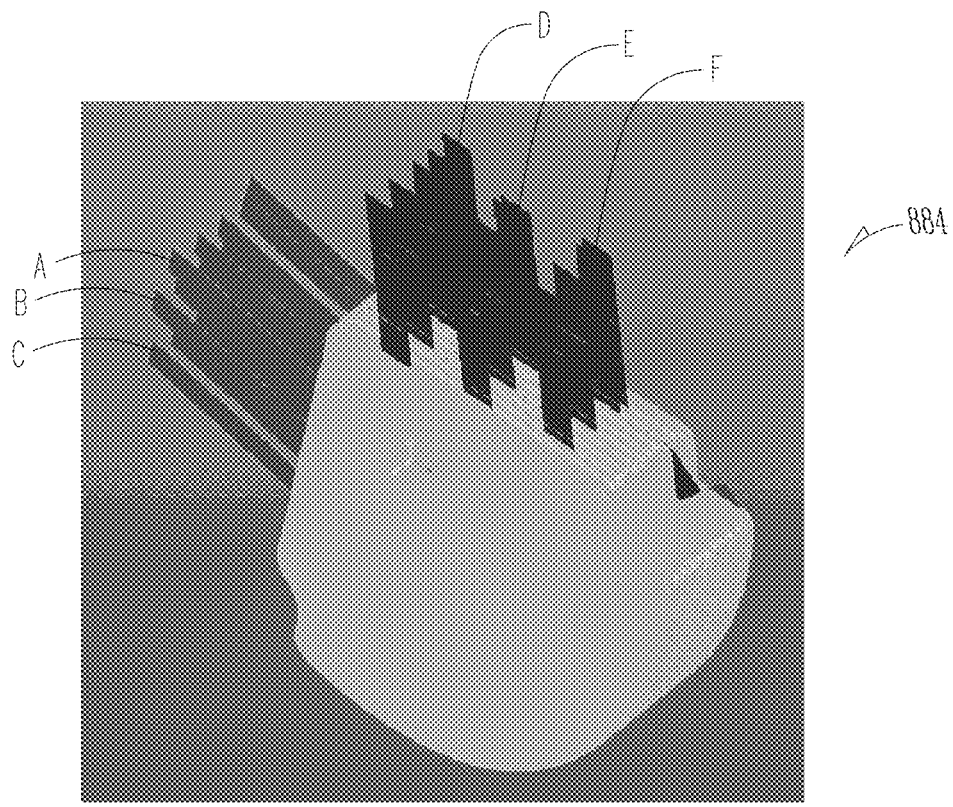
FIG. 39 shows a perspective view of a battery stack constructed according to one embodiment.

FIG. 39 shows battery stack 884 having a sequential stack of alternating cathode layers and anode layers separated by a separator. Stack 884 includes base cathode layer 880 and a plurality of cathode layers which include a tab located in either the A, B, or C position. Likewise, stack 884 includes base anode layer 882 and a plurality of anode layers which each include a tab located in either the D, E, or F position.

Figure 40:
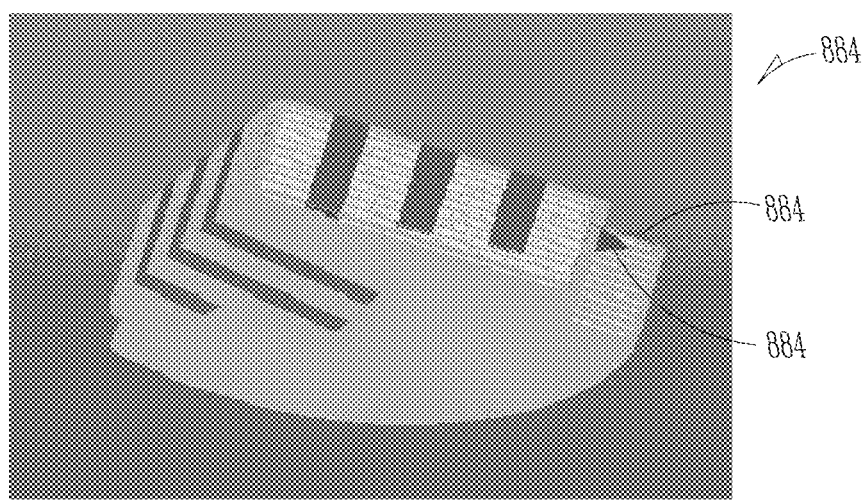
FIG. 40 shows a perspective view of the battery stack of FIG. 39.

FIG. 40 shows stack 884 after the respective tabs have been connected together and wrapped around the stack. As noted above, by spreading the cathode and anode interconnections out over separate areas, the overall thickness required for the interconnections is lessened and less space is needed between stack 884 and the battery case. Terminal tabs 883 and 884 are then attachable to a feedthrough or the case, as discussed above.

After being stacked, any of the battery stacks described above can be taped around the outer surface of the stack to hold the stack in strict alignment. For example, stack 814 includes a tape 828.

Figure 41:
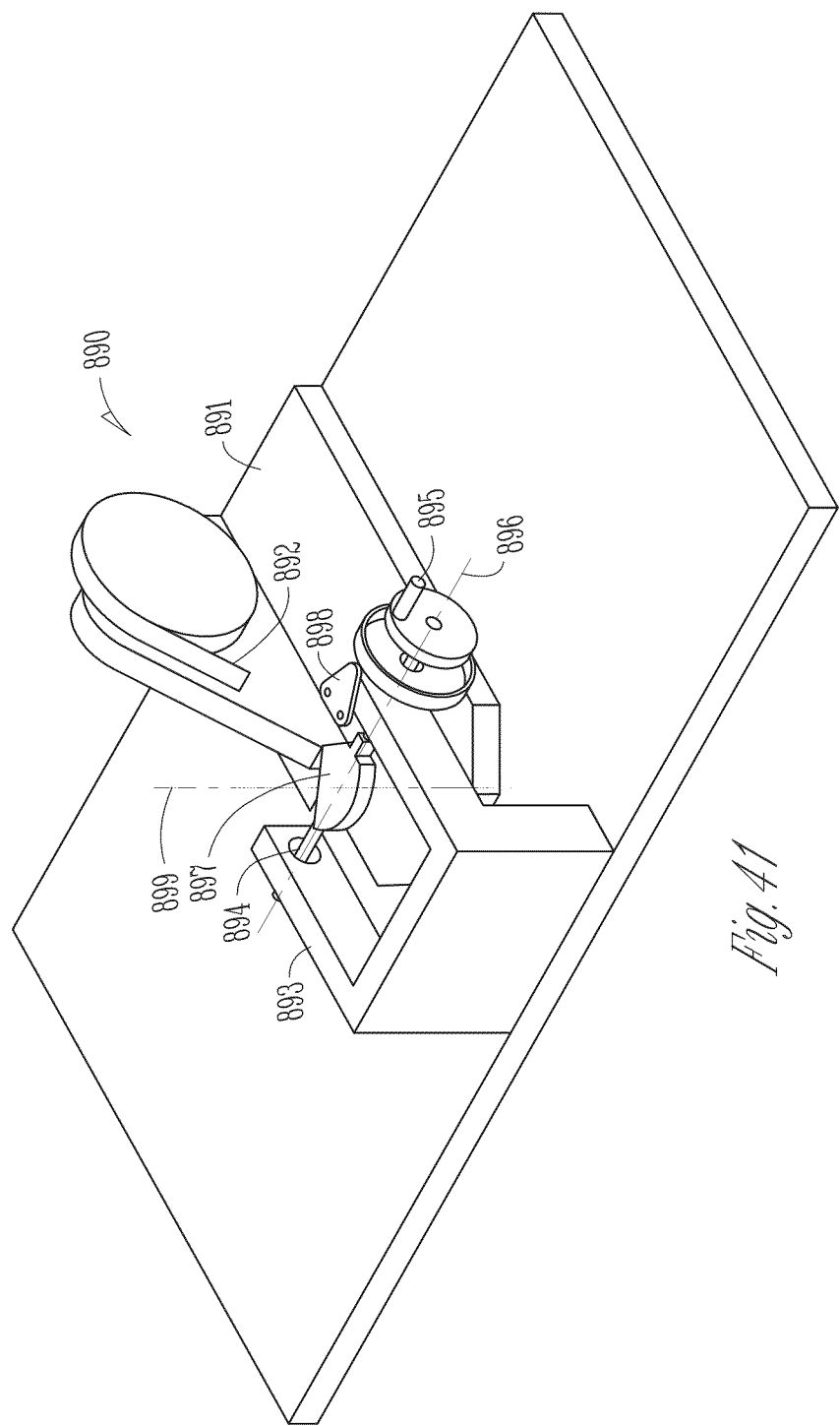
FIG. 41 shows a perspective view of a taping fixture according to one embodiment.

FIG. 41 shows a taping fixture 890 according to one embodiment. Taping fixture 890 includes a tape dispenser 891 that holds a roll of tape 892. Taping fixture 890 includes a stack holding fixture 893 which includes a stack holding member 894. A rotating member 895 is operatively coupled to stack holding member 894 and rotates the stack around a first axis 896. In one example, the first axis is along the long axis of the battery stack. Rotating member 895 can include a manual or motor-operated crank. An indexing member 898 can be used to index and measure the amount of rotation of the rotating member 895.

Either one or both of dispenser 891 and fixture 893 are rotatable around a second, vertical axis 899 so that the two members 891 and 893 are rotatable relative to each other around the second axis 899. Second axis 899 is approximately perpendicular to first axis 896, and generally vertical relative to the work surface. In one example, second axis 899 approximately intersects first axis 896.

FIG. 42 shows a top view of fixture 890. As tape 892 comes off of tape dispenser 891, the tape forms an angle relative to stack 897. By rotating the stack or dispenser about second axis 899, the angle of the tape relative to the stack can be varied.

FIGS. 43A and 43B show one example of a taping process. In use, tape 892 is applied to a first surface 897A of stack 897. The stack is then rotated along axis 896. When the tape strip 892 comes to the edge of the stack 897, the tape dispensing location swings on an arc about axis 899 to match the angle of the first strip relative to the tangent line of the edge profile and the stack continues to rotate around axis 896.

For example, strip 892 starts out as section 1 across surface 897A of stack 897. In this example, section 1 has an approximately 10 degree angle relative to a perpendicular line of the edge of the stack, which in this example is the tangent line of the edge. When the tape strip reaches the edge of the stack, the dispenser is rotated relative to the stack such that the strip is positioned alongside 897B oriented as section 2 (FIG. 43B) which is approximately 10 degrees on the other side of the perpendicular from strip 1. Thus there is a 20 degree angle between the two strips with approximately 10 degrees on each side of a perpendicular line to the tangent line. When the stack is then rotated enough along axis 896 such that the tape reaches the edge of the stack, the dispenser is rotated relative to the stack such that the strip then is oriented along section 3 (FIG. 43A). This process can be continued through 2, 3, 4, or more rotations.

As can be seen by the dotted lines showing strip 2 in FIG. 43A, the tape=s orientation is changed as it rounds each edge so that each side is the matching angle of the other side relative to the perpendicular of the tangent line of the edge. For example, a tangent line 893 is shown at the edge between strips 2 and 3. The angles of strips 2 and 3 are approximately equal relative to this tangent line. This technique helps eliminate bunching of the tape at the edges. Moreover, this simple and elegant solution provides for ease of taping and manufacturing battery stack having nonstandard, non-rectangular shapes.

FIGS. 44A and 44B show another example wrapping in accordance with one embodiment. In this example, the tape strip is started at approximately 10 degrees off the perpendicular. Strip 2 is applied approximately 10 degrees on the other side of the perpendicular. (FIG. 44B). Strips 3 and 4 are likewise oriented as described above.

In general, the degree of rotation of the dispenser relative to the stack is dependent on the shape of the stack. This system is general in that it can wrap almost any shape stack. Again, this is helpful for use on complex, or oddly shaped stacks. Moreover, fixture 890 allows a stack 897 to be taped in a fixture having only two rotational axes. This simple fixture allows taping of a stack having an arbitrarily complex geometry in a single piece, multi-pass, taping operation.

Due to the complex geometry on the outer profile of the stack, a simple tape operation can be difficult. This system simplifies the equipment needed to dispense and apply a single continuous piece of tape around the stack and to make multiple wraps without requiring many axes of motion.

Referring again to the general configuration of battery 800 shown in FIGS. 25 and 26, FIG. 45 shows further details of battery 800 according to one embodiment. Stack 814 is shown inserted in case 802 with a portion of case half 804 shown in broken form. The anode layer subassemblies of stack 814 have their tabs or extension members 817 brought together and interconnected. A tab 822 is then attached to the anodes by welding, for example, and attached directly to case 802, by welding, for example. The extension members or tabs 819 of the cathode sub-assemblies are brought together and interconnected and a connection member 824 is connected to the cathode tabs. Feedthrough post 808 is connected to tab 824 and extends through a feedthrough hole 809 in the battery case. The top stack portion 820 is indented relative to middle stack portion 818 to allow for maximum stack size with the curved edge case 802.

FIG. 46 shows a top view of a portion of battery 800. Feedthrough post 808 communicates outside the battery by being connected to the cathodes via connection 824. FIG. 47A shows a cross-section of FIG. 46. In one embodiment, feedthrough hole 809 is a cylindrical structure integral with case 804. Hole 809 includes an inwardly facing surface defining a ferrule portion 809A. Feedthrough post 808 is electrically insulated from case 804 by annular insulating member 813. In one embodiment, annular insulating member 813 can be a glass member, a ceramic member, an epoxy member, or a composite member, for example. In one embodiment, annular member 813 includes TA23 glass, or equivalent. Feedthrough post 808 extends through a hole in annular member 813. Feedthrough post 808 can include a molybdenum material. Annular member 813 electrically insulates feedthrough 808 from case 802 and provides a hermetic seal of battery 800.

Annular insulating member 813 has an outer surface abutting the inward facing cylindrical surface of ferrule portion 809A. Annular member 813 includes an inner hole that feedthrough post 808 extends through. In one embodiment, annular member 813 is glassed into the battery case. The integral ferrule structure of this embodiment provides ease of manufacturing a battery since the ferrule does not need to be welded onto the case. Moreover, it can be a cost-effective and size advantageous approach for a hermetically sealed battery. By installing the feedthrough directly into the case, a difficult welding step is eliminated since the case and the feedthrough ferrule are a combined assembly rather that two separate subassemblies that need to be joined together.

FIG. 47B shows a cross-section of FIG. 46. Anode terminal 810 is directly attached to case 802 to complete the connection from the anodes through tab 822 and via case 802 to terminal 810.

Figure 48A:
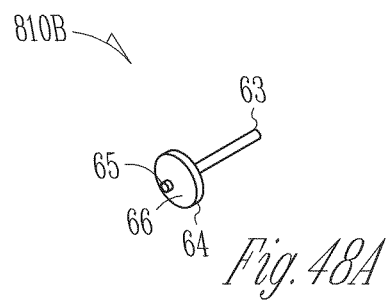
FIG. 48A shows a terminal according to one embodiment.

FIG. 48A shows a terminal 810B according to one embodiment. Terminal 810B includes a base 64 having a surface 66. A main terminal extension 63 extends from one surface of base 64 and a nipple or protrusion 65 extends from opposing surface 66. Terminal 810B can be formed of a metal such as gold-plated nickel.

Figure 48B:
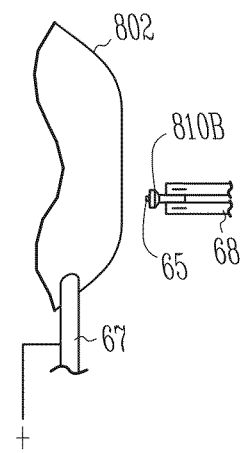
FIG. 48B shows a side view of the terminal of FIG. 48A being attached to a case in accordance with one embodiment.

FIG. 48B shows a side view of terminal 810B being attached to a case 802 in accordance with one embodiment. Case 802 is a metal, such as 304L or 316l SST. A fixture 68 is used to hold terminal 810B. Fixture 68 and case 802 are oppositely charged. For example, fixture 68 can negatively charged, while case 802 is positively charged by an electrode 67, or vice versa. Terminal 810B is positioned such that protrusion 65 is facing case 802 and is the closest portion of terminal 810B to the case. As the terminal is brought closer to the case, protrusion 65 concentrates or focuses the electrical field developed between the oppositely charged case and terminal. When the terminal is close enough, a spark or arc is sent between the protrusion and the case. This spark vaporizes the nipple and welds the terminal to the case. One example uses a HCD125 MicroJoin™ welding machine set at 30-40 watt-sec power level at 5 lb. force with a pulse width at the #4 setting on the machine.

Figure 48C:
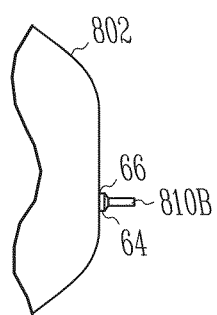
FIG. 48C shows a view of the terminal of FIG. 48A after being attached to the case.

FIG. 48C shows a view of terminal 810B after being attached to case 802. The protrusion has vaporized and surface 66 of base 64 is tightly attached to case 802.

In some embodiments, resistance welding can also be used to attach terminal 810B to the case. For example, terminal 810B and the case can be brought in contact and a current is delivered. Protrusion 65 then melts down and collapses and surface 66 and case 802 are tightly attached.

Figure 48D:
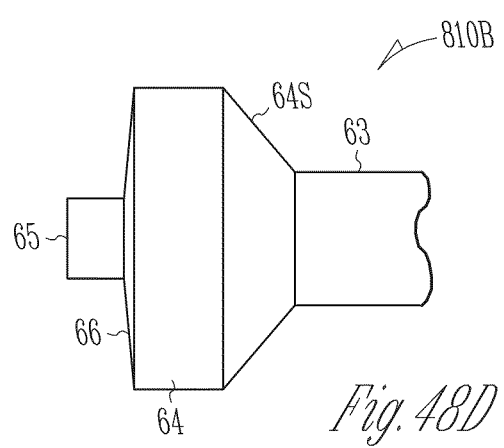
FIG. 48D shows a detail side view of a terminal according to one embodiment.

FIG. 48D shows further details of terminal 810B according to one embodiment. In one embodiment, base 64 includes a chamfered rear surface 64S, for example of approximately 45 degrees. Front surface 66 can have an angle of approximately 3 degrees. In this example, base 64 has a diameter of approximately 0.022 to 0.030 inches and protrusion 65 has a diameter of approximately 0.005 to 0.008 inches.

After the stack is mounted within the battery case, the case can be welded shut. An electrolyte is filled into the case through a backfill port, for example. The backfill port is then sealed.

Figure 49A:
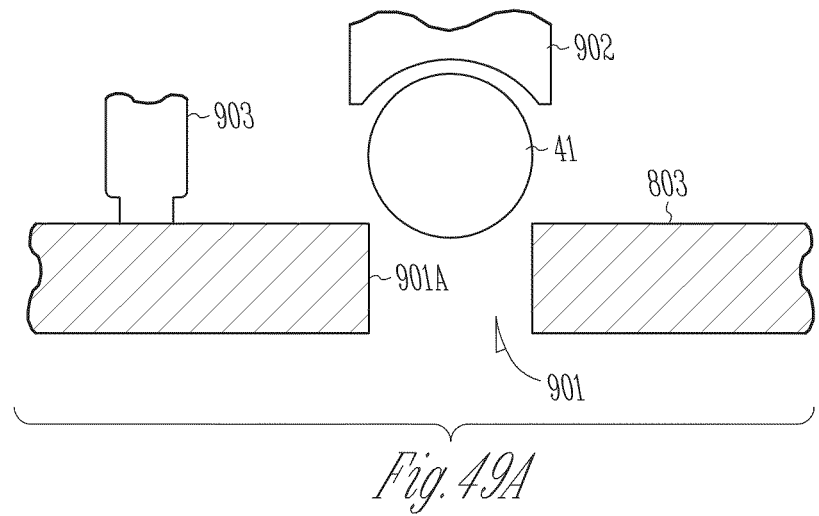
FIGS. 49A, 49B, and 49C show a backfill plug welding technique according to one embodiment.
Figure 49B:
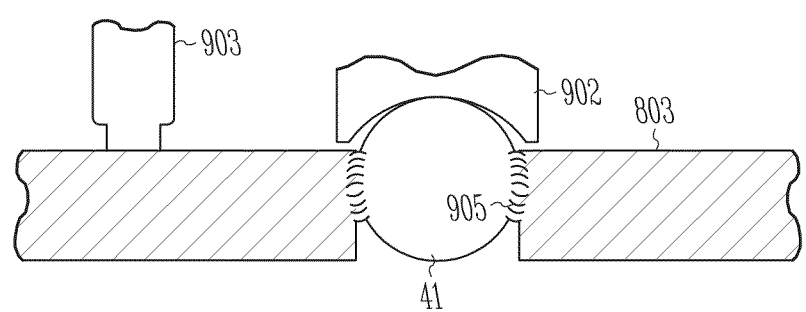

FIGS. 49A-49B shows a technique for mounting a backfill ball plug 41 to a backfill port 901, in accordance with one embodiment. Backfill plug 41 is shown being mounted to a battery case 803. Backfill port 901 in the battery case has been used to fill the battery case with electrolyte. One problem during the mounting of backfill plugs is that the electrolyte can leach out around the plug before the plug is welded to the case. When this fluid leaches out, it makes welding difficult. The present technique minimizes leaching and allows for a hermetically sealed battery.

In one embodiment, a first welding electrode 902 is adapted to be used as an applicator to force ball 41 into port 901. For example, electrode 902 can be given a rounded tip to match the shape of the backfill plug. In one embodiment, plug 41 can be a spherical-shaped ball having a diameter slightly larger than port 901 such that there is an interference fit between plug 41 and the walls 901A defining port 901. For example, in one embodiment, plug 41 has a diameter of approximately 0.026 inches and port 901 has a diameter of approximately 0.025 inches. As applicator/electrode 902 forces plug 41 into port 901, a second welding electrode 903 is applied against case 803. A current develops between electrode 902 and 903 traveling through plug 41 and case 803. This welds the periphery of plug 41 to the case at weld location 905. This welding technique seals the ball within the port without allowing any leaching of electrolyte through the gap between the ball and the port walls.

Figure 49C:
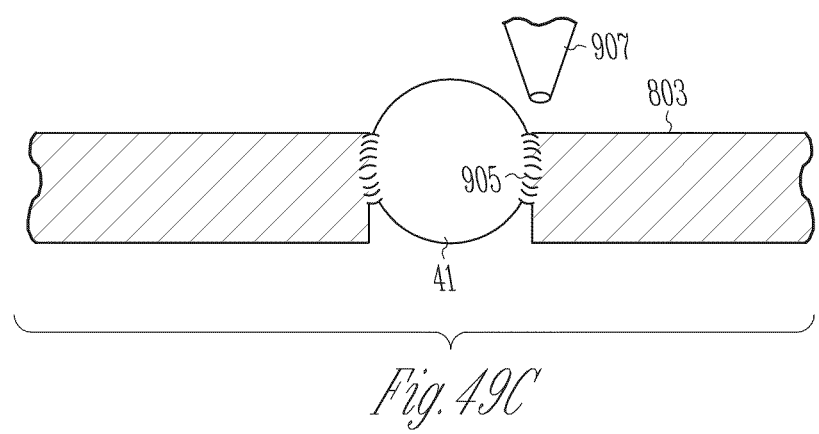

In one embodiment, after weld 905 is formed, electrodes 903 and 902 are removed and the battery is sealed. In other embodiments, as shown in FIG. 49C an optional laser welding step is provided by a laser welder 907 to further seal the upper periphery of the ball-shaped plug 41 to the case.

FIG. 50A shows a backfill plug 910 according to one embodiment. Plug 910 is a cap-shaped plug having a top portion 911. In one embodiment, top portion 911 expands outward to cap portion 912 defining a chamfered region 916 between top portion 911 and cap portion 912. Plug 910 includes a waist section 913 which expands into a widened section 914 and then a narrowed section 915. In one embodiment widened section 914 is slightly wider than the diameter of backfill port 901. For example, widened section 914 can be approximately 0.026 inches and backfill port 901 can be approximately 0.025 inches in diameter.

FIGS. 50B and 50C shows an example of plug 910 being mounted to backfill port 901. An applicator electrode 917 is adapted to insert and force plug 910 into backfill port 901 in an interference fit. During or after applicator/electrode 917 forces plug 910 into port 901, a second welding electrode 903 is applied against case 803. A current develops between electrodes 910 and 903 traveling through plug 910 and case 803. This welds the widened portion 914 of plug 910 to a wall 901A of the case at weld location 919. Again, this technique of welding while forcing seals the plug within the port without allowing any leaching of electrolyte through the gap between the plug and the port walls.

In one embodiment, as shown in FIG. 50C an optional laser welding step is provided by a laser welder 907 to laser weld the periphery of the cap 912 of plug 910 to the outer surface of case 803. By providing a chamfered region 916, the laser welding step is improved. FIG. 50C shows how plug 910 fits within port 901. Cap portion 912 rests against the outer surface of case 803. Waist portion 913 is located inside of and not touching the walls of port 901. In one embodiment, plug 910 is formed from stainless steel.

FIG. 50D shows a terminal 810C according to one embodiment. Terminal 810C is a combination backfill plug/terminal. Terminal 810C includes an elongated terminal portion 63C and a spherical plug portion 41C. Plug portion 41C is dimensioned to interference fit within backfill hole 901. In one embodiment, terminal 810C can be attached within the backfill hole 901 and be coupled to the case 803 using the techniques discussed above. For example, a welding fixture 902 can be used to bring terminal 810C within the backfill hole 901 and in contact with case 803 as a second welding electrode 903 is brought against the case to weld the spherical ball portion 41C within the hole, as in FIGS. 49A-49C. The combination terminal 810C allows for the elimination of separate terminals and fill plugs (such as terminal 810 and plug 41 discussed above). By combining the two members, manufacturing is eased.

FIG. 50E shows a terminal 810D according to one embodiment. Terminal 810D is a combination backfill plug/terminal. Terminal 810D includes an elongated terminal portion 63D and a plug portion 910D. Plug portion 910D is similar to plug 910 discussed above and the above discussion is incorporated herein by reference. As with terminal 810C, terminal 810D can be attached within the backfill hole of a battery case.

In various embodiments of the techniques and structures of FIGS. 49A-49C and 50A-50E, a parallel gap welder can be used to perform the weld. Various embodiments utilize a current of approximately 10 to approximately 45 watt-sec or higher. One embodiment uses a HCD125 MicroJoin™ welder with settings of 30 watt-seconds and 2 lb. force and pulse width at the #4 setting.

Figure 51:
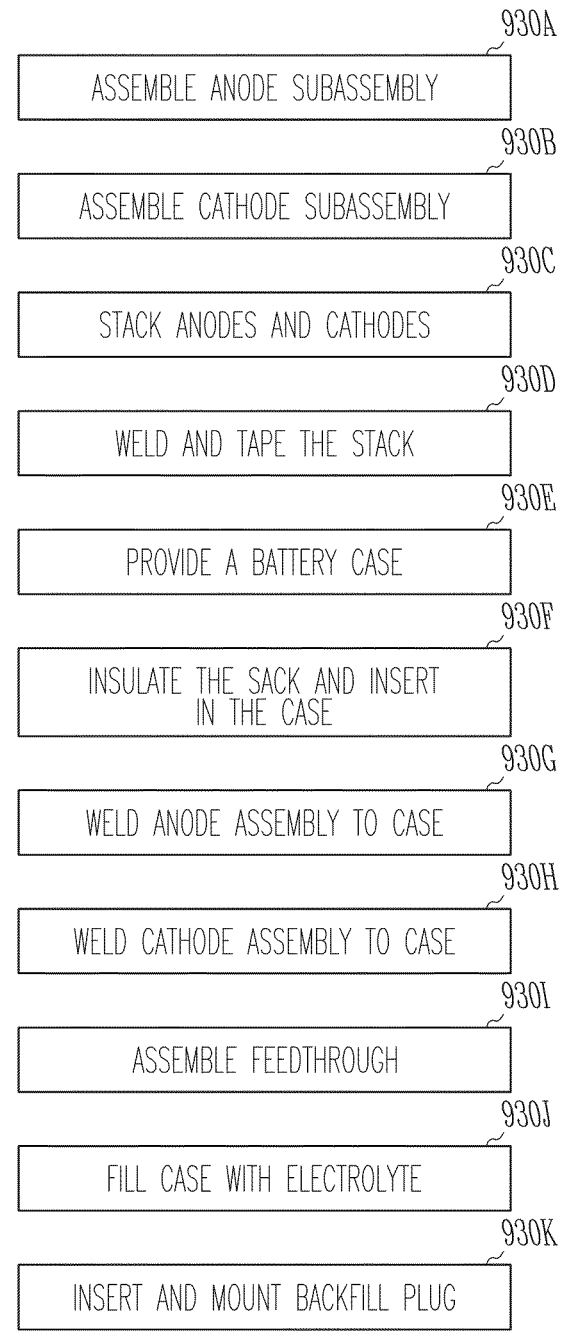
FIG. 51 is a flowchart of a method of constructing a battery, in accordance with one embodiment.

FIG. 51 shows a method for manufacturing a battery in accordance with one embodiment. The method of FIG. 51 is an example of one embodiment and it is understood that different steps may be omitted, combined, and/or the order changed within the scope of one or more embodiments. Among other steps, method 51 includes assembling an anode subassembly (930A), assembling a cathode subassembly (930B), stacking a plurality of anode and cathode subassemblies into a battery stack (930C), welding the tabs of each of the anode subassemblies together and welding each of the tabs of each of the cathode subassemblies together and taping the stack (930D), providing a battery case for holding the stack (930E), insulating the outer surface of the stack and inserting the stack into the case (930F), welding the anodes to the case (930G), welding the cathodes to a feedthrough (930H), assembling the feedthrough assembly including glassing the feedthrough through a feedthrough insulator (9301), welding the case shut and filling the case with electrolyte (930J), and inserting and welding a backfill plug to the case (930K).

Figure 52:
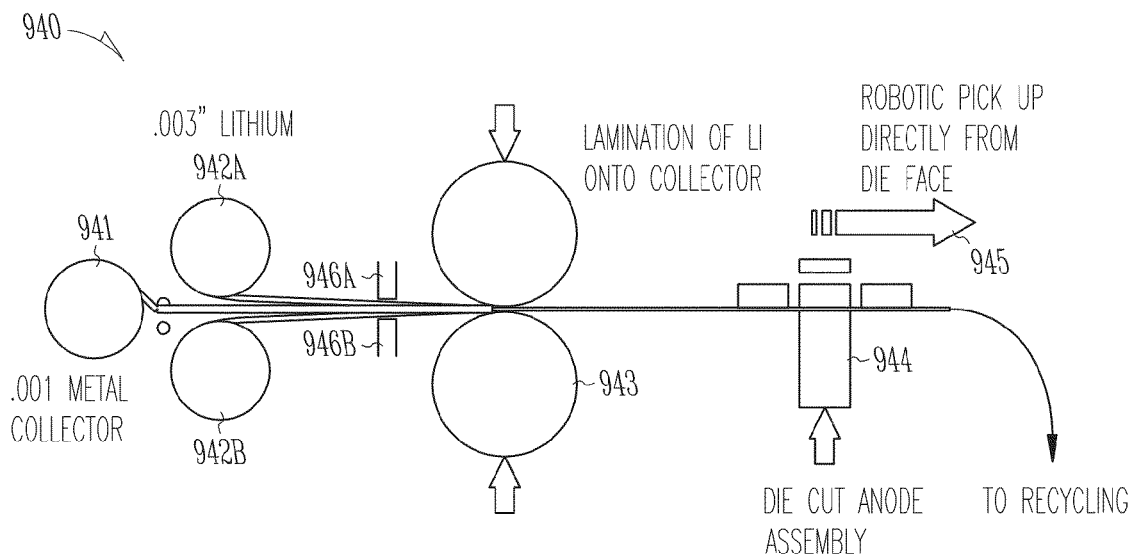
FIG. 52 shows a schematic view of a system for manufacturing anodes, in accordance with one embodiment.

In one embodiment, assembling the anode sub-assembly (930A) can include forming a plurality of discrete anode layers such as the various anodes discussed above. FIG. 52 shows a schematic representation of an anode assembly system 940 according to one embodiment. System 940 includes a first spool 941 holding a roll of metal base anode material, such as an expanded metal, a solid metal, or an etched metal. A pair of spools 942A and 942B provide a layer of lithium on either side or both of the base material. One or more brushes 946A and 946B clean the lithium layers. The lithium is laminated onto the base layer at a stage 943. A die-cut mechanism 944 cuts the individual anodes, and a robotic system 945 removes them.

Figure 53:
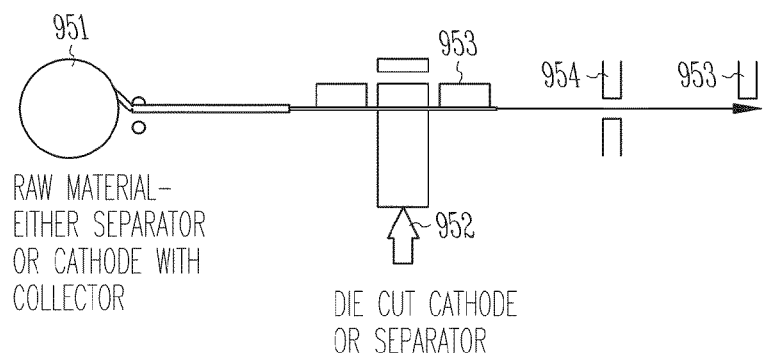
FIG. 53 shows a system for constructing cathodes, in accordance with one embodiment.

FIG. 53 shows a schematic system 950 for forming cathode layers according to one embodiment. A first spool 951 holds a base cathode material. A die cut system 952 cuts the layer to a desired shape. A heat seal system 954 can be provided to seal the separators around the cathode. The cathode assembly can then transferred by a robotic system 953.

Figure 54:
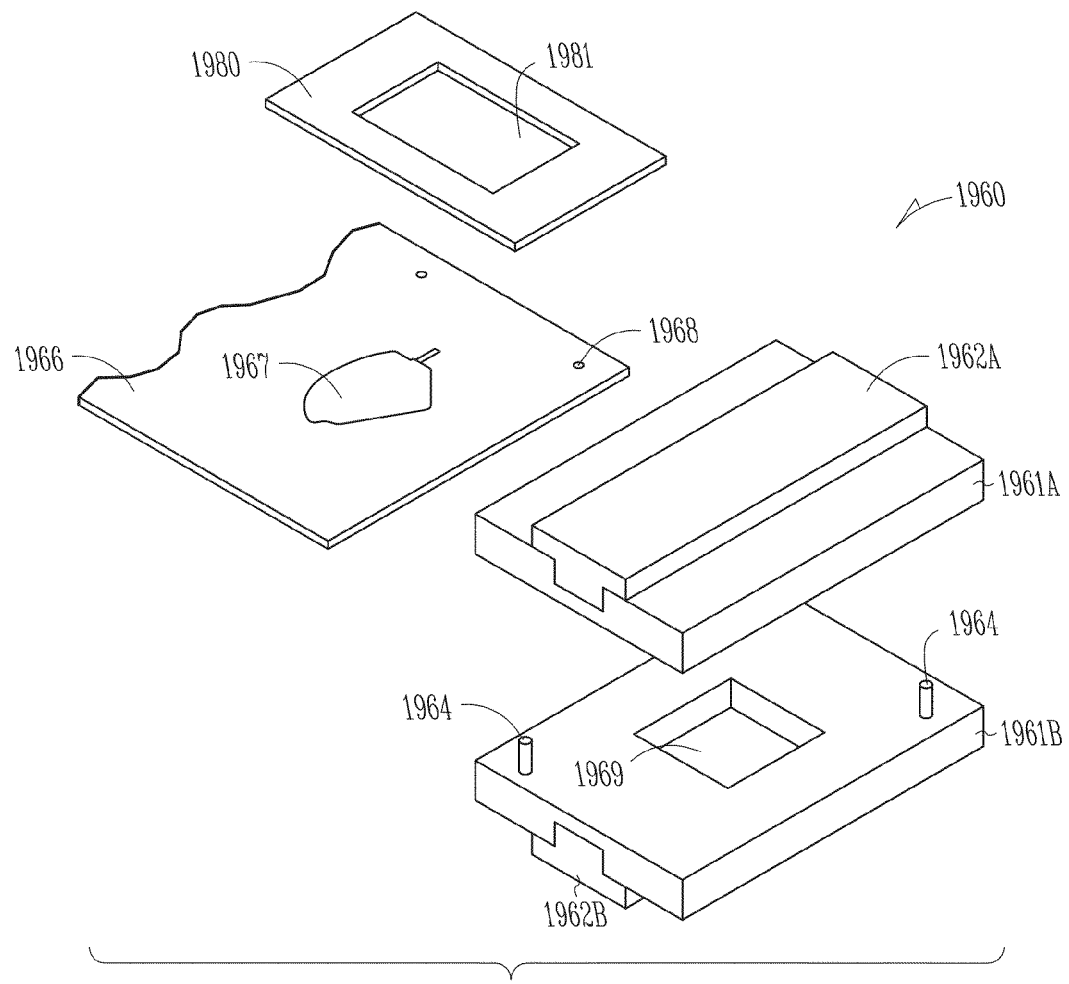
FIG. 54 shows a schematic view of a fixture for constructing cathodes, in accordance with one embodiment.

FIG. 54 shows a schematic representation of a fixture 1960 for forming a cathode in accordance with one embodiment. Fixture 1960 provides a technique to load a predetermined, precise amount of a cathode powder onto a cathode carrier strip for use in the manufacture of cathode layers of a battery. Fixture 1960 generally includes a pair of dies or clamp members 1961A and 1961B. One or more guide posts 1964 extend from the inner surface of one of the clamp members 1961A and 1961B. The opposing clamp member includes corresponding holes which mate with the guide posts to keep the pair of members 1961A and 1961B in alignment when they are brought together. Each of the clamp members 1961A and 1961B include a cut out or cavity portion 1969.

A cathode carrier strip 1966 includes a cathode base section 1967 and one or more guide holes 1968. Guide holes 1968 mate with guide posts 1964 to keep the cathode carrier strip 1966 tightly aligned in fixture 1960.

Fixture 1960 includes a pair of punch members or press heads 1962A and 1962B. Each punch member 1962A and 1962B is associated with one of clamp members 1961A or 1961B such that each punch member moves back and forth through cut-out portion 1969.

In use, a preset amount of $MnO_2$ matrix material is poured into the cavity in the bottom clamp member 1961B. In one example, the $MnO_2$ powder includes a mixture of 90% pure $MnO_2$, 5% powder carbon, and 5% PTFE slurry binder. A flat edge tool is used to spread the $MnO_2$ powder evenly in the cavity. The collector strip 1966 is placed in position over the cavity. A shim 1980 is placed onto the collector strip and fastened down to hold in position. A preset amount of $MnO_2$ matrix material is poured into the cavity 1981 of the shim. The flat edge tool is used to spread the powder evenly in the shim cavity. Top clamp member 1961A is then positioned over and fastened to the bottom clamp member.

Figure 55:
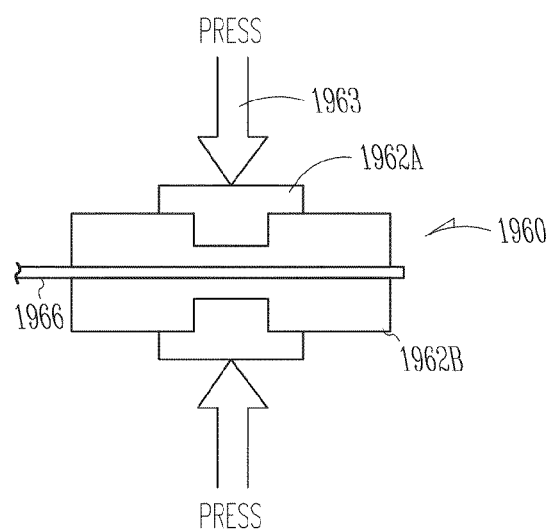
FIG. 55 shows a side view of the fixture of FIG. 54.

FIG. 55 shows a press 1963 applying force to punch members 1962A and 1962B. The fixture 1960 is placed into press 1963 and the press is cycled with several pressures in steps from low pressure to high pressure until the powder is compacted to the desired density. In one embodiment, a pressure of approximately 48,000 psi is used. In one embodiment, a pressure of approximately 16-21 tons per square inch is used.

In one embodiment, fixture 1960 is mounted to a vibrating system which is actuated to vibrate the fixture either after the powder is placed within the cavities. The vibration settles the powder to fill any gaps and makes the powder have a generally uniform density within the fixture.

Since the size of the cavities of the fixture and the density of the cathode powder is known, a precise amount of powder is compacted onto the carrier strip. Battery cathodes that are later punched or removed from the strip then contain precise amounts of the cathode powder and the cathode powder is evenly distributed across the surfaces of the cathode carrier in a uniform density. This improves the consistency and reliability of the batteries. In one example, the powder has a pressed density of approximately 2.7 g/cm$^3$ and the cathode has an overall thickness (including base metal) of approximately 0.0182 inches. Other embodiments can range from approximately 2.5 to 3.2 g/cm$^3$.

Figure 56:
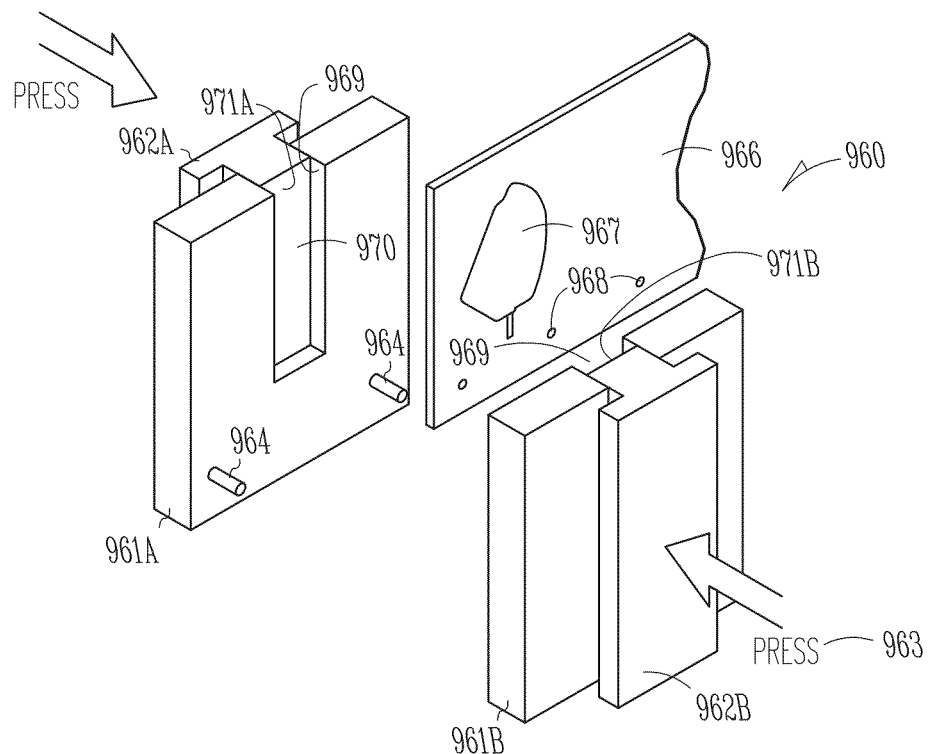
FIG. 56 shows a schematic view of a system for constructing cathodes, in accordance with one embodiment.

FIG. 56 shows a schematic representation of a fixture 960 for forming a cathode in accordance with one embodiment. Fixture 960 provides a technique to load a predetermined, precise amount of a cathode powder onto a cathode carrier strip for use in the manufacture of cathode layers of a battery. Fixture 960 generally includes a pair of clamp members 961A and 961B. One or more guide posts 964 extend from the inner surface of one of the clamp members 961A and 961B. The opposing clamp member includes corresponding holes which mate with the guide posts to keep the pair of members 961A and 961B in alignment when they are brought together. Each of the clamp members 961A and 961B include a cut out portion 969. When clamp members 961A and 961B are brought together, cut out portions 969 define a cavity 970.

A cathode carrier strip 966 includes a cathode base section 967 and one or more guide holes 968. Guide holes 968 mate with guide posts 964 to keep the cathode carrier strip 966 tightly aligned in fixture 960 such that cathode base section 967 is located within cavity 970.

Fixture 960 includes a pair of punch members or press heads 962A and 962B. Each punch member 962A and 962B is associated with one of clamp members 961A or 961B such that each punch member moves back and forth through cut-out portion 969. A press 963 applies force to punch members 962A and 962B. A punch surface 971A and 971B of each respective member 962A and 962B is brought close together within cavity 970.

Figure 57:
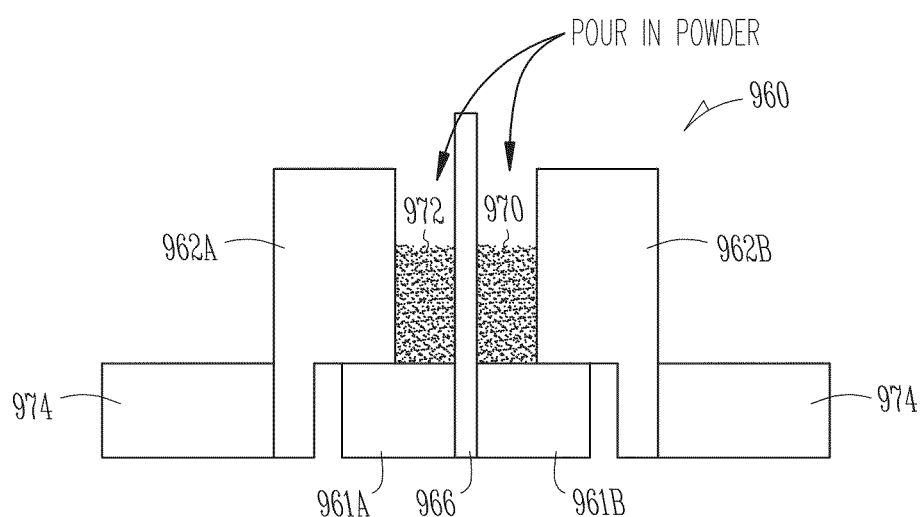
FIG. 57 shows a side view of the system of FIG. 56.

FIG. 57 shows an example of carrier strip 966 mounted in a substantially vertical orientation within fixture 960. Members 961A and 961B are clamped together to hold the carrier strip 966 in place. A cathode powder 972, such as an MnO$_2$ mixture, is placed or deposited within cavity 970. In one embodiment cavity 970 has a width of approximately 0.030 to 0.040 inches. In one example, powder 972 includes a mixture of 90% pure MnO$_2$, 5% powder carbon, and 5% PTFE slurry binder.

In one embodiment, fixture 960 is mounted to a vibrating system 974 which is actuated to vibrate the fixture either during or after the powder is placed within cavity 970. The vibration settles the powder to fill any gaps and makes the powder have a generally uniform density within cavity 970. In one embodiment, a precise amount of powder 972 is placed within cavity 970. The amount of cathode powder can be varied depending on application of the cathode.

After cavity 970 is activated, press 963 is activated and punch members 962A and 962B press the powder into and onto the base carrier 966. In one embodiment, a 50 ton press 963 is utilized. In one embodiment, a pressure of approximately 48,000 psi is used to press the powder. Another example uses a pressure of approximately 16-21 tons per square inch.

In one embodiment, cathode powder 972 is sieved before it is deposited into the cavity to prevent any larger pieces of the powder to clog up the cavity.

Since the size of cavity 970 and the tap density of the cathode powder is known, a precise amount of powder is compacted onto the carrier strip. Battery cathodes that are later punched or removed from the strip then contain precise amounts of the cathode powder and the cathode powder is evenly distributed across the surfaces of the cathode carrier in a uniform density. This improves the consistency and reliability of the batteries. In one example, the powder has a pressed density of approximately 2.7 g/cm$^3$ and the cathode has an overall thickness (including base metal) of approximately 0.0182 inches. Other embodiments can range from approximately 2.5 to 3.2 g/cm$^3$.

Figure 58:
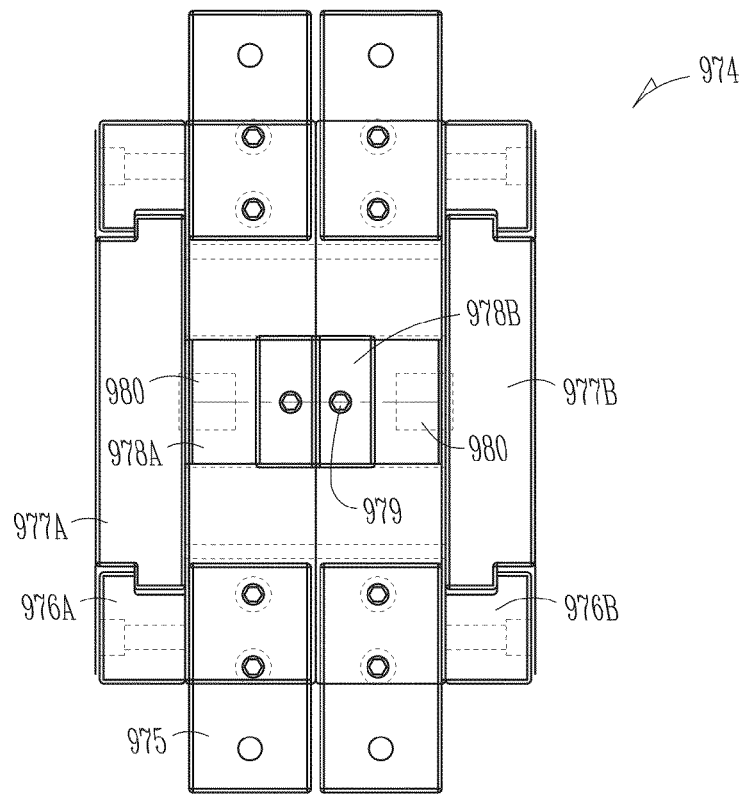
FIG. 58 shows a top view of a cathode forming fixture according to one embodiment.
Figure 59:
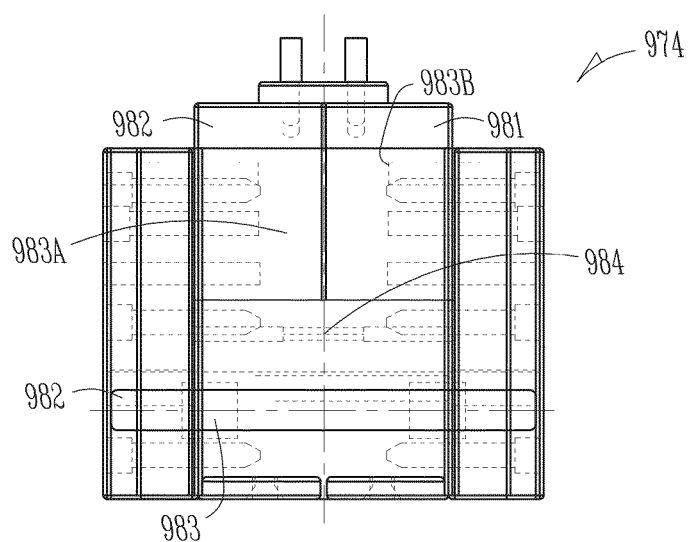
FIG. 59 shows a side view of the fixture of FIG. 58.
Figure 60:
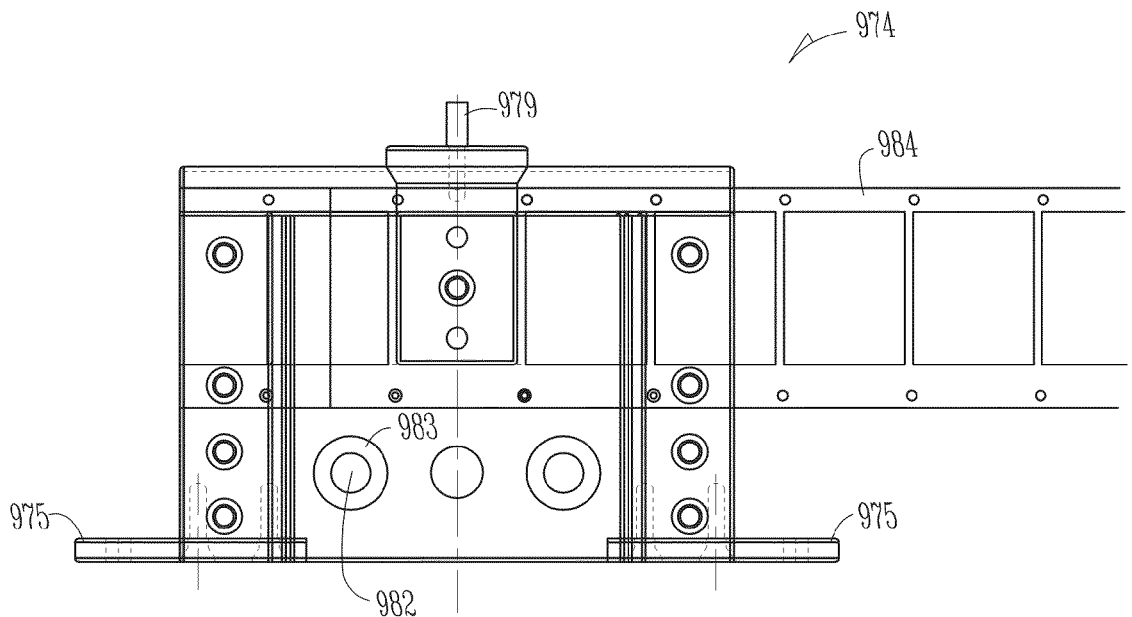
FIG. 60 shows a front view of the fixture of FIG. 58.

FIGS. 58, 59, and 60 show a top, side and front view of a cathode forming fixture 974 according to one embodiment. Fixture 974 includes base tabs 975 to mount the fixture to a surface. Clamps 976A and 976B hold a carrier strip within the fixture with a guide member 984 to hold the carrier strip and to keep the two halves of fixture 974 in alignment.

A pair of punch heads 977A and 977B each have a punch member 983A and 983B associated therewith. The area between the punch members 983A and 983B defines the cavity of the fixture. A spring 980 is positioned between each punch head 977A and 977B and its associated punch member 983A and 983B. A pair of plug members 978A and 978B are located on top of the fixture, and each plug member has a thumbscrew or other retaining member 979 engaged through the plug and into a block member 981 or 982 located below the plug. A guide post 982 provides further alignment between the two halves of the fixture. A bushing 982 can be used around guide post 982.

As noted above, some embodiments use a cathode paste (such as an MnO$_2$ paste) which is coated and then rolled or pressed onto one or more sides of a cathode base layer, such as stainless steel strip or a mesh strip. Individual cathodes can be then excised out of the strip. In some examples, the base layer is at least partially pre-cut or pre-scored into the desired cathode shape.

Referring again to FIG. 51, forming a cathode sub-assembly (930B) can include encapsulating each cathode in a separator envelop, as discussed above.

In one embodiment, the present system provides a battery electrode stack having 12 anode sub-assemblies and 11 cathode sub-assemblies (having sealed separators). The two anode sub-assemblies located on the stack ends are smaller to accommodate a radius case edge. These two end anode sub-assemblies have lithium attached to one side of their base collector plate only. The two outside cathode sub-assembly layers are also smaller in order to accommodate the radius of the case. Each anode and cathode sub-assembly layer includes an extension tab that extends out of the stack. The extension tabs are welded together when the stack is completed in order to connect the layers to one another. In one example, the extension tabs are welded with three spot welds and the ends of the tabs are clipped. A ribbon tab is welded to the cathode extensions for connecting them to the feedthrough. The cell is insulated and inserted into the case. The ribbon extension is welded to the feedthrough and the anode extension is welded directly to the case. The case portions are put together and welded around their interface.

Figure 61:
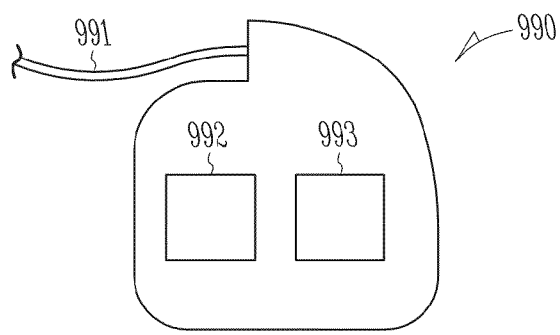
FIG. 61 is a block diagram of an implantable medical device system according to one embodiment.

FIG. 61 illustrates one of the many applications for the battery. For example, one application includes an implantable medical device 990 which provides therapeutic stimulus to a heart muscle, for instance, a defibrillator or a cardiac resynchronization therapy device (CRTD). The medical device 990 is coupled with a lead system 991. The lead system 991 is implantable in a patient and electrically contacts strategic portions of a patient=s heart. The medical device 990 includes circuitry 992 which can include monitoring circuitry, therapy circuitry, and a capacitor coupled to a battery 993. Circuitry 992 is designed to monitor heart activity through one or more of the leads of the lead system 991. The therapy circuitry can deliver a pulse of energy through one or more of the leads of lead system 991 to the heart, where the medical device 990 operates according to well known and understood principles. The energy of the device are developed by charging up the capacitor by using battery 993.

In addition to implantable defibrillators, the battery can be incorporated into other cardiac rhythm management systems, such as heart pacers, combination pacer-defibrillators, congestive heart failure devices, and drug-delivery devices for diagnosing or treating cardiac arrhythmias. Moreover, the battery can be incorporated also into non-medical applications. One or more teachings of the present discussion can be incorporated into cylindrical batteries.

Figure 62:
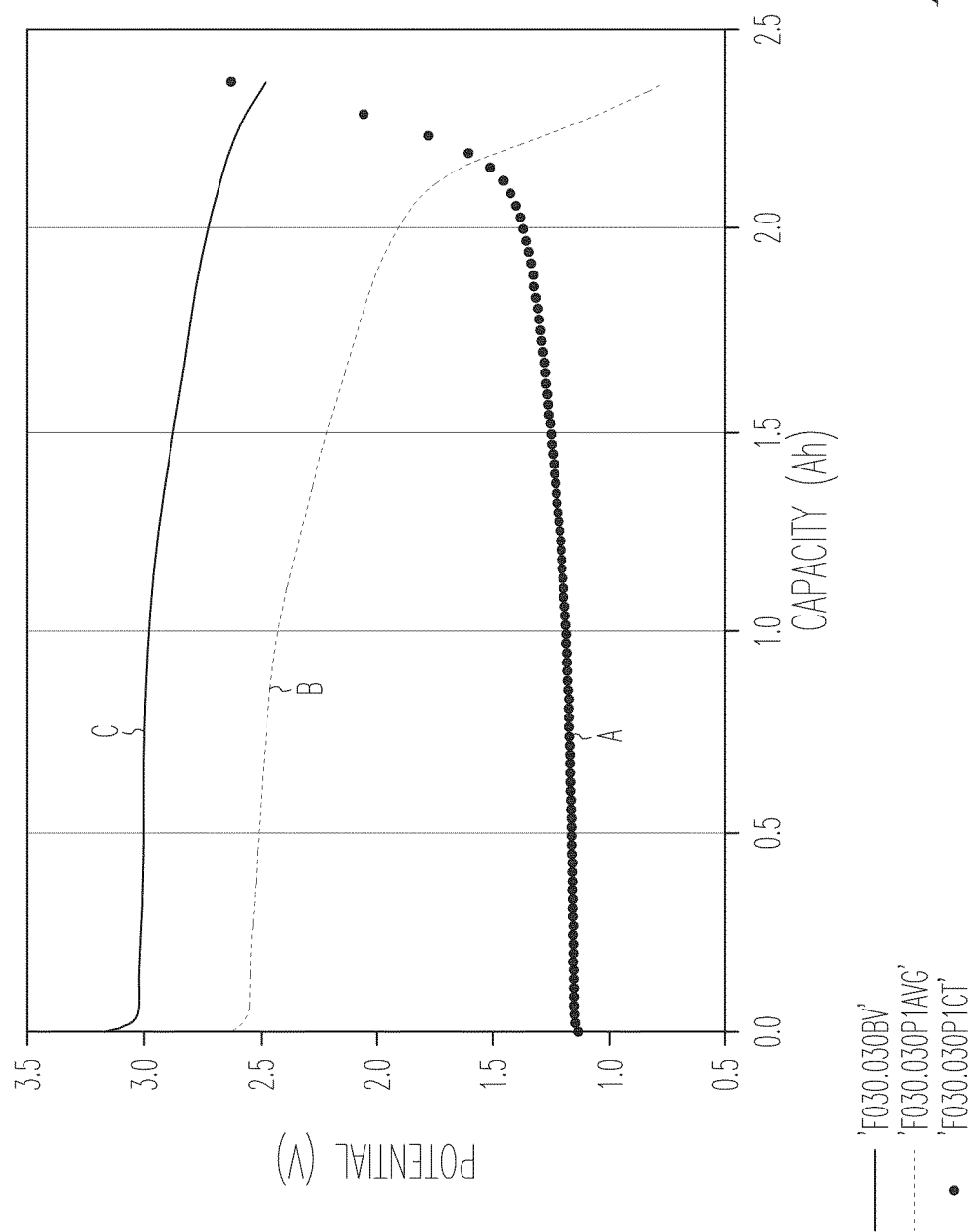
FIG. 62 is a chart of a battery constructed according tone embodiment.

FIG. 62 shows a performance chart of an example battery constructed according to one embodiment. The battery of FIG. 62 was constructed having anodes and cathodes having the values shown in Chart A, below, and was formed in the manner of battery stack of FIG. 27.

CHART A

| Type | Quantity | Area (cm$_2$) | Total Area (cm$_2$) | Volume (cc) | Active Material Mass (g) | Estimated Capacity (A-h) |
|---|---|---|---|---|---|---|
| Anode-small | 2 surfaces (2 anode layers) | 7.526 | 15.05 | 0.1147 | 0.0612 | 0.236 |
| Anode-large | 20 surfaces (10 anode layers) | 8.013 | 160.26 | 1.2211 | 0.652 | 2.517 |
| Total | | 15.539 | 175.31 | 1.3358 | 0.7132 | 2.753 |
| Cathode-small | 4 surfaces (2 cathode layers) | 7.796 | 31.184 | 0.6812 | 1.6552 | 0.3724 |
| Cathode-large | 18 surfaces (9 cathode layers) | 8.29 | 149.22 | 3.2596 | 7.9207 | 1.7821 |
| Total | | 16.086 | 180.404 | 3.9407 | 9.576 | 2.1546 |
| Ratio Li/MnO$_2$ | 1.278 | | | | | |
| Cathode current density | 0.017 a/cm$^2$ | | | | | |

A total of 12 lithium anodes were used, with the anodes on each end of the stack only having one surface with lithium and having a smaller area than the other anodes. The chart indicates that the two end anodes each provide one anode surface with the remainder of the anodes providing two anode surfaces each. A total of 11 MnO$_2$ cathodes were used, with the end two cathodes being of smaller surface area. All the cathodes had both surfaces having MnO$_2$, so the chart indicates four small cathode surfaces and 18 large cathode surfaces. The cathodes were prepared using a precisely measured amount of cathode powder pressed into the base layer, as discussed above.

After being pressed, the cathodes were heat-sealed between two separators, as discusses above. The anodes and cathodes were then alternatingly stacked using the fixture of FIG. 18B. The stack was then taped using the fixture of FIG. 41. The outer periphery of the stack was then taped by a double wrapping of an insulative tape as in FIG. 26B. The anode and cathode extension tabs were brought together and welded. The cathode tabs were connected to the feedthrough and the anode tabs were connected to the case. The case portions were put together and welded around their interface. The battery was filled with electrolyte and sealed using techniques discussed above.

The battery of chart A and FIG. 62 was designed for an implantable medical device, such as a defibrillator. The battery was designed to have a capacity of approximately 2.0 amp-hours with a life span of 6 to 7 years and a peak current level of approximately 3 amps. Using the methods and structures discussed herein, the battery was constructed to such specifications while having a shape friendly design suitable for fitting into a design space within the defibrillator case and while only having a total volume of 8.64 cm$^3$.

In various embodiments, batteries for different applications can be constructed using various design parameters. For example, some embodiments have a total battery volume of less than approximately 9.0 cm$^3$. Some embodiments have a total battery volume of between approximately 8.0 cm$^3$ and 9.0 cm$^3$. Some embodiments have a total battery volume of between approximately 8.5 cm$^3$ and 9.0 cm$^3$. Some batteries have a peak current level of approximately 2 to 5 amps and a capacity of approximately 2.0 amp-hours or greater. Other batteries can be manufactured using the techniques herein for different applications. Various embodiments include batteries having sizes ranging from about 3.0 cm$^3$ to about 12 cm$^3$. In general, the capacity in amp-hours/cm$^3$ of these different size batteries scales up linearly.

Referring again to FIG. 62, the charge time A of the battery is seen to be substantially constant over the useful life of the battery. For example, with a 2-4 amp current drain, in one embodiment, the charge time is generally about 6 to 7 seconds. Some embodiments have a substantially constant charge time between approximately 5 to 10 seconds. The line C in FIG. 62 denotes the open circuit voltage (OCV) of the battery. The line B denotes the Pulse One Average (P1A) of the battery. In one example, the P1A can be used to trigger ERI (elective replacement indicator). This triggers a 3 month clock until EOL (end of life). In the present example, EOL is approximately when OCV reaches 2.75 volts or when P1A reaches 1.75 volts.

The battery of FIG. 62 can also be constructed using a paste cathode construction, as discussed above. Moreover, the other anode and cathode interconnection techniques discussed above can also be used to construct a battery of the desired characteristics.

In one or more embodiments, the above described methods and structures provide for a battery making efficient use of space within the case, increased electrode surface area and increased capacity for a battery of a given set of dimensions. In one example, variation in the outer dimensions of one battery stack to another battery stack is reduced because each is formed of a precisely aligned series of electrode layers. Dimensional variations in the battery stack resulting from variation in the reference points from case to case or alignment apparatus to alignment apparatus can be reduced or eliminated. This provides improved dimensional consistency in production and allows for reduced tolerances between the battery stack and the battery case. This allows for more efficient use of space internal to the battery case.

In one or more embodiments, different battery chemistries can be used for the cathode structures discussed above. For example, silver vanadium oxide (SVO), carbon monofluoride (Cfx), and carbon vanadium (CVO) can be utilized in accordance with some embodiments. In addition to primary batteries, batteries according to some embodiments can be formed as secondary type batteries or rechargeable batteries such as Lithium ion.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present invention. The scope of the invention should, therefore, be determined with reference to the appended claims, along with the full scope of equivalents to which such claims are entitled.

What is claimed is:

1. A battery comprising:
    a housing having a wall which includes an integrally formed annular structure defining a feedthrough hole, the integrally formed annular structure including an inward facing cylindrical surface;
    an electrode assembly located within the housing and including an anode and a cathode, and a ribbon tab connector connected to the anode or the cathode and extending out of the electrode assembly;
    a feedthrough post extending through the feedthrough hole;
    an electrically insulating member having an outer surface abutting the inward facing cylindrical surface, the electrically insulating member having an inner hole, wherein the feedthrough post extends through the inner hole and has one end connected to the ribbon tab connector extending out of the electrode assembly, and wherein the ribbon tab connector has a U-shaped configuration and is wrapped around a side surface of the feedthrough post and is attached to an opposite portion of the feedthrough post at a section configured to provide strain relief for the connection within the housing between the ribbon tab connector and the feedthrough post, and wherein there is a space between a portion of the ribbon tab and the feedthrough post, and a second end exposed externally to the housing; and
    wherein the electrode assembly includes a cut-out portion such that there is an empty space between the housing wall and the electrode assembly, and wherein the feedthrough post extends into the space and the tab extends into the empty space.

2. The battery of claim 1, wherein the housing includes a base portion and a lid portion and the feedthrough hole is within the lid portion.

3. The battery of claim 1, wherein the electrode assembly includes a plurality of anode sub-assemblies and cathode sub-assemblies arranged in a layered stack.

4. The battery of claim 1, wherein the electrically insulating member includes a glass member.

5. The battery of claim 1, wherein the integrally formed annular structure defines an integral ferrule formed in a lid of the housing.

6. The battery of claim 1, wherein the electrically insulating member is a cylindrical member.

7. The battery of claim 1, wherein the electrically insulating member includes an epoxy member or a ceramic member.

8. The battery of claim 1, wherein electrically insulating member is adapted to provide a hermetic seal of the battery.

9. The battery of claim 1, wherein the feedthrough post has the one end connected to a cathode tab of the electrode assembly and the second end exposed externally to the housing to provide a cathode terminal for the battery.

10. The battery of claim 1, wherein the cathode includes an $MnO_2$ cathode and wherein the housing has a volume of approximately 9.0 $cm^3$ or less, and wherein the battery is configured to have a peak current level of approximately 2 to 5 amps and a capacity of approximately 2.0 amp-hours or greater.

11. The battery of claim 10, wherein the anode includes lithium.

12. The battery of claim 1, wherein the feedthrough post includes molybdenum.

13. A battery having a peak current level of approximately 2 to 5 amps and a capacity of approximately 2.0 amp-hours or greater, the battery comprising:
    an electrode assembly including an MnO2 cathode and an anode opposing the MnO2 cathode;
    a battery case holding the MnO2 cathode and the anode, the battery case having a wall which includes an integrally formed annular structure defining a feedthrough hole, the integrally formed annular structure including an inward facing cylindrical surface, wherein the battery case has a volume of approximately 9.0 cm3 or less;
    a feedthrough post extending through the feedthrough hole;
    an electrically insulating member having an outer surface abutting the inward facing cylindrical surface, the electrically insulating member having an inner hole, wherein the feedthrough post extends through the inner hole and has one end connected to a ribbon tab extending out of the electrode assembly, and wherein the ribbon tab has a U-shaped configuration and wraps around a side surface of the feedthrough post and is attached to an opposite portion of the feedthrough post at a section configured to provide strain relief for the connection within the housing between the ribbon tab connector and the feedthrough post, and wherein there is a space between a portion of the ribbon tab and the feedthrough post, and a second end exposed externally to the housing; and
    wherein the electrode assembly includes a cut-out portion such that there is a space between the battery case wall and the electrode assembly, and wherein the feedthrough post extends into the space and the tab extends into the space.

14. The battery of claim 13, wherein the battery case has a volume of approximately 8.64 $cm^3$.

15. The battery of claim 13, wherein the battery case has a volume between approximately 8.0 $cm^3$ and 9.0 $cm^3$.

16. The battery of claim 13, wherein the battery case has a volume between approximately 8.5 $cm^3$ and 9.0 $cm^3$.

17. The battery of claim 13, wherein the anode includes lithium.

18. The battery of claim 13, wherein the battery includes a plurality of alternating discrete anode and cathode layers formed into a stacked structure.

* * * * *